March 1, 1927.

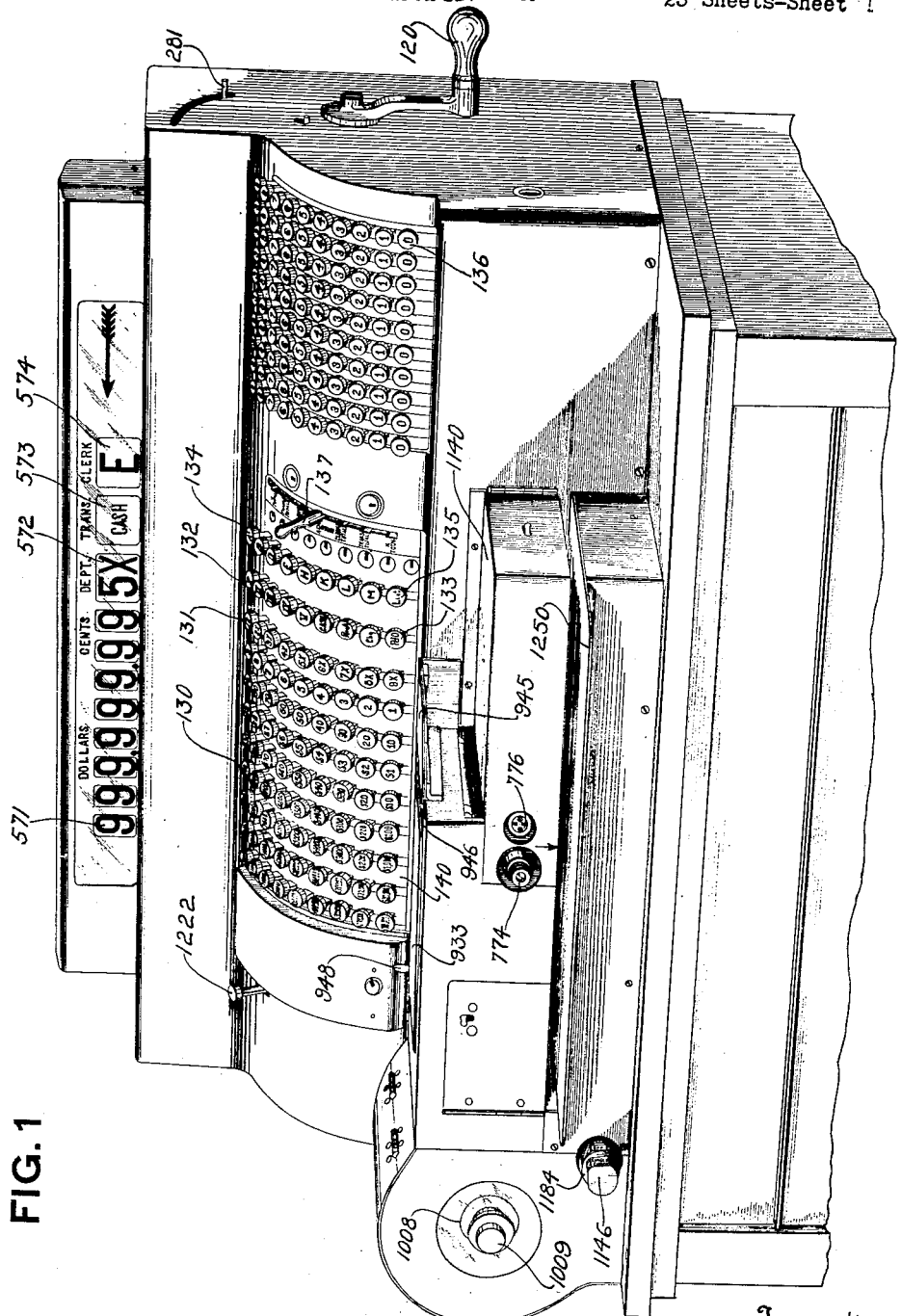

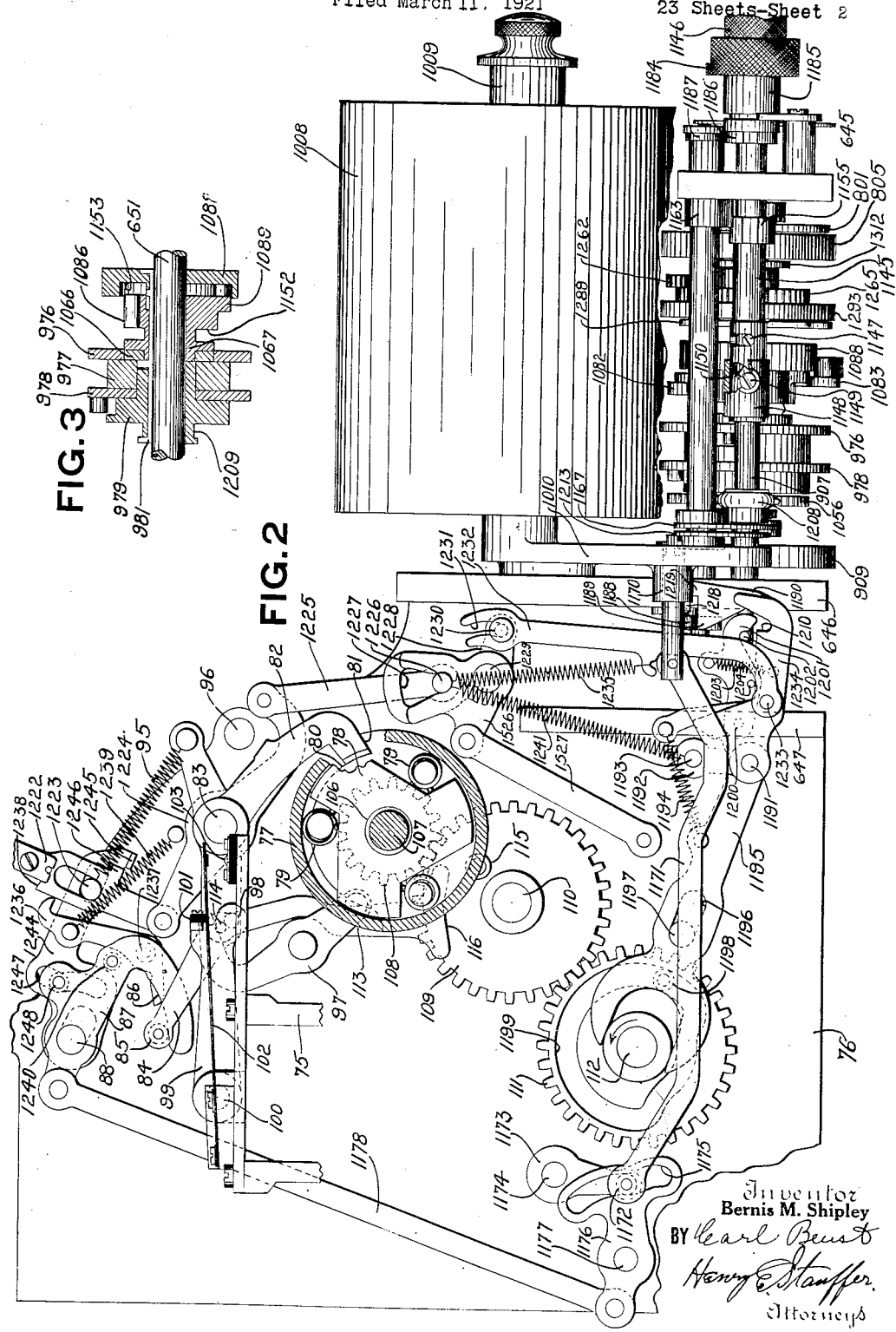

B. M. SHIPLEY 1,619,796

CASH REGISTER

Filed March 11, 1921

Inventor
Bernis M. Shipley
BY
Attorneys

March 1, 1927.

B. M. SHIPLEY 1,619,796

CASH REGISTER

Filed March 11, 1921

Inventor
Bernis M. Shipley
BY Earl Beust
Henry E. Stauffer
Attorneys

March 1, 1927.
B. M. SHIPLEY
CASH REGISTER
Filed March 11, 1921
1,619,796
23 Sheets-Sheet 5

Inventor
Bernis M. Shipley
BY Carl Beust
Henry E Stauffer
Attorneys

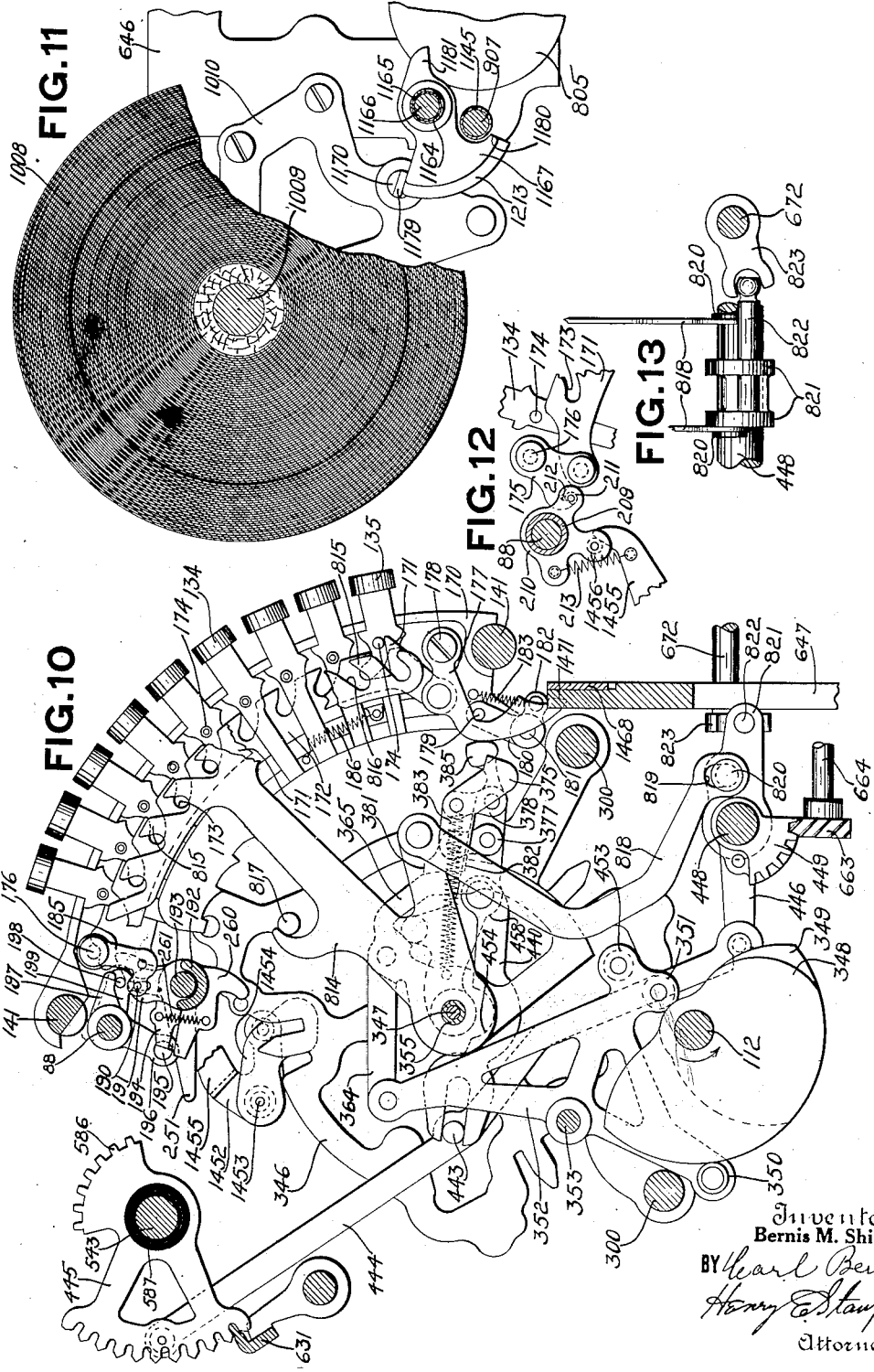

March 1, 1927.
B. M. SHIPLEY
1,619,796
CASH REGISTER
Filed March 11, 1921
23 Sheets—Sheet 7
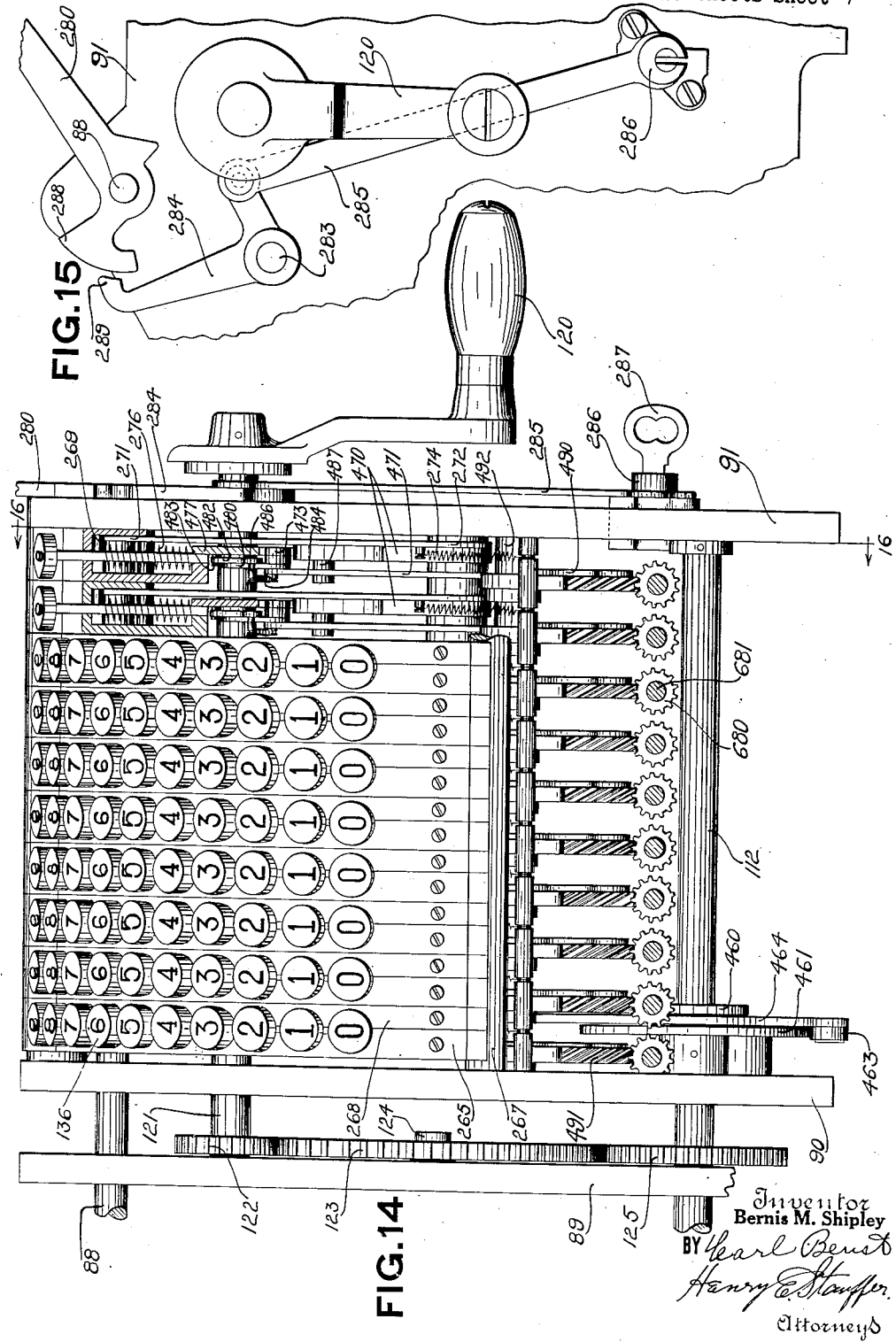
Inventor
Bernis M. Shipley
BY *Earl Beust*
*Henry E. Stauffer*
Attorneys March 1, 1927.

B. M. SHIPLEY 1,619,796

CASH REGISTER

Filed March 11, 1921

Inventor
Bernis M. Shipley
BY Carl Beust
Henry E Stauffer
Attorneys

March 1, 1927.
B. M. SHIPLEY
1,619,796
CASH REGISTER
Filed March 11, 1921    23 Sheets-Sheet 9
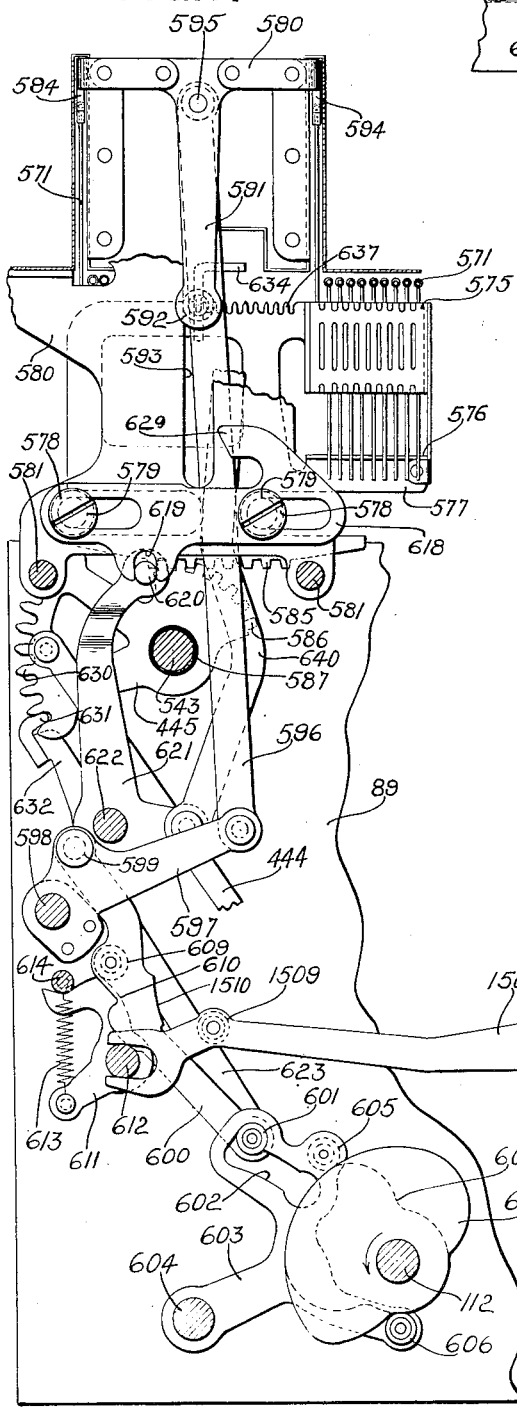
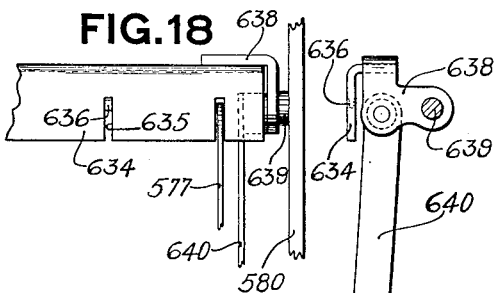
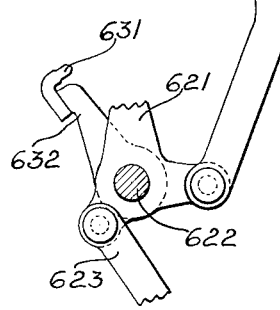
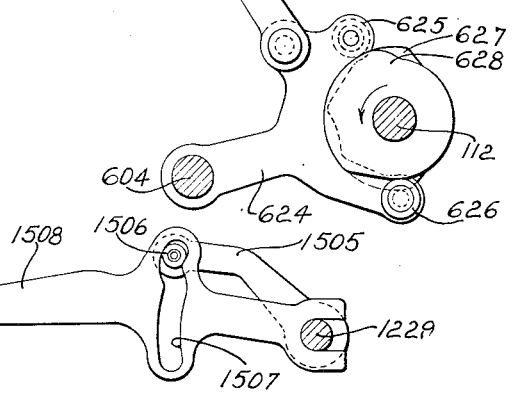
Inventor
Bernis M. Shipley
BY Earl Beust
Henry E. Stauffer
Attorneys

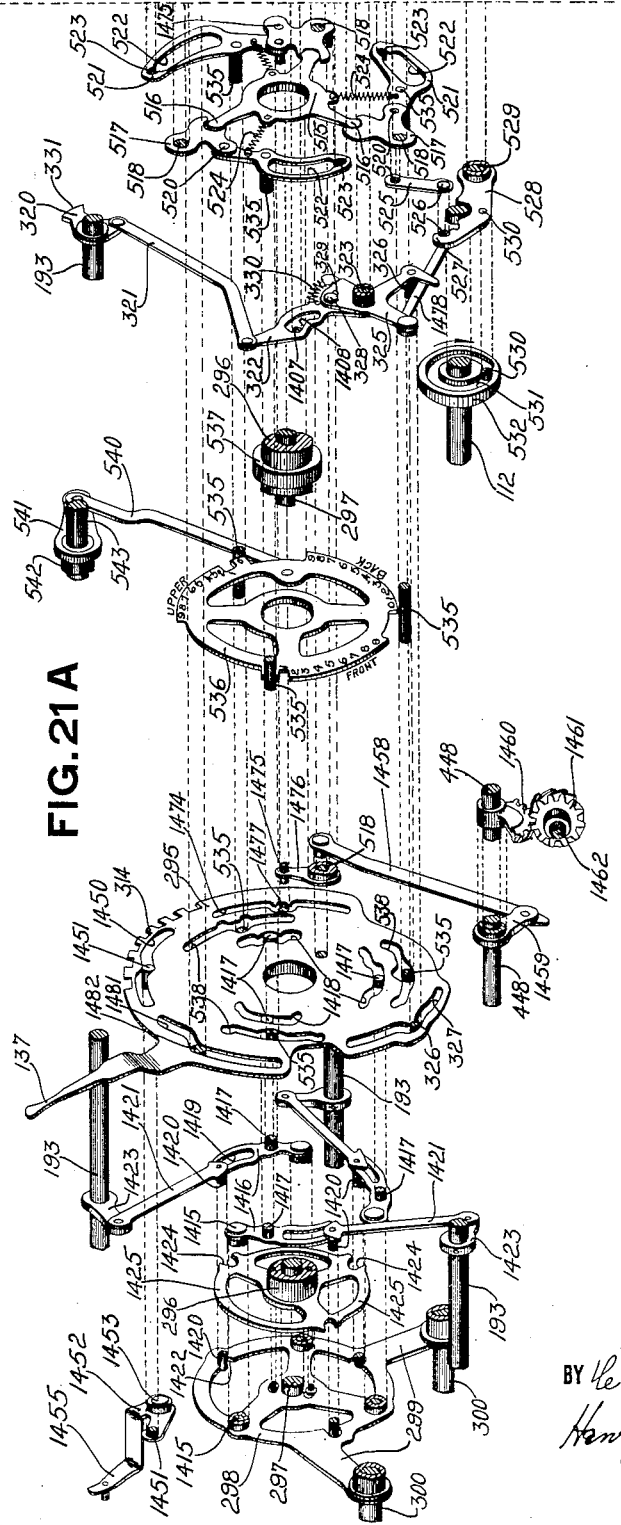

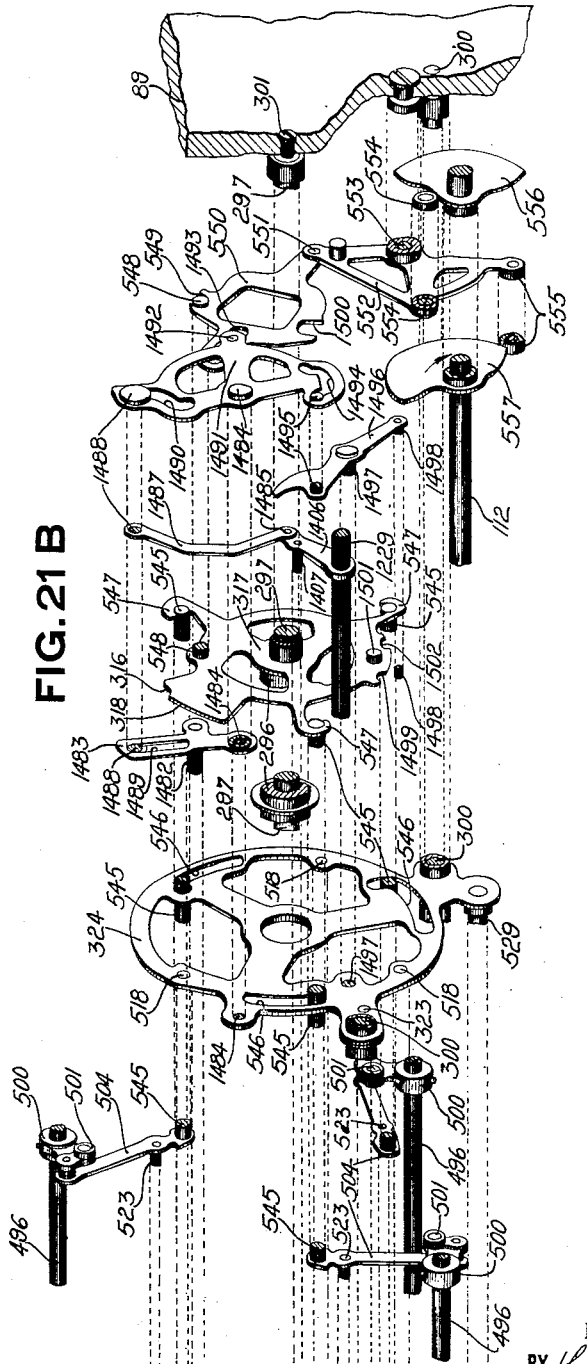

March 1, 1927.
B. M. SHIPLEY
1,619,796
CASH REGISTER
Filed March 11, 1921
23 Sheets-Sheet 12
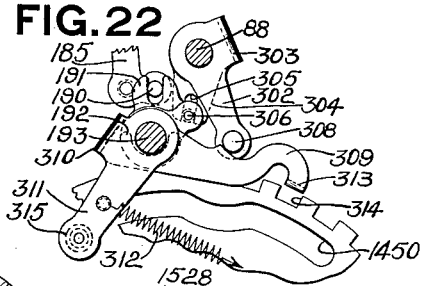
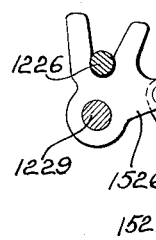
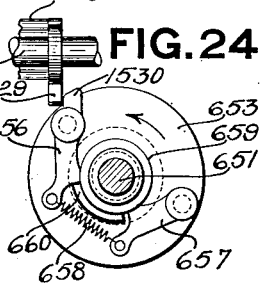
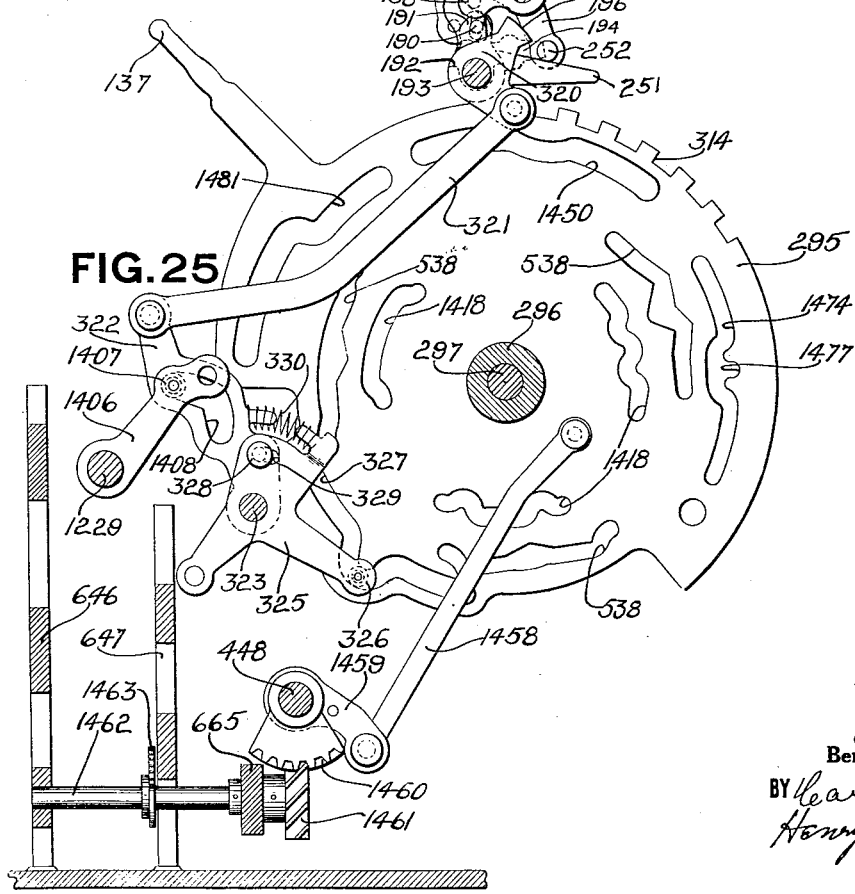

March 1, 1927.
B. M. SHIPLEY
CASH REGISTER
Filed March 11, 1921
1,619,796
23 Sheets-Sheet 13
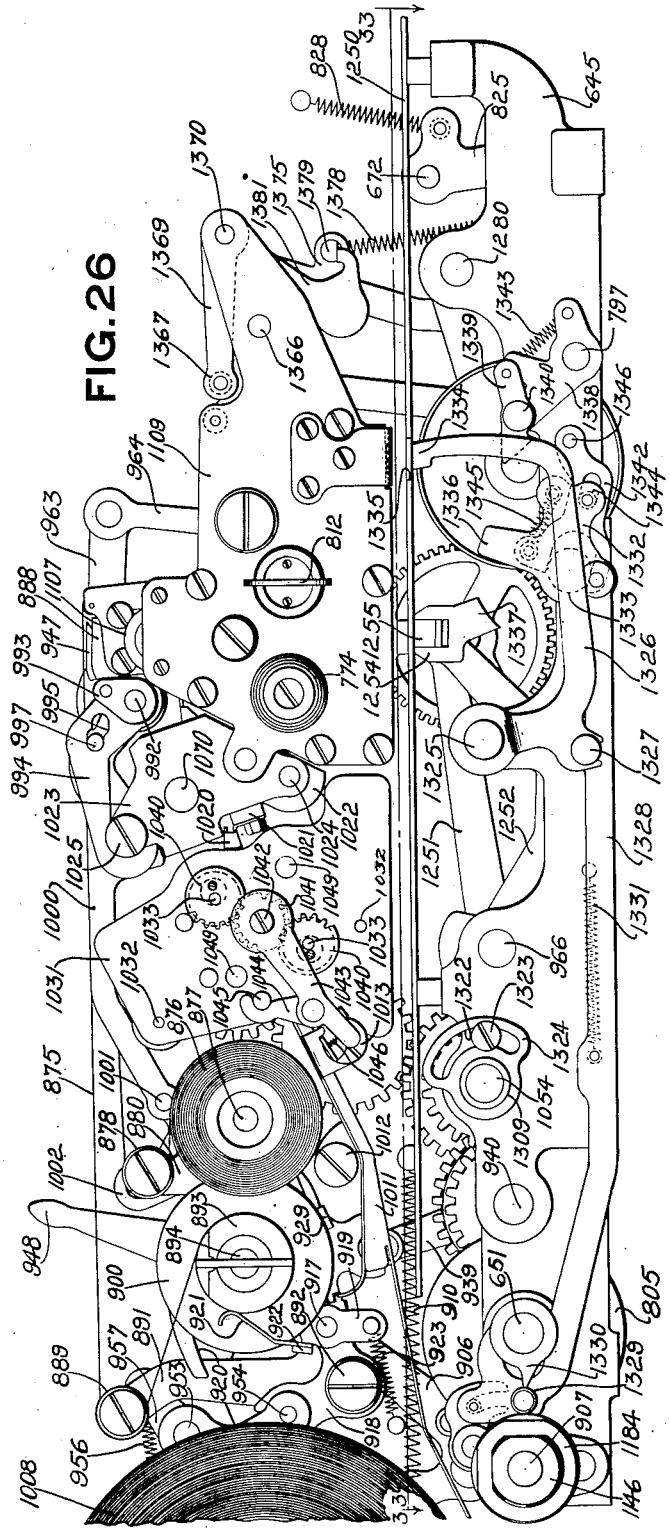
FIG. 26
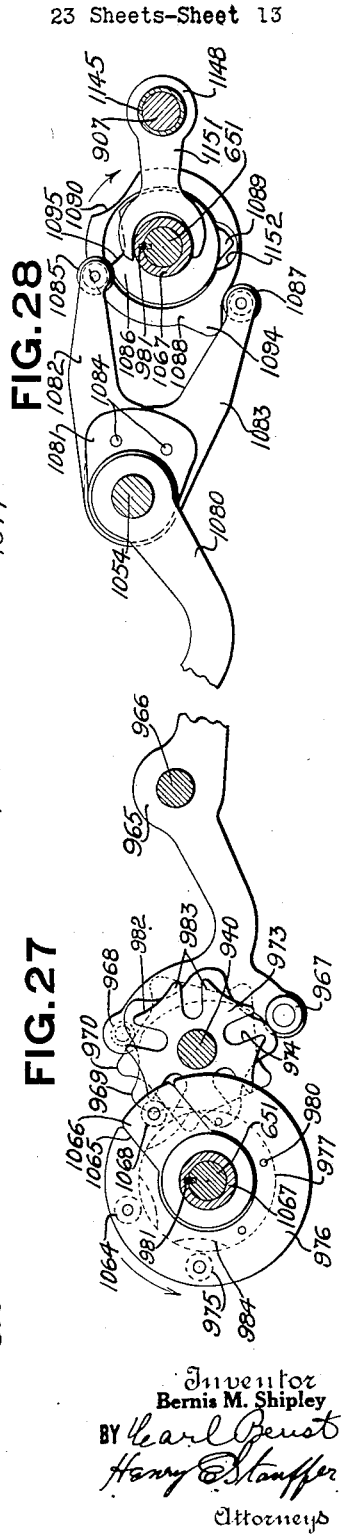
FIG. 28
FIG. 27
Inventor
Bernis M. Shipley
BY Earl Beust
Henry Stauffer
Attorneys March 1, 1927.
B. M. SHIPLEY
CASH REGISTER
Filed March 11, 1921
1,619,796
23 Sheets-Sheet 14
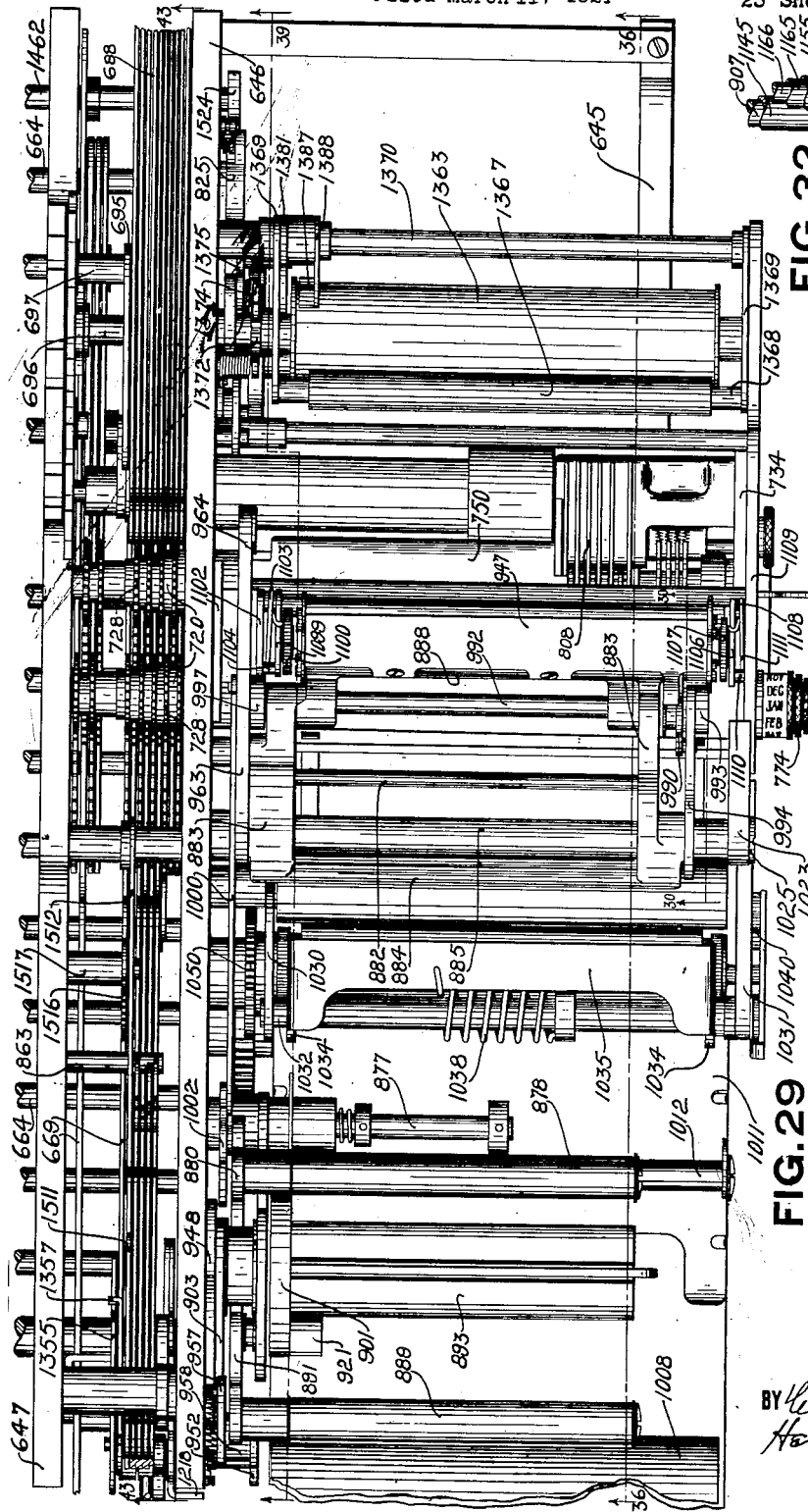
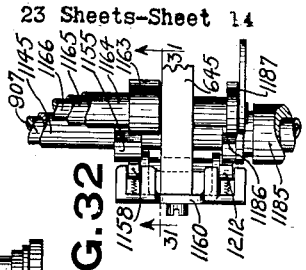
FIG. 32
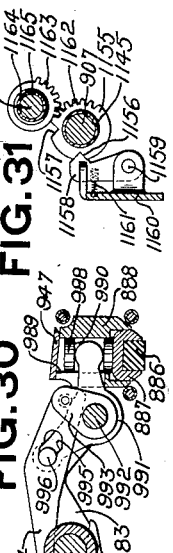
FIG. 30  FIG. 31
FIG. 29
Inventor
Bernis M. Shipley
BY Carl Beust
Henry E. Stauffer
Attorneys March 1, 1927.

B. M. SHIPLEY

CASH REGISTER

Filed March 11, 1921

Inventor
Bernis M. Shipley
BY
Attorneys

March 1, 1927. 1,619,796
B. M. SHIPLEY
CASH REGISTER
Filed March 11, 1921 23 Sheets-Sheet 16
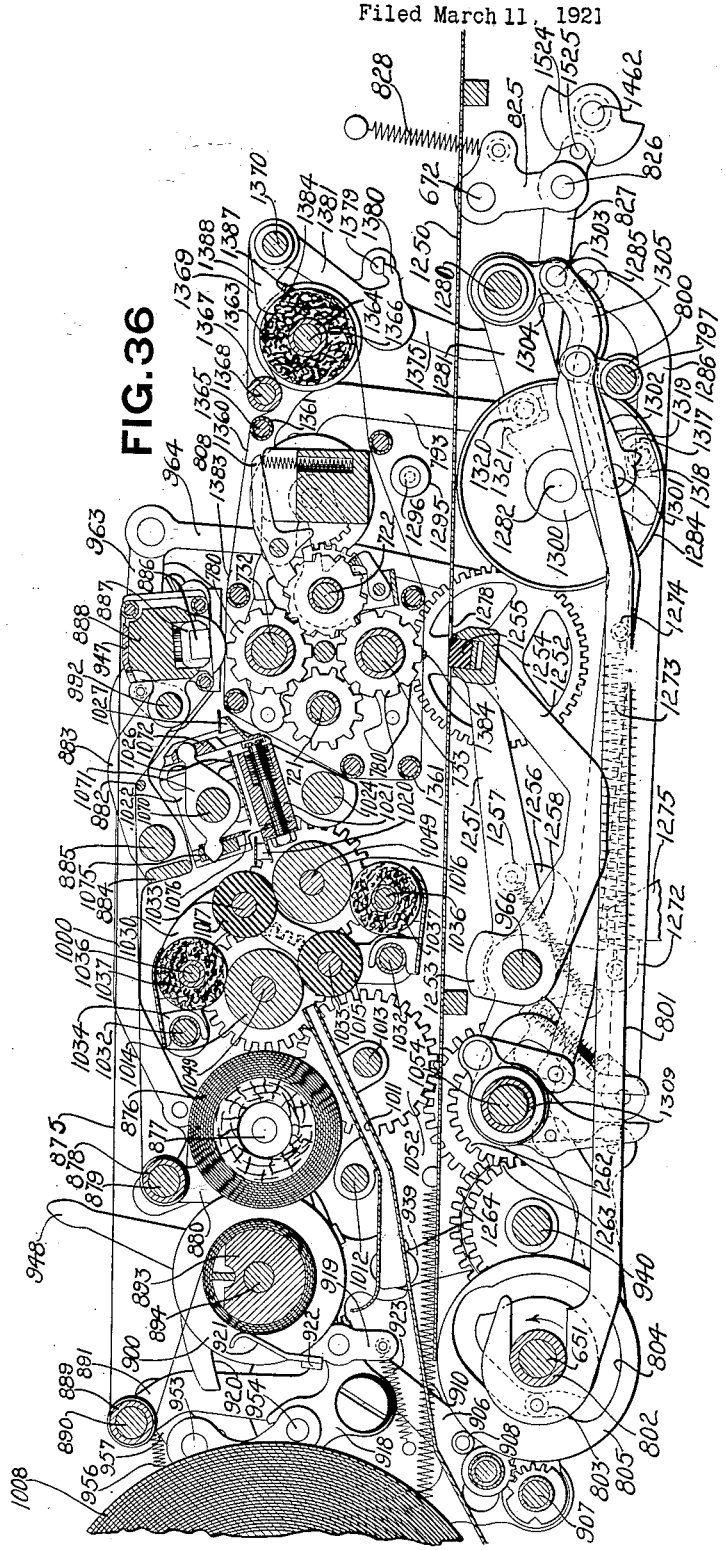
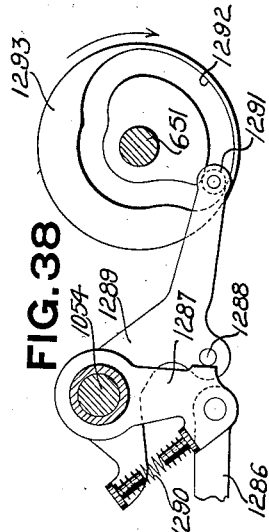
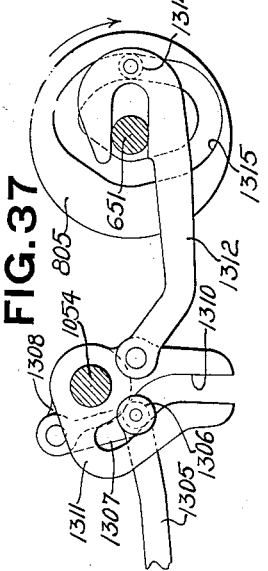
Inventor
Bernis M. Shipley
Attorneys March 1, 1927.

B. M. SHIPLEY

CASH REGISTER

Filed March 11, 1921

Inventor
Bernis M. Shipley
BY
Attorneys

March 1, 1927.

B. M. SHIPLEY 1,619,796

CASH REGISTER

Filed March 11, 1921

Inventor
Bernis M. Shipley

March 1, 1927.
B. M. SHIPLEY
1,619,796
CASH REGISTER
Filed March 11, 1921
23 Sheets-Sheet 19
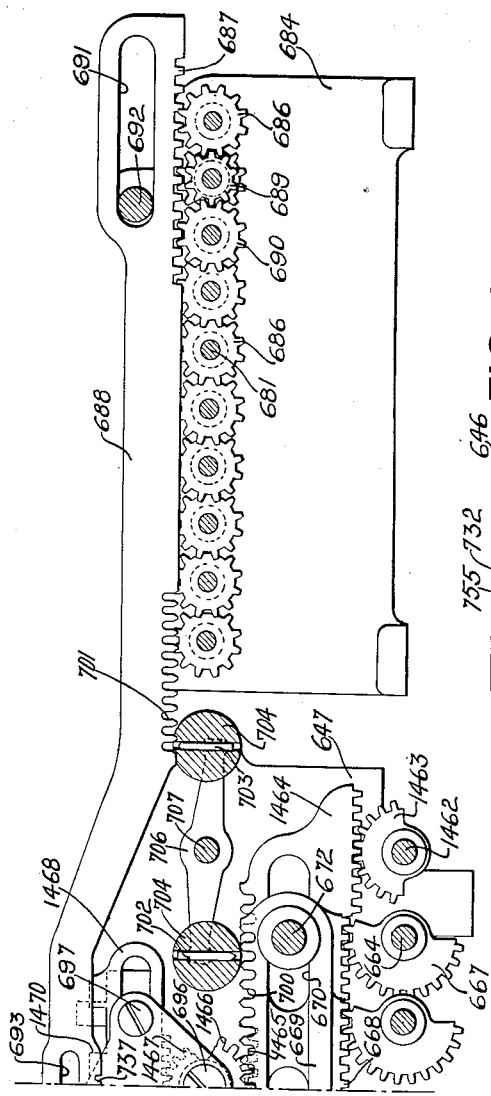
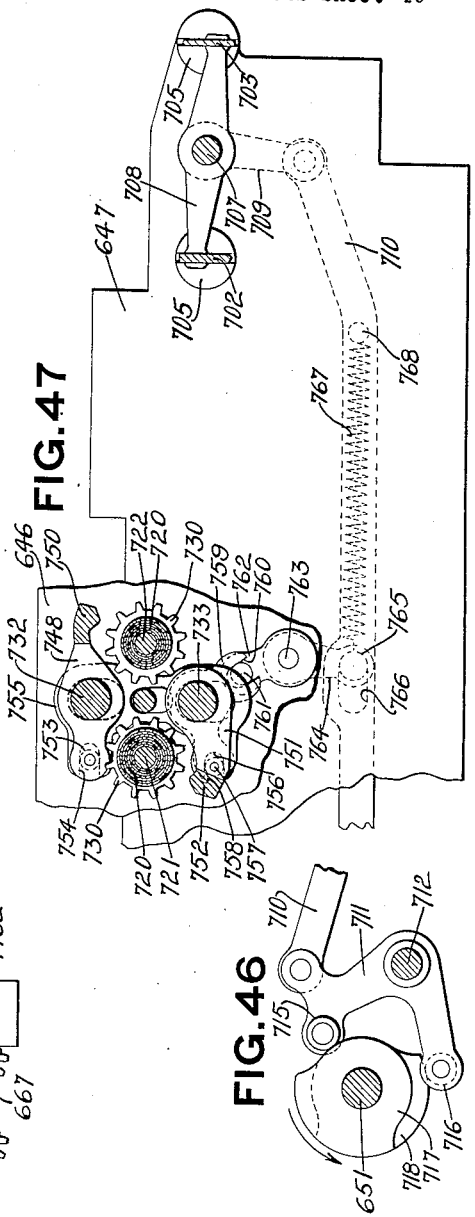
Inventor
Bernis M. Shipley
BY
Attorneys March 1, 1927.

B. M. SHIPLEY

CASH REGISTER

Filed March 11, 1921

Inventor
Bernis M. Shipley
BY Pearl Beust
Henry E Stauffer
Attorneys

March 1, 1927.
B. M. SHIPLEY
1,619,796
CASH REGISTER
Filed March 11, 1921     23 Sheets-Sheet 21
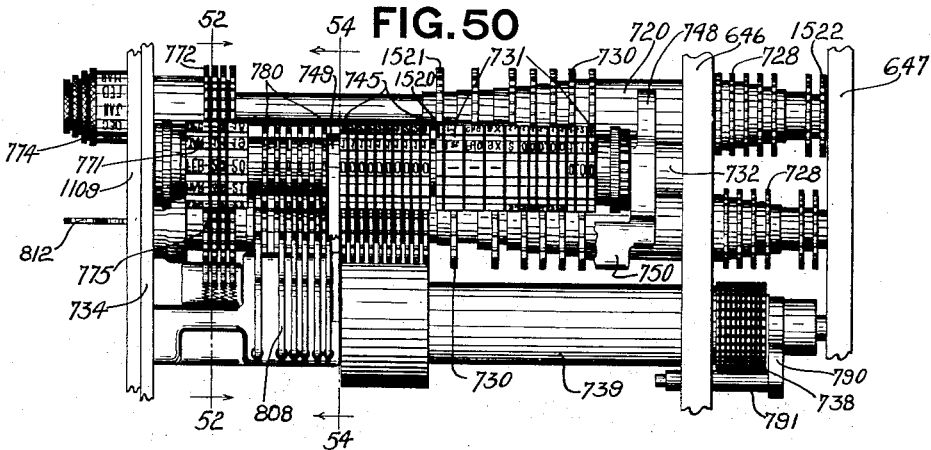
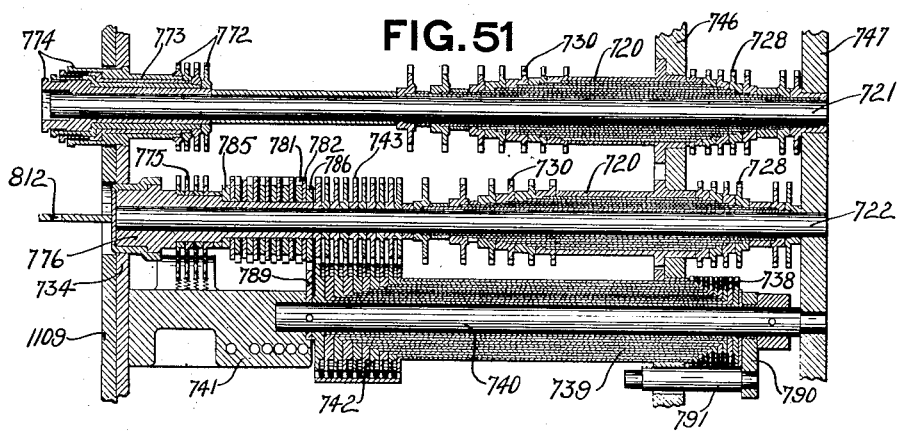
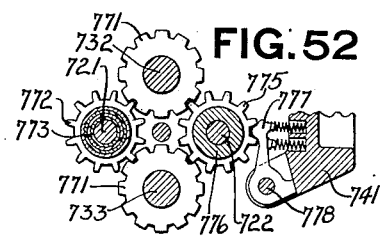
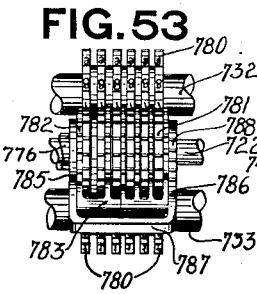
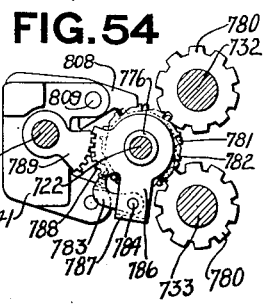
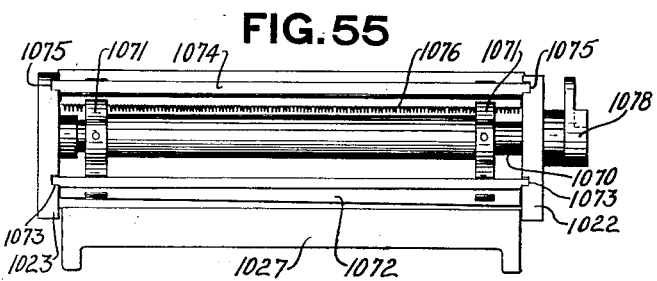
Inventor
Bernis M. Shipley
BY Earl Beust
Henry E. Stauffer
Attorneys March 1, 1927.

B. M. SHIPLEY 1,619,796

CASH REGISTER

Filed March 11, 1921

MAR-17-20 | 187654 | 3487961140 | E CASH 2X|S   3840
DATE | TRANSACTION NUMBER | LEDGER No. | CLERK-TRANSFER | AMOUNT
THE JAMES ROE COMPANY
CHARLOTTE                                    NORTH CAROLINA
THIS RECEIPT IS VALUABLE            KEEP IT

THE JAMES ROE COMPANY
137-149 SOUTH MAIN ST.

FIG. 57

MAR-17-20 | 187654 | 3487961148 | E CASH 2X|S   3840
DATE | TRANSACTION NUMBER | LEDGER No. | CLERK-TRANSFER | AMOUNT
THE JAMES ROE COMPANY
CHARLOTTE                                    NORTH CAROLINA
THIS RECEIPT IS VALUABLE            KEEP IT

MAR-17-20  187654  3487961140  E CASH 2XS    3840

THE JAMES ROE COMPANY
137-149 SOUTH MAIN ST.

FIG. 58

THE JAMES ROE COMPANY
DEPARTMENT STORES

MEN'S FURNISHING DEPARTMENT
A COMPLETE LINE OF
SUITS        RAINCOATS      OVERCOATS
SHIRTS       SCARFS         CAPS
HATS         SHOES          SWEATERS
GLOVES       HOSIERY        PAJAMAS

FIG. 59

MAR-17-20  187654  3487961140  E CASH 2X S   3840

MAR-17-20  187654  3487961140

CLERK  John Doe              3/17/20
Sold to  Mr. Smith
Address  1342 Fulton St.

4   Shirts       26 00
1   Hat           5 00
1   Tie           1 50
1   Pyjamas       2 90
1   Gloves        3 00
                 38 40

FIG. 60

| 187651 |            | ZL+ V  -   | 1120.50  |
| 187651 |            | ZA  - -    | 100.00   |
| 187652 | 347611     | M CASH 3XS | 98.00    |
| 187653 | 196548702  | B Ck6 9XS  | 30.00    |
| 187653 | 3725       | H RHO 7X   | 1.50     |
|        |            | Mr. Smith  |          |
| 187654 | 3487961140 | E CASH 2X S| 38.40    |
| 187655 | 4803       | K R/c 7X S | 104.10   |
| 187656 | 96712      | L CL 9X S  | 18.00    |
| 187656 |            | D R105X    | 10.00    |
| 187657 | 38714332   | H CASH 1X S| 50.50    |
| 187657 |            | M R809X    | 24.90    |
| 187657 |            | XL+ - 5X   | 3182.10  |
| 187657 |            | ZL+ - 5X   | 3182.10  |
| 187657 |            | XL+III -   | 10101.01 |
| 187657 |            | XL - -     | 2081.2   |
| 187658 | 280        | E III 5X S | 10.11    |

Inventor
Bernis M. Shipley
BY Earl Beust
Henry E. Stauffer
Attorneys

March 1, 1927.

B. M. SHIPLEY 1,619,796

CASH REGISTER

Filed March 11, 1921

Inventor
Bernis M. Shipley
By Carl Beust
Henry E. Stauffer
His Attorneys

Patented Mar. 1, 1927.

1,619,796

UNITED STATES PATENT OFFICE.

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed March 11, 1921. Serial No. 451,508.

This invention relates to cash registers and the like and more particularly to machines of the type shown and described in Letters Patent of the United States No. 1,230,864, issued to W. A. Chryst, on June 26, 1917, and Letters Patent of the United States, No. 1,242,170, and No. 1,394,256 issued to F. L. Fuller on Oct. 9, 1917, and Oct. 18, 1921, respectively.

The primary object of the present invention is to construct a machine which is readily adaptable for use in department stores and other analogous lines of business.

Another object is to provide a machine of the type specified with a ledger printing device under the control of banks of depressible keys instead of having said device controlled by reciprocable levers such as illustrated in the above mentioned Patent No. 1,394,256.

Another object is to provide novel interlocking mechanism between the banks of control keys and the total lever.

Another object is to provide a novel key release mechanism for releasing all keys which have been depressed with exception of those in the motor control bank, and to provide a locking device cooperating with said key release mechanism whereby all keys may be rendered ineffective thereby rendering the machine inoperative.

Another object is to improve the method of "breaking" the differential latch in the zero position.

Another object is to provide a novel mechanism under the control of the total lever for crippling the indication whenever a total or subtotal operation is taken.

An improved aligning mechanism has also been provided for the indicator carrying plates.

Another object is to provide a novel consecutive number printing throw-out mechanism under the control of a transaction key and the total lever.

Another object is to provide novel mechanism for automatically controlling the issuance of a check and also providing novel mechanism whereby said automatically controlled check issuing mechanism is rendered ineffective under the control of the total lever, and other manipulative devices operated as a preliminary to an operation of the machine.

Another object is to provide novel mechanism, manually operated, for controlling the impressions and the perforation in connection with the check issuing mechanism.

Other objects of the present invention relating particularly to the printing mechanism are; to provide new locking means for the manual control knobs for the printing and check issuing mechanism; to provide a new type line construction; to provide a novel variable feeding mechanism for the ink ribbon; to provide a simplified detail strip shifting mechanism; to provide an improved knife and perforator mechanism; to provide an improved slip impression control; to provide an improved check ejecting mechanism; to provide a hammer impression for the slip instead of a squeeze impression; to provide an improved type wheel rack aligning mechanism; to improve the type wheel aligning mechanism; and to improve the zero elimination mechanism.

With these and incidental objects in view, the invention consists in certain novel features of construction and combinations of parts, the essential elements of which are set forth in appended claims, and a preferred form of embodiment such as hereinafter described with reference to the drawings which accompany and form part of the specification.

Of said drawings:—

Fig. 1 is a perspective view of the complete machine.

Fig. 2 is a left hand elevation of the machine illustrating a part of the motor drive, a part of the automatic check controlling mechanism and a portion of the printing mechanism.

Fig. 3 is a detail view in section illustrating the construction of the cams and Geneva drivers pertaining to the check issuing and printing.

Fig. 10 is a section alongside the clerk's bank of keys, some parts being broken away to show the key banks, and also illustrates a portion of the consecutive number of throw-out mechanism.

Fig. 11 is a fragmentary detail view showing the check roll mounting bracket and a portion of the improved locking device for the manually operated printer control knobs.

Fig. 12 is a detail view, broken away, showing a part of the control key lock mechanism in the clerk's bank.

Fig. 13 is a fragmentary detail view illustrating a portion of the consecutive number throw-out mechanism.

Fig. 14 is a view partly in front elevation and partly in section illustrating the ledger device key banks and the differential mechanism associated therewith, and also shows the operating handle.

Fig. 15 is a fragmentary view showing the manual key release lever and the locking mechanism cooperating therewith.

Fig. 17 is a view of the portion of the indicating mechanism and the means for crippling the indication when taking a total.

Fig. 18 is a fragmentary view of the indicator carrying plate aligner.

Fig. 19 is a detail view having parts broken away showing the two aligning devices for the indicating mechanism.

Fig. 20 is a detail view of the indicator aligner operating mechanism.

Figs. 21ᴬ and 21ᴮ together constitute a disunited perspective view of the totalizer engaging controlling mechanism.

Fig. 22 is a detail view showing a part of the interlocking mechanism between the key banks and the total lever.

Fig. 23 is a view looking towards the left and illustrates the driving connections from the main shaft to the printer shaft and also shows the mechanism for permitting only one revolution of the printer shaft when the main shaft makes two revolutions during totalizing operations.

Fig. 24 is a detail view of the driving and retaining pawls for the printer drive shaft and shows their connection to said shaft.

Fig. 25 is a view of the total lever and the interlocking mechanism between the key lock shaft and said lever and also shows the connection between the total lever and the printing mechanism.

Fig. 26 is a front elevation of the improved printing mechanism, a part of the check roll being broken away.

Fig. 27 is a detail view of the upper impression operating mechanism.

Fig. 28 is a detail view of the operating mechanism for the check perforator and the check impressions.

Fig. 29 is a top plan view of the improved printing mechanism.

Fig. 30 is a section on line 30—30 of Fig. 29 and shows the date eliminating mechanism.

Fig. 31 is a section on line 31—31 of Fig. 32, looking in the direction of the arrows.

Fig. 32 is a detail top plan view of the retaining mechanism for the manually operated printer control knobs.

Figures 33, 34, 35:
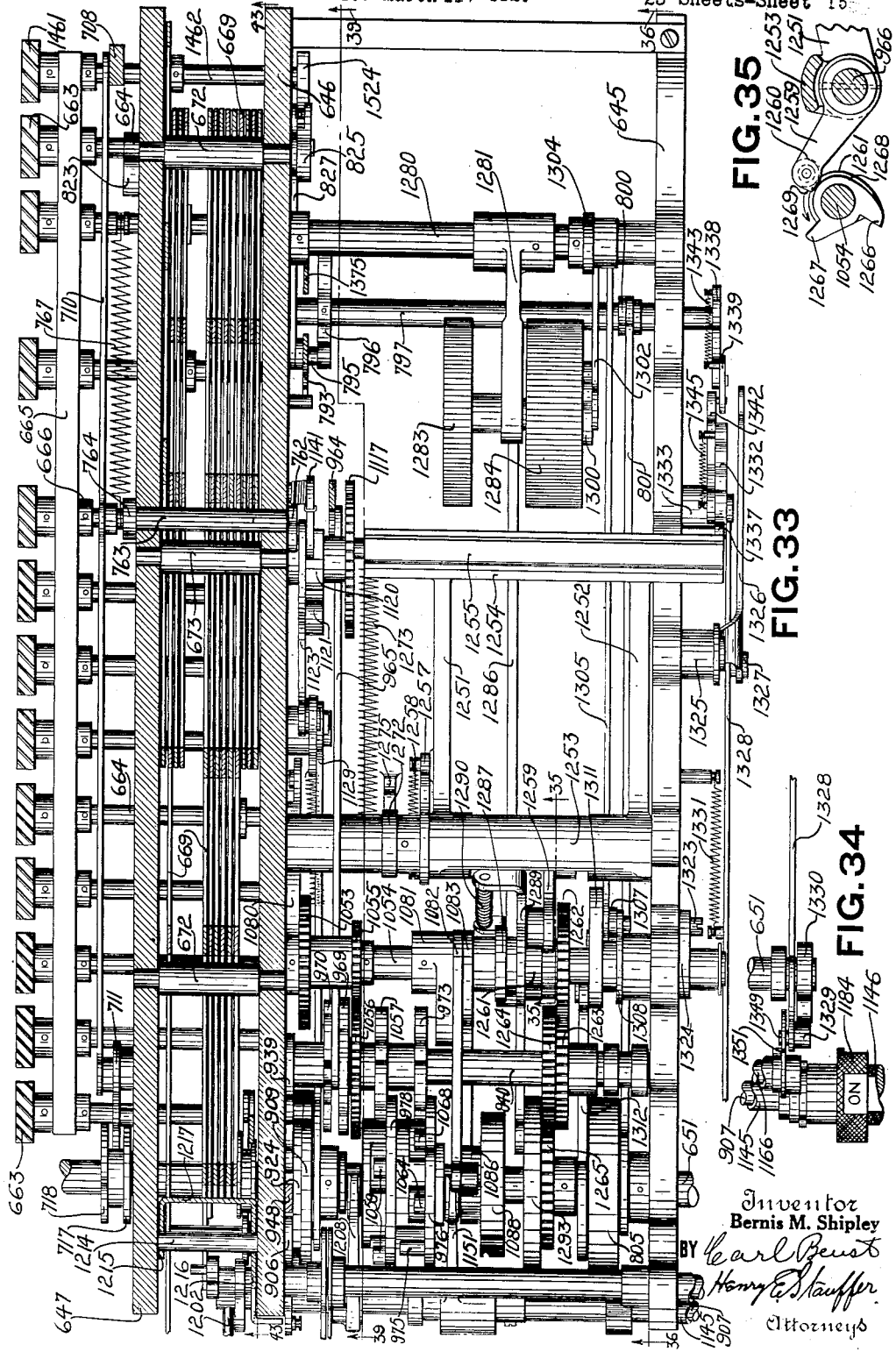

Fig. 33 is a horizontal section taken approximately on line 33—33 of Fig. 26.

Fig. 34 is a fragmentary view of the printer control knobs and some of the co-operating mechanism.

Fig. 35 is a section on line 35—35 of Fig. 33 and shows the slip hammer operating mechanism.

Fig. 36 is a section approximately on line 36—36 of Figs. 29 and 33 looking in the direction of the arrows.

Fig. 37 is a detail view of the slip feed operating mechanism.

Fig. 38 is a view of the slip feed tension mechanism.

Figure 39:
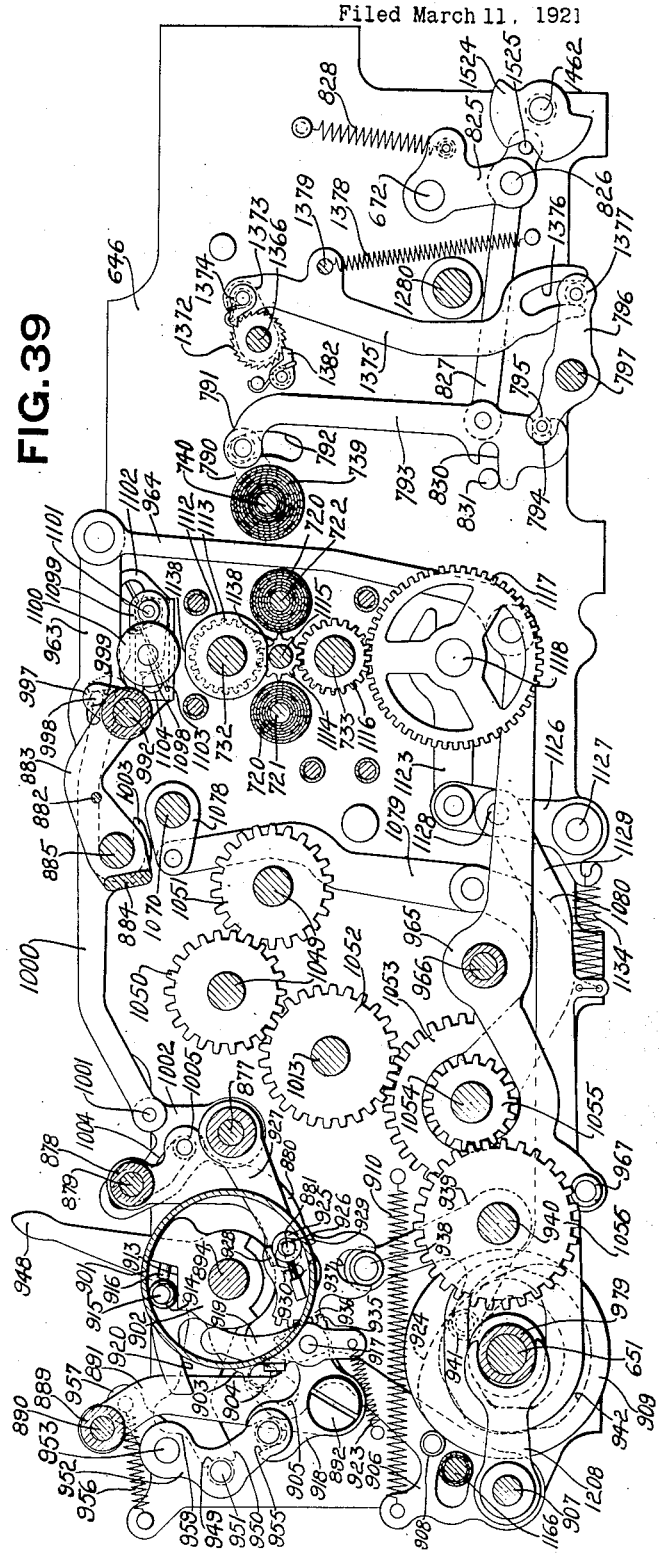

Fig. 39 is a section approximately on line 39—39 of Figs. 29 and 33 looking in the direction of the arrows.

Figure 40:
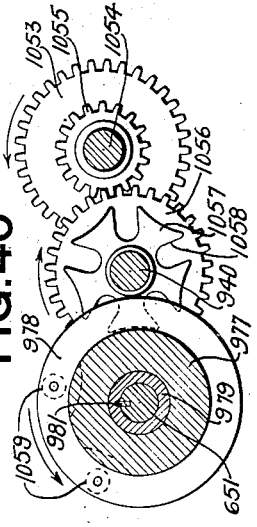

Fig. 40 is a detail view illustrating a portion of the check feeding mechanism.

Figure 41:
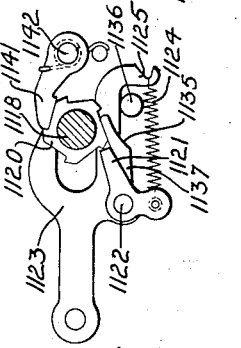

Fig. 41 is a detail view of the feeding and retaining device for the check ejecting mechanism shown in the moved position.

Figure 42:
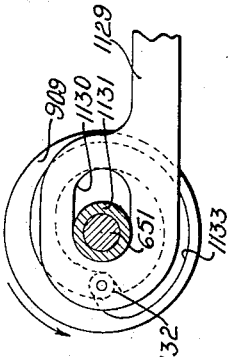

Fig. 42 is a detail view of the check ejector operating mechanism.

Figure 43:
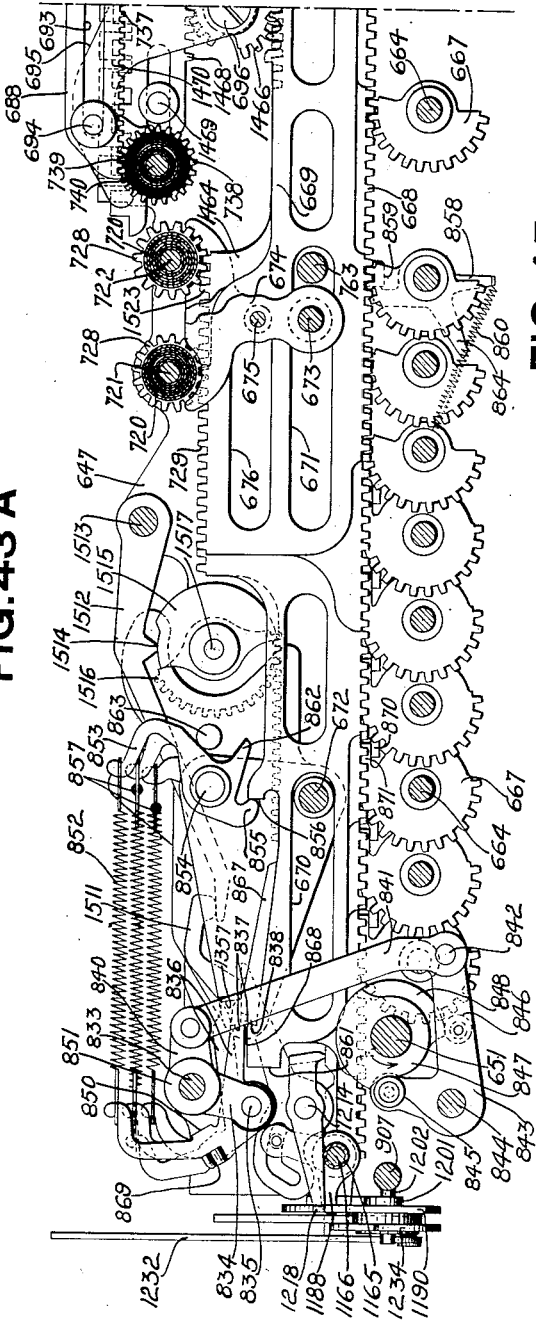

Figs. 43ᴬ and 43ᴮ together constitute a section on lines 43—43 of Figs. 29 and 33 looking in the direction of the arrows.

Figure 44:
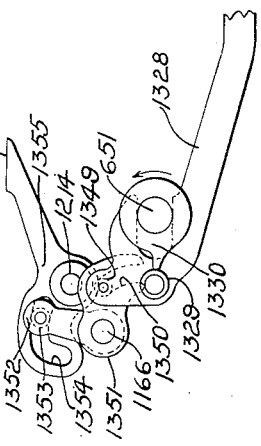

Fig. 44 is a detail view partly broken away showing the mechanism for the so-called "S" printing device.

Figure 45:
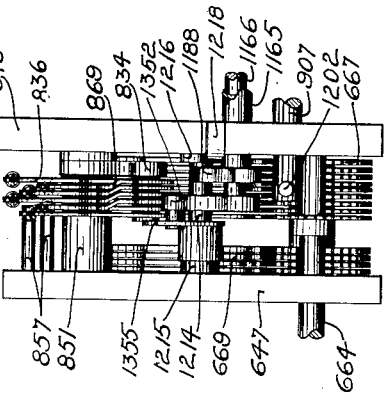

Fig. 45 is a left hand elevation partly broken away illustrating the type wheel racks, a portion of the zero elimination device and part of the automatic check control.

Fig. 46 is a detail view of the type wheel rack aligner operating mechanism.

Fig. 47 is a view partly broken away illustrating the type wheel aligning mechanism and the type wheel rack aligners.

Figure 48:
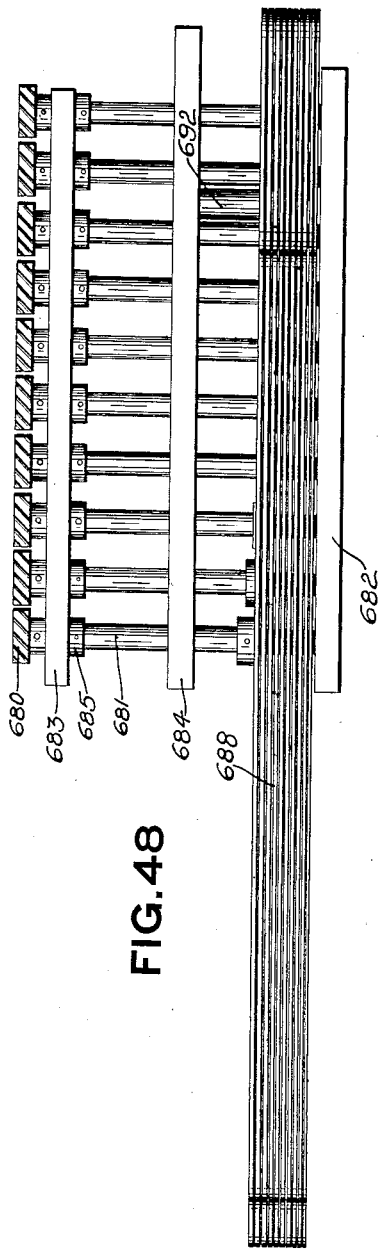

Fig. 48 is a top plan view of the ledger number type wheel racks and their driving means.

Figure 49:
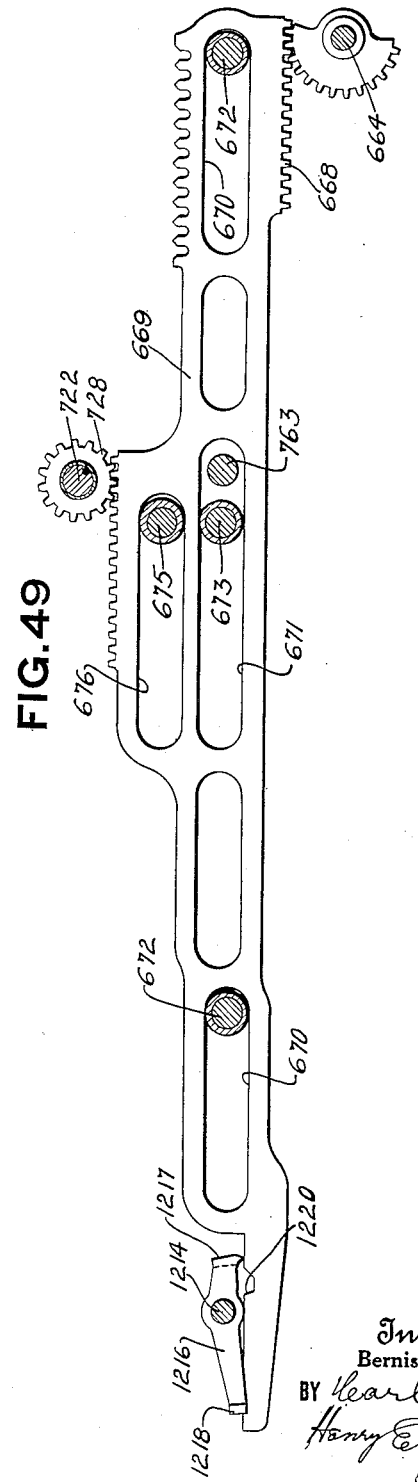

Fig. 49 is a detail view of the type wheel rack associated with the clerks' and listing key bank.

Fig. 50 is a top plan view of the type wheel line and associated tube lines for operating the same.

Fig. 51 is a horizontal sectional view through the centers of the three tube lines.

Fig. 52 is a section on line 52—52 of Fig. 50, looking in the direction of the arrows.

Fig. 53 is a view partly broken away showing the consecutive number printing mechanism.

Fig. 54 is a section on line 54—54 of Fig. 50, looking in the direction of the arrows.

Fig. 55 is a top plan view of the knife and perforator.

Fig. 56 illustrates a sample of the front of a single check as issued by the machine.

Fig. 57 illustrates a sample of the front of a stub check as issued by the machine.

Fig. 58 illustrates a sample of the back of a stub check as issued by the machine.

Fig. 59 illustrates a sample of a slip as printed by the machine.

Fig. 60 illustrates a sample of a fragmentary portion of the detail strip as printed by the machine.

Figure 61:
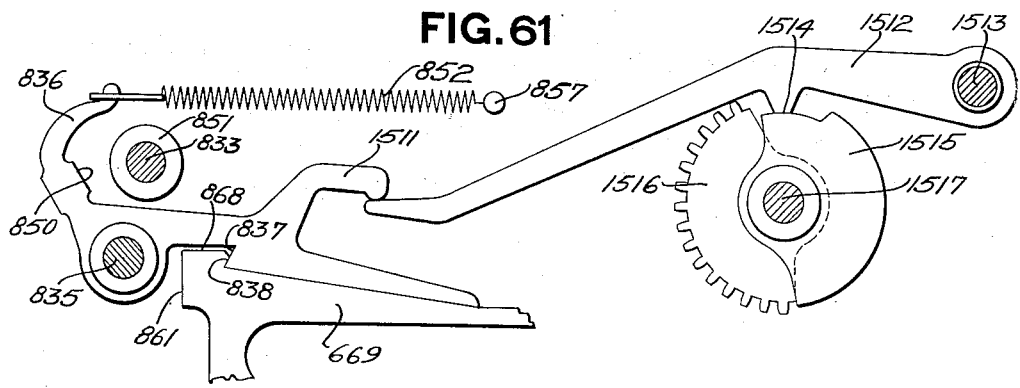

Fig. 61 is a side view of the means for crippling the elimination mechanism when an amount is set up by the highest amount rack.

Figure 62:
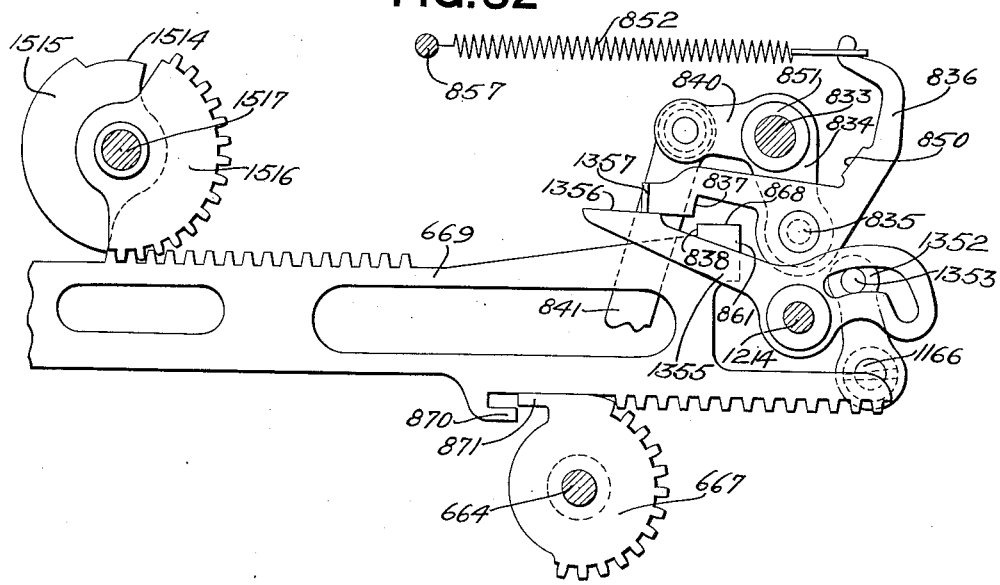

Fig. 62 is a side view taken in the opposite direction of the mechanism shown in Fig. 61.

*In general.*

Described in general terms, the machine in the preferred form comprises a plurality of totalizers, one for each key in the "1X" to "9X" bank; one for each of the regular transaction keys and one for each of the "I" to "V" keys, which are special transaction keys; one for each of the clerks' keys, and one for the "List" key. These totalizers are operated by differential mechanism under the control of manipulative means which in this case are the amount keys.

The differential mechanism provides means whereby the printing mechanism is set to print the amounts which are accumulated on the totalizers and also to print totals from said totalizers.

The printing mechanism comprises a plurality of type lines comprised of amount type wheels, date type wheels, consecutive number type wheels, and ledger number type wheels. The amount and ledger number type wheels are differentially set by means of three separate tube lines interposed between the differential racks and the type wheels. The date type wheels are set by manually operated knobs and in the usual manner. The consecutive number type wheels are operated by a differentially tined pawl. To control the ledger number type wheels there is provided in this machine a plurality of banks of depressible keys similar to the amount keys, each bank of which controls differential mechanism for positioning the tube lines associated with the ledger number type wheels.

An impression mechanism is provided for taking one impression upon a detail strip and either one or two impressions upon a check as desired. An impression device is also provided to cooperate with the lower set of type wheels for taking two impressions upon an inserted slip.

A check is issued from the machine upon depression of any of the clerks' keys or the "List" key when the manual knob is set in the "On" position. With the knob in the "Off" position a check is automatically issued upon depression of a clerk's key but not upon depression of the "List" key. In case a clerk's key is to be depressed and a check is not desired the "Slip" key may be depressed before the clerk's key is operated and thereby render the check issuing mechanism ineffective. Likewise when the total lever is moved out of adding position it also automatically throws off the check issuing mechanism.

When a check is issued it may sometimes be desired to have the check in the form of a stub check. When this is desired a manually operated knob is moved from the "Single" check to the "Stub" check position thereby rendering the machine effective to perforate a single check and make two impressions thereupon so that the check becomes a "Stub" check. Upon the check is printed the date, consecutive number, ledger number, clerk's initial, character of the transaction, the department in which the transaction is made, and a character indicating that a slip was printed, and the amount of the sale. An electrocylinder is also provided for printing any advertising matter upon the front of the check. An electrocylinder is also provided for printing advertising matter upon the back of the check.

The slip receives the same impressions from the lower set of type wheels as the check receives from the upper set of type wheels. "S" being printed upon the slip as well as the check when a slip is printed. When there is no slip printed, the "S" is not printed upon the check.

The detail strip receives an impression like the check and slip except that the date is eliminated therefrom, the detail strip being narrower than either the check or the slip. When a sub-total is taken an "X" is printed and when a final total is taken a "Z" is printed on the detail strip

*Operating mechanism.*

The motor which it is desired to use in connection with the present machine is of the well known type illustrated and described in Letters Patent of the United States No. 1,144,418, granted to Charles F. Kettering and William A. Chryst on June 29, 1915. For a detailed description of the same reference may be had to that patent. Only a part of the motor frame and the switch for the motor and a part of the clutch mechanism for the motor are shown in the accompanying drawings.

The motor is carried by a frame 75 (Fig. 2) mounted on the left side frame 76 of the machine. A clutch member 77 forming one part of the clutch device, and shown in section, is rotated through means (not shown) operated by the motor. A plate 78 forming another member of the clutch cooperates with rollers 79 and is connected thereby to the clutch member 77 upon release of the machine as fully shown and described in the aforesaid Kettering and Chryst patent. A locking plate 80 carrying the rollers 79 has a shoulder 81 engaged by the end of a lever 82 mounted on a stud 83 on the frame 76. An arm 84 of the lever 82 carries a roller 85 which normally rests upon the curved edge 86 of a lever 87 fast on a shaft 88 which extends across the entire machine and has bearings in frames 76, 89, 90 and 91 (Figs. 2, 14 and 15).

When the lever 87 is rocked counterclockwise to release the machine, as will be hereinafter described, the lever 82 is rocked counterclockwise out of engagement with the shoulder 81 by a spring 95. Counter clockwise movement of the lever 82 is limited by a stud 96 on the frame 76. Upon release of the lever 82, the plate 80 and other parts of the clutch (not shown) are moved by spring action as fully described in the above mentioned Kettering and Chryst patent. This movement of the clutch rocks a lever 97 pivotally mounted on the frame 76, in a clockwise direction. The upper end of the lever 97 engages a roller 98 carried by a lever 99 pivoted at 100 to the motor frame, and rocks said lever clockwise whereupon an insulated portion 101 of said lever moves a contact spring 102 into engagement with a contact point 103 thereby closing the circuit through the motor. The clutch member 78 is fast on a sleeve 106 mounted on a stud 107 on the frame 76. A gear 108 is fast on the sleeve 106 and meshes with a gear 109 on a stud 110 on the frame 76. The gear 109 meshes with a gear 111 fast on a cam shaft 112 mounted in the frames 76, 89, 90 and 91. Through this gearing the cam shaft 112 is rotated once at each operation of the machine.

For the purpose of restoring the lever 82 to locking position near the end of the operation of the machine, a link 113 is pivoted at 114 to said lever. The gear 109 carries a pin 115 which, near the end of the operation of the machine, engages a curved portion 116 of the link 113 and raises the link thereby moving the lever 82 clockwise to its normal position.

As will be described later, the lever 87 is rocked clockwise to normal position just before the pin 115 passes out of engagement with the link 113 in order to retain the lever 82 in its normal position.

It may sometimes be necessary to operate the machine by hand instead of using the motor. For this reason there is provided a handle 120 (Figs. 1, 14 and 15) fast on a shaft 121 mounted in the frames 90 and 91. Fast on the shaft 121 is a gear 122 (Fig. 6) meshing with a gear 123 mounted on a stud 124 projecting from the frame 89. The gear 123 meshes with a gear 125 fast on the shaft 112. The ratio of the gears 122, 123 and 125 is such that two rotations of the gear 122 will give one rotation of the gear 125 and consequently of the shaft 112.

*Key board.*

For illustrative purposes let it be assumed that the machine described herein is being used in a department store wherein it is desirable to make, a record of the amount of the sale, a record of the department in which the sale is made, a record of the particular kind of the sale or transaction, a record of the clerk who makes the transaction, and a record of the customer's ledger number.

The keyboard mechanism will now be described as being adapted for use in a store wherein the above mentioned system is in use. The keyboard comprises (Fig. 1) eight banks of amount keys 130; one bank of department keys 131, "1X" to "9X"; one bank of transaction keys comprising five keys 132 "I" to "V", which may be used to designate special transactions such as C. O. D., Exch., etc., and four keys 133 representing regular transactions such as Cash, Rec'd on Acc't, Charge and Paid Out; one bank comprising eight keys 134 representing clerks' and one key 135 bearing the inscription "List", which may be used for the purpose of releasing the operating mechanism when it is desired to add a list of numbers to get the total thereof; ten banks of ledger number keys 136; and a total lever 137 which is employed to control the machine for total and sub-total printing operations.

*Keyboard, amount key banks.*—The construction of the amount key banks is similar to those shown and described in the previously mentioned Chryst and Fuller patents.

The keys 130 of each amount bank are mounted in an individual frame 140 (Fig. 8) mounted on cross rods 141 carried by the frames 76 and 89. The keys of each bank cooperate with a key detent 142 and a locking plate 143. The detent 142 is supported at its upper and lower ends respectively by arms 144 and 145 pivoted on studs 146 mounted in the frame 140. The keys are retained in their normal outward position by compression springs 147.

When a key is depressed the inclined edge of the shoulder 148 engages a corresponding pin 149 on the detent 142 and moves said detent downward until the shoulder 148 has passed the pin. Extending across the forward edge of the arm 145 is a pin 150 on an L-shaped arm secured to a rock shaft 152 mounted in the frame 140 and upon which a zero stop pawl 151 (the purpose of which will be hereinafter described) is mounted. A spring 154 stretched between the lower end of said arm and a pin on the frame 140 normally holds the pawl in the position shown in Fig. 8. Through the pin 150 engaging the arm 145, the detent 142 is held in normal position. Downward movement of the detent 142 is against the action of the spring 154 and as the shoulder 148 passes the pin 149 the detent 142 is moved slightly upward thereby retaining the key in depressed position. Downward movement of the detent 142 through the arm 145 and pin 150 rocks zero stop pawl 151 clockwise to an ineffective position and retains it in this position as long as the key is depressed. The slight upward movement of the detent when the pin 148 passes above the shoulder 149 is not sufficient to permit the return of the pawl 151 into its normal operative relation with a differential mechanism to be hereinafter described.

The locking plate 143 is pivoted at its upper end to an arm 160 mounted on the stud 146 and at its lower end to an arm (not shown) on the lower stud 146 carried by the frame 140. The plate 143 has extensions 161 which, upon depression of any of the keys 134 or the key 135 to be hereinafter described, passes over a pin 162 of the depressed key 130 in the amount bank and under the pins 162 of the undepressed keys 130 in the amount bank, thereby locking the keys which have been depressed and rendering the keys which have not been depressed inoperative during the remaining part of the operation of the machine. In order to give the locking plate 143 the required upward movement, its supporting arm 160 has a hook 163 engaging a rod 164 carried by arms 165 fast on the shaft 88. This shaft 88 is rocked counter clockwise (Fig. 8) upon depression of any key 134 or the key 135 as will be hereinafter described, whereupon the rod 164 lifts the locking plate 143 into locking position.

*Keyboard, clerks' key banks.*—The clerks' initial keys 134 and the list key 135 are mounted in a frame 170, similar to the frame 140, carried by the rods 141. These keys cooperate with two detents 171 and 172 (Figs. 4, 10 and 12), each having slots 173 (which coincide in Fig. 10) and which cooperate with pins 174 projecting from each side of the keys 134 and the key 135, said keys being mounted between the detents 171 and 172. The detent 171 is pivoted at its upper end to an arm 175 (Figs. 4 and 12) mounted on a stud 176 carried by the frame 170. At its lower end the detent is pivoted to a lever 177 mounted on a stud 178 carried by the frame 170. The lever 177 is engaged by a pin 179 on an arm 180 pivoted on a stud 181 on the frame 170. Fast to the arm 180 is an arm 182. A spring 183 stretched between the arm 182 and a pin on the frame 170, through the engagement of the pin 179 with the lever 177, holds the detent 171 in normal position.

The detent 172 is pivoted at its upper end to an arm 185 (Fig. 10) mounted on the stud 176, and at its lower end to an arm (not shown, but similar to the lever 177) mounted on the stud 178. The detent 172 is held in normal position by a spring 186 stretched between a pin on the detent and a pin on the frame 170. The keys 134 and the key 135 are held in their normal positions by springs (not shown) like the springs 147. Depression of any of the keys 134 through the engagement of the pin 174 with the slots 173 moves the detents 171 and 172 downward. Depression of the key 135 moves the detent 172 downward but does not move the detent 171 because the slot 173 of this detent 171 opposite the key 135 has one straight side (Fig. 10) and therefore the pin 174 has no effect upon the detent 171. The reason for the straight sided slot opposite the key 135 will be hereinafter explained.

This bank of keys 134 and the key 135 are, in this particular machine, the release keys for the driving mechanism.

By means to be hereinafter described the shaft 88 when released is rocked counter-clockwise (Fig. 10). The arm 185 carries a pin 190 (Figs. 4 and 10) projecting into a slot in an arm 191 integral with a casting 192 loose on a shaft 193 mounted in the frames 76 and 89. Integral with the casting 192 is an arm 194 engaging a flattened stud 195 on an arm 196 loose on the shaft 88. Integral with the arm 196 is an arm 197 engaging a pin 198 on an arm 199 fast on the shaft 88. Depression of the keys 134 or the key 135, through the downward movement of the detent 172, rocks the arm 185 counterclockwise (Fig. 10), thereby through the pin 190 rocking the arm 191 and the integral arm 194 clockwise. As the arm 194 is disengaged from the stud 195 the arms 196 and 197 are, through the pin 198 and arm 199, rocked counterclockwise (Fig. 10) whereby the stud 195 is moved beneath the arm 194.

Before the key 134 or a key 135 can be depressed to release the machine as just described, it is necessary to depress one of the keys 132 or 133 because of an interlocking mechanism arranged between these two banks of keys.

Figure 4:
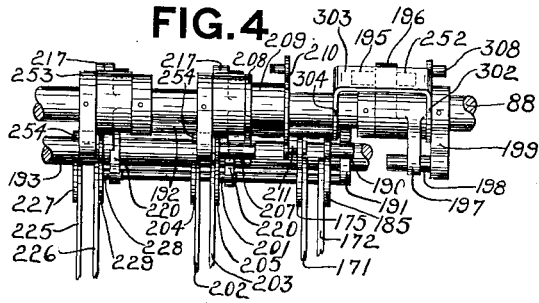
Fig. 4 is a top plan view, partly broken away, showing how the control key banks cooperate with the key lock shaft.
Figure 5:
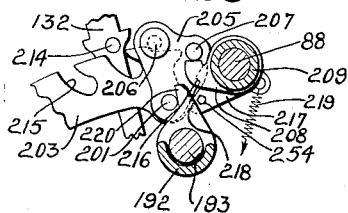
Fig. 5 is a detail view partly broken away illustrating how the transaction bank cooperates with the key lock shaft.

*Keyboard, transaction key banks.*—The keys 132 and 133 cooperate with two detents 202 and 203 (Figs. 4 and 5). These keys 132 and 133 are mounted in a frame similar to the frame 170. The detent 202 is pivoted at its upper end to an arm 204 (Fig. 4) pivoted in a manner similar to the arm 185 previously described, and at its lower end to a lever similar to the lever 177 and similarly mounted. The detent 203 is pivoted at its upper end on a stud 201 carried by a lever 205 (Fig. 5) pivoted on a stud 206 mounted in the key frame associated with this bank. The lever 205 carries a pin 207 normally engaging an arm 208 secured to a hub 209 loose on the shaft 88. Fast on the hub 209 is a lever 210 carrying a flattened stud 211 (Figs. 4 and 12) cooperating with a notch 212 in the previously described arm 175 to which is pivoted the detent 171. A spring 213 stretched between the lever 210 and an element to be later described normally holds the arm 208 in engagement with the pin 207 (Fig. 5). When one of the keys 132 or 133 is depressed its pin 214 by its engagement with a slot 215 in the detent 203 moves the said detent downward thereby rocking the lever 205 clockwise. This movement through the pin 207 rocks the arm 208 counter clockwise whereby through the hub 209, the lever 210 is rocked clockwise (Fig. 12) and disengages the pin 211 from the notch 212 in the arm 175 thereby allowing said arm to be rocked counter clockwise by the detent 171 upon depression of any of the keys 134.

Means are provided for retaining the depressed key 132 or 133 in the depressed position until after one of the keys 134 has been operated. Cooperating with a shoulder 216 (Fig. 5) on the lever 205 is an arm 217 having a notch 218. The arm 217 is normally held against the edge of the lever 205 by a spring 219 stretched between said arm and one of the differential unit plates to be hereinafter described. When a key 132 is depressed and the lever 205 is rocked counter clockwise the notch 218 engages the shoulder 216 and retains detent 203 in its moved position which holds the key in its depressed position.

After one of the keys 134 is depressed and the machine released an arm 220 (Figs. 4 and 5), integral with the casting 192, is rocked into engagement with the pivot stud 201 of the detent 203 so as to positively hold the detent 203 in the moved position during an operation of the machine.

*Keyboard—Department key banks.*—The keys 131 of the department bank and the mechanism cooperating therewith are similar to the other two banks of keys just described. These keys cooperate with detents 225 and 226 (Fig. 4). The upper end of the detent 225 is pivoted to an arm 227 and mounted in a frame similar to the frame 170. The lower end of this detent is pivoted to a lever similar to the lever 177 of the clerks' bank. The detent 226 is pivoted on a pin 228 of an arm 229 mounted in the key frame for this bank. The lower end of this detent is pivoted to an arm (not shown) similar to the arm 145 of the amount banks.

There is no interlocking mechanism between this bank of keys and the other two banks to force a depression of a key in this bank before a key in any of the other banks can be depressed. However, there is a device for retaining these keys in depressed position. Cooperating with this key bank is another arm 217 (Fig. 4) loose on the shaft 88 which cooperates with a shoulder (not shown) on the arm 229 to retain the key in depressed position until one of the keys 134 is depressed to release the machine. Another arm 220 integral with the casting 192 cooperates with the pin 228 to positively lock the keys in depressed position after one of the keys 134 has been depressed.

Figure 6:
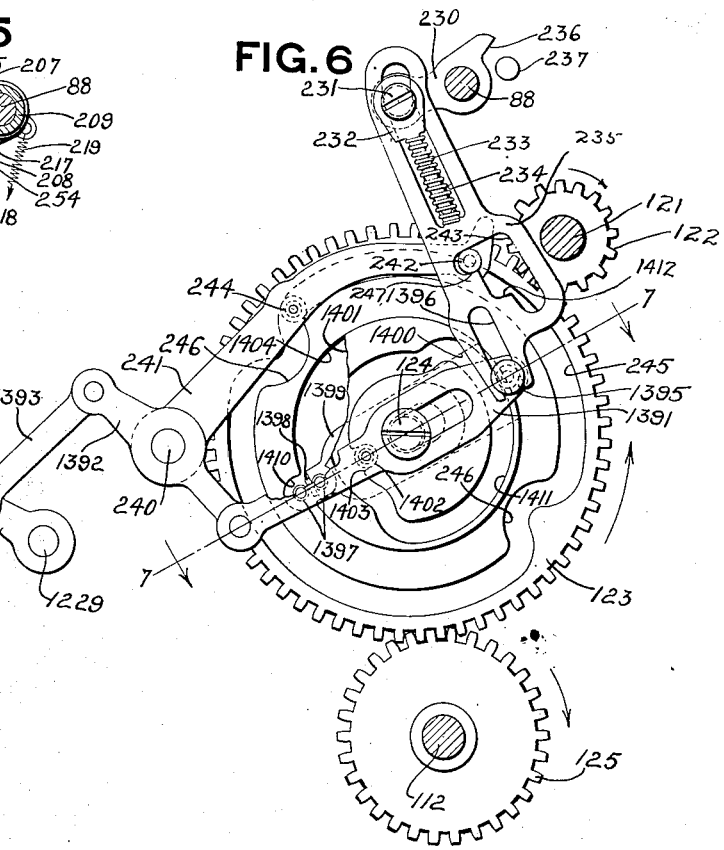
Fig. 6 is a side elevation of the mechanism for causing two revolutions of the main operating shaft during a totalizing operation.

The means for rocking the shaft 88 counter clockwise as viewed in Fig. 2 and clockwise as viewed in Fig. 6 to release the motor clutch mechanism, previously described, comprises a lever 230 (Fig. 6) fast on said shaft. The lever 230 carries a screw stud 231 upon which are pivoted two members 232, the lower ends of which are surrounded by a coil spring 233 compressed between shoulders on the members 232 and the end of a slot 234 in a link 235 also surrounding the stud 231. From this it can be seen that, as soon as the arm 194 is released from the stud 195 by depression of one of the keys 134 or the key 135, the spring 233 will rock the lever 230 and consequently the shaft 88 clockwise (Fig. 6) and counterclockwise (Fig. 10). This movement is limited by a projection 236 on the lever 230, contacting with a stud 237 on the frame 89.

When it is desired to use the machine to sum up or to get the total of a various number of amounts, which may in no way be related to any department, transaction or clerk, the "List" key 135 is used to release the motor mechanism to operate the machine. The interlocking mechanism above described between the transaction keys and the clerks' keys has no effect upon the list key 135 for the reason that as previously pointed out the slot 173 in the detent 171 opposite said key has a straight side. Therefore when this key is depressed this detent 171 receives no movement. As the detent 171 is not moved by depression of the key 135 there is no necessity for disengaging the stud 211 from the notch 212 in the arm 175 to which the detent 171 is pivoted. However, the slot 173 in the detent 172 which cooperates with the key 135 is curved, thereby causing a downward movement of said detent and rocking the arm 194 clockwise to disengage it from the stud 195 to allow the spring 233 to rock the shaft 88 and thereby close the motor switch.

*Keyboard—Automatic key release.*—Near the end of the operation of the machine, all of the depressed amount, department, transaction, and clerks' keys are released so that they may be restored to their normal position by their springs.

Figure 8:
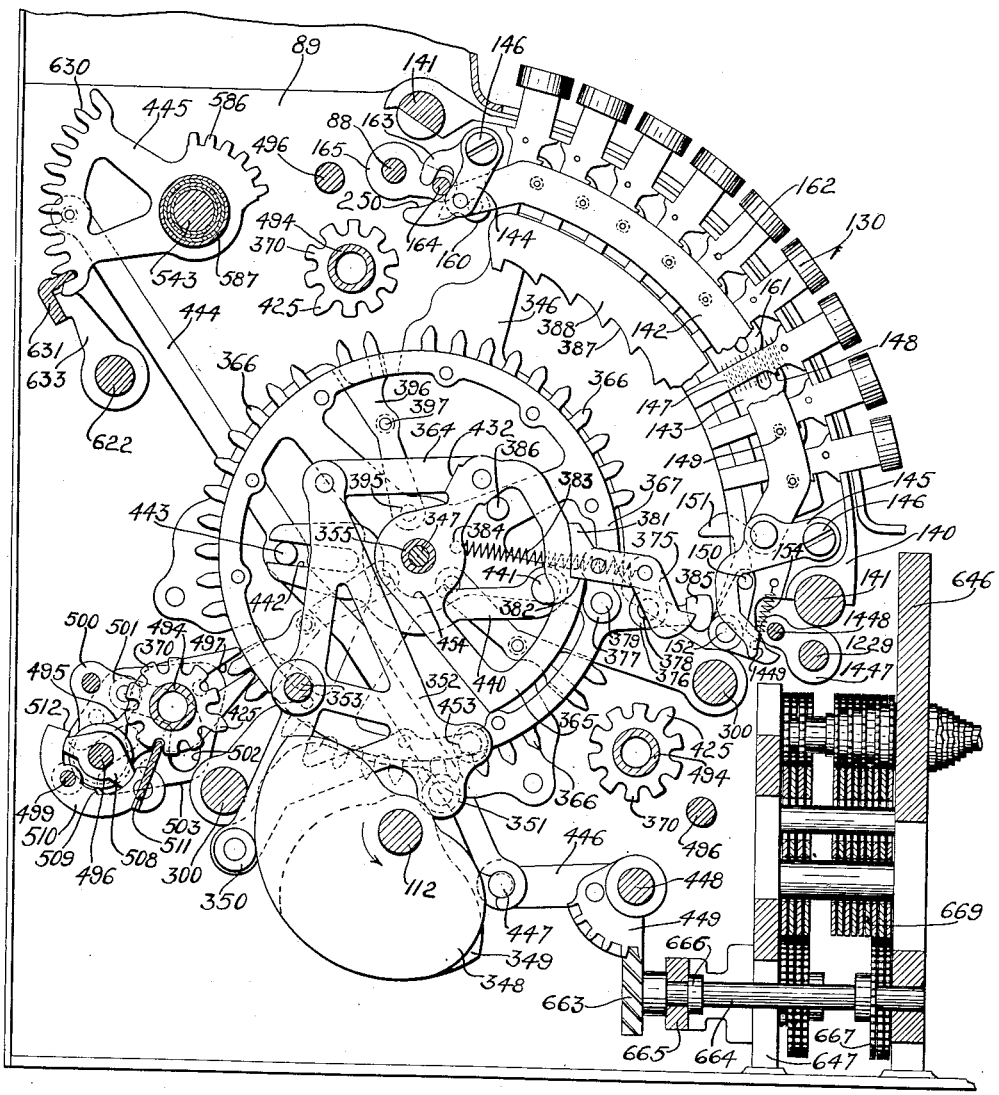
Fig. 8 is a section alongside one of the amount banks, the inside key cover being removed and a part of the flexible detent broken away to show the key shanks.

Pivoted on a stud 240 on the frame 89 is a lever 241 carying a pin 242 projecting into an opening 243 in the above described link 235. The lever 241 carries an antifriction roller 244 projecting into a cam groove 245 in the gear 123. It will be remembered that this gear receives one-half a revolution at each adding operation of the machine. Therefore there are two cam portions 246 in the groove 245. The stud 242 normally rests on a shoulder 247. Near the end of the half rotation of the gear 123 one of the cam portions 246 through the roller 244 rocks the lever 241 clockwise and the stud 242 moves the link 235 downward in the direction of its length whereby the upper part of the slot 234 engages the stud 231 and rocks the lever 230 and the shaft 88 first counter clockwise past normal position and then clockwise to normal position. This movement, in Figs. 8 and 10 is first clockwise and then counter clockwise to normal position. As the rod 164 (Fig. 8) is carried by the arms 165 fast on the shaft 88 said rod is lowered past normal position and engages a projection 250 on the arm 144 supporting the upper end of the detent 142 and forces the detent downward. The locking plate 143 is moved to normal position by this downward rocking of the rod 164 before said rod passes its normal position and said plate is retained in normal position during the continued movement of the rod 164 past normal position so that the springs 147 are permitted to restore the depressed keys to undepressed position. The above described movement of the shaft 88 also effects the release of the department, transaction, clerks' keys, and the list key, and the restoration of all of the detents in these various banks to their normal positions.

Loose on the shaft 193 is a lever 251 (Fig. 10), the upper end of which normally engages the pin 198 the rearward end of which normally engages a pin 252 (Fig. 4), which coincides with the stud 195 in Fig. 10. As arm 199 is fast on the shaft 88 clockwise movement thereof through the pin 198 rocks the lever 251 clockwise whereby the rear portion of said lever through its engagement with the pin 252 rocks the arm 196 clockwise a little past its normal position so that the stud 195 is carried away from beneath the arm 194. Continued downward movement of the arm 199 after the arm 196 has been moved slightly past normal position rocks the lever 251 no further because the pin 198 passes out of engagement with the camming edge of said lever. As the stud 195 is carried away from beneath the arm 194 the springs 186 and 183 raise the detents 171 and 172 whereby the arm 191, casting 192 and the integral arm 194 are moved counter clockwise to normal position so that the end of the arm 194 is again in front of the stud 195.

The means for releasing the department keys 131 and the transaction keys 132 and 133 comprises two arms 253 (Fig. 4) fast on the shaft 88. These arms engage pins 254 carried by the arms 217 and rock said arms counterclockwise (Fig. 5) to disengage their shoulders 218 from the arms 205 and 229 thereby allowing the springs in these particular banks to restore the detents to their normal position so that the key springs can return the keys to undepressed position.

In order to prevent the operator from retaining one of the keys 134 or the key 135 depressed until the end of one complete operation of the machine and thereby prevent return of the detents 171 and 172 and the casting 192 to normal position, for the purpose of causing an immediate second operation of the machine, a lever 260 (Fig. 10) is employed. This lever is loose on the shaft 193 and a spring 261 connected to said lever and to the arm 194 normally retains the upper edge of the lever in engagement with the arm 194 (Fig. 10). The lever 260 is slightly longer than the arm 194 so that, when the arm 194 is raised out of the path of the stud 195 to permit the release of the machine as above described, said stud 195 passes between the arm 194 and the lever 260. Therefore if a clerk's key or the list key is held in depressed position until the end of the operation, the detent 172 and casting 192 are held in moved position, and when the stud 195 is moved rearwardly slightly past the normal position, as above described, the spring 261 pulls the lever 260 upwardly into engagement with the flat side of the stud 195. Therefore the arm 196 can not be rocked counter clockwise (Fig. 10) and in this way a second operation is prevented. Then when the operator removes his finger from the depressed clerk's key the spring 186 for the detent 172 restores this detent and casting 192 to normal position and the arm 194 moves the lever 260 downwardly from in front of the stud 195 so that the stud 195 can again assume its normal position with the end of the arm 194 in engagement with the stud 195.

*Keyboard—Ledger No. key banks.*—The keys 136 (Figs. 14 and 16) which control printing mechanism, to be hereinafter described, for printing the ledger numbers are mounted in frame 265 mounted on rods 266 and 267 carried by the frames 90 and 91. The keys are held in place by frames 268 also carried by the rods 266 and 267. Each key 136 has a flattened pin 269 which cooperates with projections 270 of a plate 271 integral with an arm 272 loose on a shaft 273 mounted in the frames 90 and 91. The projections 270 are held against the pins 269 by a spring 274 stretched between the plate 271 and a rod 275 mounted between the frames 90 and 91. The keys are held in their normal position by springs 276.

When a key 136 is depressed its pin 269 moves the plate 271 and arm 272 clockwise until the pin is below the projection 270 whereupon the spring 274 returns the plate and arm to normal thus locking the key in depressed position.

Figure 16:
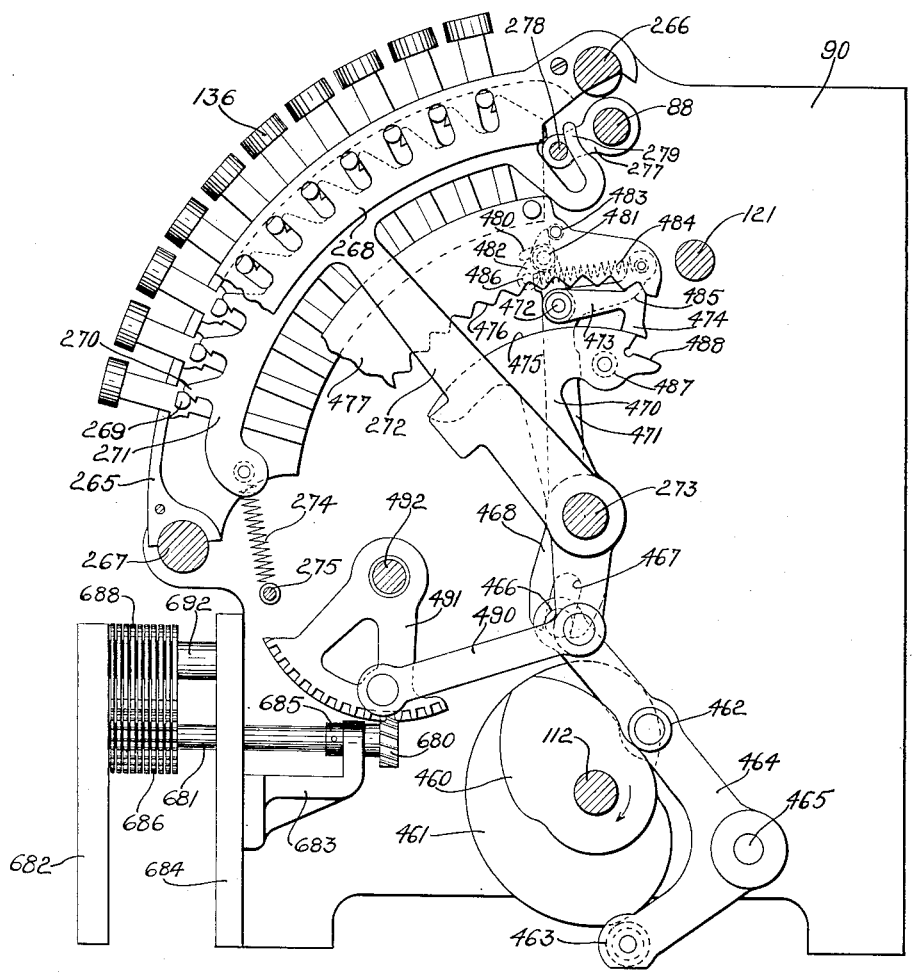
Fig. 16 is a section on line 16—16 of Fig. 14, looking in the direction of the arrows.

When the amount, department, transaction and clerks' keys are released so that they may assume their normal positions near the end of the operation of the machine, the ledger keys 136 are also released at the same time. For accomplishing the release of the keys 136 there are two arms 277 (only one of which is shown in Fig. 16), carrying between them a rod 278 engaging a hook 279 integral with the plate 271. When the operating mechanism is released and the shaft 88 is moved clockwise (Fig. 16) the rod 278 does not move the plate 271. But as the shaft 88 is rocked counter clockwise to cause the release of the amount, department, transaction and clerks' keys the rod 278 through its engagement with the hook 279 rocks the plate 271 and arm 272 clockwise thereby disengaging the projection 270 from the pin 269 and the spring 276 returns the depressed key 136 to normal after which the shaft 88 is rocked clockwise (Fig. 16) to normal thereby allowing the spring 274 to return the plate 271 and arm 272 to the normal.

*Keyboard—Manual key release.*—Should the operator depress the wrong amount, department, transaction or ledger number keys, they may be released by a manually operated lever before one of the clerks' keys 134 or the list key 135 is operated. Secured to the shaft 88 is a lever 280 (Figs. 14 and 15) having fast thereto a handle 281 (Fig. 1) projecting through the cabinet of the machine. As previously described the shaft 88 is rocked first counterclockwise (Fig. 15) and then clockwise to normal position to effect the release of the keys. Therefore should the operator desire to release any of the depressed keys before the clerks' initial keys are depressed the handle 281 is moved upward and forward (Fig. 1) thereby oscillating the shaft 88 counterclockwise (Fig. 15) and, through the mechanism previously described releasing the depressed keys and allowing them to be restored to normal position after which the lever 280 is rocked clockwise to normal.

After depression of the clerks' key 134 or the key 135 this mechanism can not be used because depression of either of these keys releases the operating mechanism for the motor whereby the machine is operated and positively locks all depressed keys in and all undepressed keys out until just before the very end of the operation of the machine as above described.

Associated with the lever 280 is a locking device. Pivoted on a stud 283 on the frame 91 (Figs. 14 and 15) is a bell crank 284 having pivoted thereto a link 285 which is eccentrically mounted on a barrel 286 of a lock secured to the frame 91. When it is desired to lock the machine against operation the operator moves the lever 280 counter clockwise (Fig. 15) so that a projection 288 integral therewith is moved below a projection 289 of the bell crank 284. A key 287 is then inserted in the lock barrel 286 and turned, thereby moving the link 285 and rocking the bell crank 284 clockwise whereby the projection 289 engages the projection 288 and holds the lever 280 in the moved position.

As above described, when the shaft 88 is rocked counter clockwise (Fig. 16), it moves the plate 271 and arm 272 clockwise, and therefore, if said shaft is held in the moved position it can be readily seen that, while the ledger keys 136 may be depressed the spring 274 can not move the plate 271 to lock the keys in the depressed position. Likewise with regard to the amount, department, transaction, and clerks' keys, while they may all be depressed they will not remain in depressed position because their locking and retaining detents have been disabled by retaining the shaft 88 in its moved position.

*Keyboard—Total lever.*—The total lever 137 is integral with a nearly circular plate 295 (Figs. 21^A and 25) loose on a sleeve 296, the purpose of which will be hereinafter described, surrounding a rod 297, one end of which is carried by a plate 298, the other end being held by a screw 301 (Fig. 21^B) in the frame 89. The plate 298 has two arms 299 mounted on rods 300 extending between the frames 76 and 89. This total lever 137 through mechanism to be hereinafter described controls the machine for total and sub-total taking operations.

*Keyboard—Interlocks.*—An interlocking mechanism is provided which cooperates with key lock shaft 88 and the total lever plate 295 for preventing movement of the shaft 88 to prevent release of the operating mechanism when the lever 137 is out of any of its seven various positions. This mechanism also locks the total lever in the position to which it has been moved until the completion of the operation of the main mechanism. Loose on the shaft 88 is an arm 302 (Figs. 4 and 22) having integral therewith a yoke 303 also integral with an arm 304 loose on the shaft 88. The arm 304 has a slot 305 surrounding a pin 306 on an arm integral with the casting 192. The arm 302 carries a pin 308 normally engaging the upper surface of an arm 309 loose on the shaft 193. Integral with the arm 309 is a yoke 310 having integral therewith an arm 311 loose on the shaft 193. A spring 312 holds the arm 309 in engagement with the pin 308.

As previously described the casting 192 is rocked counterclockwise (Fig. 22) upon depression of any one of the clerks' keys 134 or the list key 135. This movement through the pin 306 rocks the arms 304 and 302 clockwise whereby the pin 308 rocks the arm 309 clockwise so that a right angle portion 313 thereof engages a notch 314 in the plate 295. There is a notch 314 for each of the seven positions of the total lever 137. If the total lever is not in the exact position the portion 313 of the arm 309 strikes the true periphery of the plate 295 and prevents the arm 302 from being rocked consequently preventing the retaining of one of the keys 134 or the key 135 in depressed position to release the operating mechanism. The arm 311 carries a roller 315 normally resting in a curved portion 316 (Fig. 21ᴮ) in the periphery of a spider 317 which is oscillated first clockwise and then counter clockwise (Fig. 21ᴮ) for a purpose and by means to be hereinafter described. Clockwise movement of said spider forces the roller 315 from the portion 316 onto the periphery 318 of the spider 317 thereby positively holding the portion 313 of the arm 309 in engagement with the notch 314 during the time the totalizers are being rocked into and out of engagement with their actuating mechanism.

As viewed in Figs. 1, 21ᴬ and 25 the total lever 137 is shown in its normal adding position. As shown in Fig. 1 there are three positions below the total lever which are the positions to which said lever is set for controlling the machine for taking totals. There are also three positions above the total lever which are the positions in which the total lever is set for controlling the machine for the taking of sub-totals. These total and sub-total operations and the methods for taking them will be hereinafter described.

When any of the amount keys 130 are depressed it is very essential that the total lever 137 be in its adding position before any of the keys 134 or the key 135 are depressed to release the operating mechanism. One of the amount keys 130 may be depressed and the operator may accidentally move the lever 137 out of its adding position and then depress one of the keys 134 to release the machine. If the machine were allowed to be released under this condition, that is, with the total lever out of its proper adding position, some of the various mechanisms in the machine would have interferences with each other and cause jamming which would render the machine useless.

To prevent this there is loose on the shaft 193 a bell crank 320 (Figs. 21ᴬ and 25) to which is pivoted a link 321 also pivoted to a lever 322 mounted on a stud 323 carried by a plate 324 (Fig. 21ᴮ) mounted on the rods 300. Also pivoted upon the stud 323 is a lever 325 the rear arm of which carries a pin 326 projecting into a slot 327 in the plate 295. The lever 322 carries a stud 328 projecting into a slot 329 in the lever 325. A spring 330 compressed between extensions on the levers 322 and 325 holds them in the positions shown in Figs. 21ᴬ and 25. From the above description it can be clearly seen that if any of the amount keys 130 are depressed and the total lever 137 accidentally moved either up or down, before one of the keys 134 or the key 135 is depressed, that such movement of the lever 137 will, through the pin 326 and slot 327 rock the lever 325 counterclockwise. Counter clockwise movement of the lever 325 through the spring 330 rocks the lever 322 counterclockwise and through the link 321 rocks the bell crank 320 clockwise and moves the edge 331 thereof in front of the pin 252. Further movement of said bell crank is prevented by means to be hereinafter described in connection with totalizing operations, thereby preventing the arm 196 and consequently the shaft 88 from being rocked to release the operating mechanism.

When the total lever 137 is in adding position and the shaft 88 rocked by depression of any of the keys 134 or the key 135 to release the operating mechanism, the pin 252 is rocked beneath the bell crank 320, thereby preventing any movement of the total lever 137 out of its adding position.

*Differential mechanism.*

The differential mechanism of the machine is employed differentially to operate the different totalizers and to select them for operation and also to set type carriers in the printing mechanism as controlled by the banks of amount keys and the banks of control keys. The amount differential mechanism will be described first.

Figure 9:
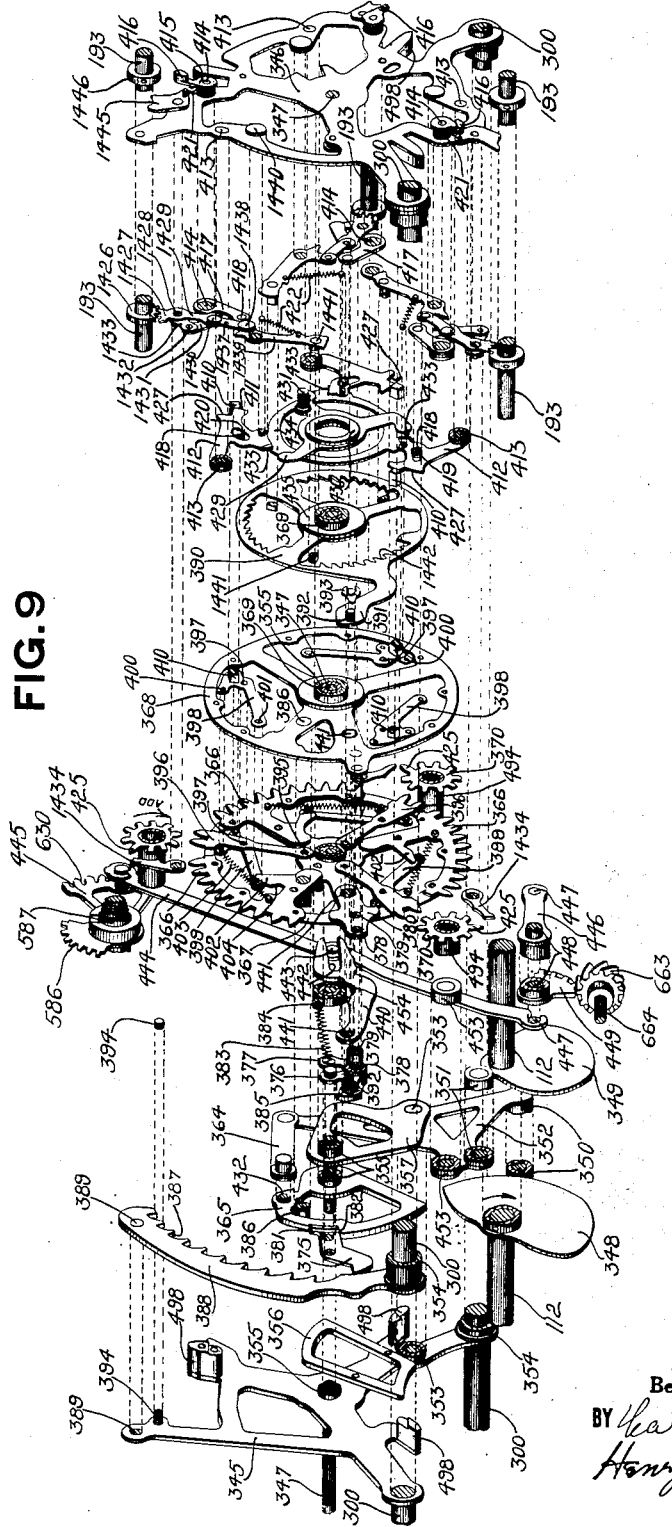
Fig. 9 is a disunited perspective view illustrating one unit of the amount differential mechanism.

*Differential—Amount banks.*—There is a differential unit for each of the eight amount key banks and one extra unit of highest denomination which is operated in adding operations only when a transfer to it is necessary. Fig. 9 is a disunited perspective view of one of these differential units. Each unit is supported by plates 345 and 346 mounted on the rods 300. A rod 347 extends through all of the differential units including the transaction, department and clerks' units and acts as a stabilizer for said units.

Each differential unit is driven by a pair of cams 348 and 349 fast on the shaft 112. Said cams cooperate with rollers 350 and 351 respectively on a Y-shaped lever 352 pivoted on a stud 353 on the plate 345. Hubs 354 on the rods 300 and a hub 355 on the rod 347 properly space the plates 346 and 345. A plate 356 secured to the plate 345 spaces the lever 352 from the plate 345. Another plate 357 mounted on the stud 353 and the hub 355 also acts as a spacer for the lever 352. The pairs of cams 348 and 349 are arranged spirally on the shaft 112, that is, the units cams are set slightly ahead of the tens cams, the tens cams slightly ahead of the hundreds cams, etc. This arrangement of cams is illustrated in the above mentioned Chryst Patent No. 1,230,864 and is for the purpose of making the transfer mechanism to be hereinafter described, positively operated and also to render the machine easier in its operation.

To the upper end of the lever 352 is pivoted a link 364 which is pivoted to a segment 365 loose on the hub 355. Clockwise movement of the cams 348 and 349 (Fig. 9) oscillates the lever 352 first clockwise and then counter clockwise to normal position. This movement through the link 364 rocks the segment 365 first clockwise and then counter clockwise to its normal position. As viewed in Fig. 8 this movement of the segment 365 is first counter clockwise and then clockwise.

There are three differentially movable segments 366, mounted between two nearly circular plates 367 and 368 having fast thereto a hub 369 loose on the hub 355. The segments 366 operate totalizer pinions 370 of the upper, front and back totalizer lines to be hereinafter described. The segments 366, plates 367 and 368 are secured together so that they move as a unit. The differentially movable plates 367 and 368 are connected to the invariably movable segment 365 by a latch 375 carried by arms 376 and 377 pivoted at 378 and 379 respectively to the plates 367 and 368 and a block 380 secured between the two plates. A foot 381 of the latch 375 is normally held in engagement with the segment 365 above a shoulder 382 by a spring 383 stretched between the upper end of the arm 376 and a pin 384 carried by the plates 367 and 368.

By this latch connection the plates 367 and 368 and segments 366 are rotated clockwise (Fig. 9), counter clockwise (Fig. 8) until an arm 385 integral with the arm 376 strikes the end of a depressed key. When this occurs the arms 385, 376 and 377 are rotated clockwise (Fig. 8) or counter clockwise (Fig. 9) thereby disengaging the foot 381 from the shoulder 382. When this occurs the foot 381 rides upon the outer periphery of the segment 365 as said segment continues its invariable movement. When the latch is thus broken the forward end thereof engages a notch 387, opposite the depressed key, in a plate 388 mounted on the rod 300 and riveted at 389 to the plate 345. There are ten notches 387 in the plate 388, one for each of the nine keys and one at the zero position. When there is no amount key depressed the latch is broken in the zero position. Adjacent the plate 368, and loose on the hub 369, is a plate 390 having integral therewith an arm 391. Said arm surrounds a shouldered stud 392 carried by the arm 385. A clip 393 in a groove (not shown) in the stud 392, holds the arm 391 in proper lateral position. The arm 391 is in the plane of the zero stop pawl 151 (Fig. 8) and when there is no key depressed the upper edge of the arm 391 strikes the pawl 151 whereby the arms 376, 377 and 385 are rocked and disengage the latch 375 from the driving segment 365. Secured to the plate 355 (Fig. 9) is a pin 394 which is employed to break the latch at the position opposite the ninth key, if the machine for any reason should be operated without the key bank in place such as when the units are being assembled into the machine. As soon as the latch 375 is disengaged from the segment 365 the segments 366 and the plates 367 and 368 stop rotating. When the segment 365 is rocked clockwise (Fig. 8), counter clockwise (Fig. 9) it engages a pin 386 carried by the plates 367 and 368 and rotates the said plates to their normal position during which time the segments 366 add upon the totalizer pinions 370. The time which the segment 365 engages the pin 386 may vary according to the key which has been depressed. In other words if the "2" key has been depressed the segment 365 does not engage the pin 386 until near the end of its movement. However, if the "9" key has been depressed and the latch broken at 9 the pin 386 is engaged immediately upon the return movement of the segment 365 thereby causing a greater rotation of the totalizer pinion 370. The totalizer pinions 370 are by means to be hereinafter described rocked into engagement with the segment 366 just after the latches 375 have been broken so that as the segments 366 are returned to their normal positions the amounts as determined by the depressed keys are accumulated on said pinions.

*Differential—Transfer.*—When one of the totalizer pinions 370 passes from the "9" to the "0" there is a transfer mechanism for causing 1 to be added upon the totalizer pinion of next higher denomination. Pivotally mounted between the plates 367 and 368 on pins 395 (Fig. 9) are three arms 396 each having two teeth like the teeth of the segments 366. These arms are in the plane of said segments.

The transfer tripping mechanisms associated with these arms 396 for the three totalizer lines are identically the same, and therefore the trip mechanism for the upper line will be described but the same reference numerals will be applied to the mechanism associated with the other totalizer lines. Pivoted to the arm 396 by a pin 397 are levers 398 and 399. These levers are secured to each other by rivets 400 so that they move in unison. The levers 398 and 399 are also connected by a pin 401 held in engagement with a projection 402 integral with the segment 366 by a spring 403 stretched between the levers 398 and 399 and the plates 367 and 368. These springs 403, during the clockwise movement of the plates 367 and 368 hold the arms 396 in such a position that the pin 401 is locked in a recess 404 so that the segment 366 and arm 396 move as a unit. The lever 398 has secured thereto a square stud 410 which normally abuts an end 411 of a transfer lever 412, mounted on a stud 413 on the plate 346, when the differential segments 366 arrive at zero position. These segments are normally given two units of movement counter clockwise beyond zero position to normal position and consequently the abutment of the stud 410 with the end 411 causes the levers 398 and 399 to be rocked slightly clockwise around the pivot 397 whereby the pin 401 becomes disengaged from the notch 404 and assumes the position shown in Fig. 9. Consequently the segment 366 normally moves two units farther than the teeth of the arm 396.

Fast on a short shaft 414 supported by the plate 346 is an arm 415 having a projection 416 which lies in the plane of the totalizer pinion 370 of the next lower denomination from that shown in Fig. 9. Also fast on the shaft 414 is an arm 417 carrying a flattened pin 418 held in engagement with a shoulder 419, of an opening 420 in the transfer lever 412, by a torsion spring 421 one end of which is secured in the plate 346 and the other end secured to the arm 415. A spring 422 stretched between the lever 412 and a lever to be hereinafter described also helps to hold the pin 418 into engagement with the shoulder 419.

Each of the totalizer pinions has a long tooth 425 so located that, as said pinion passes from "9" to "0" the long tooth engages the projection 416 and rocks the arm 415 counter clockwise (Fig. 9). This movement disengages the pin 418 from the shoulder 419 and the spring 422 rocks the lever 412 clockwise and carries the end 411 out of engagement with the square stud 410 and brings a shoulder 427 into the path of movement of the stud 410 to regulate the movement of the arm 396. When this occurs the arm 396 remains locked to the segment 366 during the first extra unit of movement past the zero position which said segment receives as previously described, thereby causing 1 to be added upon the totalizer pinion 370 of the next higher denomination.

After an adding operation all displaced transfer devices are restored to normal position at the next operation of the machine by a three-armed lever 429 loose on the hub 369. The lever carries a pin 431 engaged by an edge 432 of the segment 365 in the next lower bank, near the end of the clockwise movement of said segment (Fig. 9). When the pin 431 is engaged by the segment 365 the three arms of the lever 429 engage portions 433 of the levers 412 and rock said levers counter clockwise until the pin 418 again engages the shoulder 419 of the opening 420. By this means the transfer trip arms 415 are restored to their normal position by the spring 421. A thin disc 434 secured to the lever 429 always insures the engagement of the arms of said lever with the levers 412. A washer 435 adjacent the plate 390, and a hub 436 secured to the lever 429 insures the proper side spacing of said lever.

The differentially movable plates 367 and 368 and the segments 366 are also controlled as to movement by other mechanism illustrated in Fig. 9 which will be hereinafter described in connection with the total and sub-total taking operation.

Associated with the differential mechanism is a beam 440 (Figs. 8 and 9) pivoted on a stud 441 carried by the plates 367 and 368. The beam 440 has a slot 442 receiving a pin 443 on a link 444 pivoted to segment 445 to be hereinafter described in connection with the indicating mechanism. Said link 444 is connected to an arm 446 by a pin 447 on said arm, loose on a rod 448 mounted in the frames 76 and 89. Fast to the arm 446 is a spiral segment 449 the purpose of which will be hereinafter described in connection with the printing mechanism.

From the above description it can be seen that the end of the beam 440 which is pivoted on the stud 441 is differentially positioned when the plates 367 and 368 are differentially set under the control of the depressed keys.

As previously described the lever 352 through the link 364 and the segment 365 drives the plates 367 and 368 until the latch 375 is broken by a depressed key. This lever 352 carries a roller 453 which, upon clockwise (Fig. 9) movement of the lever 352 engages the lower edge of the beam 440 near the center thereof and rocks said beam around the stud 441 until a surface 454 of said beam engages the periphery of the hub 369 which extends through the plates 367 and 368. During this movement of the beam, the link 444 is moved and thereby positions the segment 445 and the arm 446 to differentially position the indicating mechanism and printing mechanism, respectively, in accordance with the positioning of the differential plates 367 and 368 as controlled by the depressed keys.

*Differential—Clerks' bank.*—The differential mechanism which cooperates with the clerks' bank of keys is similar to that used with the amount banks except that the differentially movable members 366, 367 and 368 are omitted and are replaced by an arm 458 (Fig. 10) loose on the hub 355 for this bank. The arm 458 carries a latch device comprised of the arms 377, 378 and 385, the latch 375 and spring 383 which is identical with that described in connection with the amount differential mechanism. This latch device connects the arm 458 to a segment 365 identical with the segment 365 associated with the amount bank.

The segment 365 for this bank is driven by a mechanism identically the same as that which drives the segment associated with the amount banks and which comprises the link 364, the lever 352 carrying rollers 350 and 351 cooperating with cams 348 and 349 fast to the shaft 112.

To the arm 458 is pivoted the usual beam 440 bifurcated to surround the pin 443 on the link 444 associated with the clerks' bank. This link is connected to the segment 445 of the indicating mechanism associated with the clerks' bank and to the arm 446 rigid with the spiral segment 449 associated with the clerks' bank. The lever 352 cooperates with the beam 440 of this bank by means of the roller 453 in identically the same manner as was described in connection with the amount bank differential mechanism.

Differential mechanism associated with the department keys 131 and the transaction keys 132 and 133 is practically the same as that just described in connection with the clerks' keys 134. Therefore it is not thought necessary to either illustrate or repeat the description of this mechanism again.

*Differential—Ledger number.*—The differential mechanism for the ledger key banks is driven by a pair of cams 460 and 461 (Figs. 14 and 16) cooperating with rollers 462 and 463 respectively on a lever 464 pivoted on a stud 465 on the frame 90. The lever 464 carries a pin 466 projecting into a slot 467 in an arm 468 fast on the shaft 273.

Clockwise movement of the cams 460 and 461 rocks the lever 464 first clockwise and then counter clockwise whereby the arm 468 and shaft 273 are rocked first counter clockwise and then clockwise to normal position. Secured to the shaft 273, for each bank of keys, is a member 470. Associated with each member 470 is a lever 471 loose on the shaft 273. Pivoted on a stud 472 on the lever 471 is a latch 473 having a foot 474 normally resting upon the periphery 475 of the member 470. The upper edge of the latch is normally in engagement with a notch 476 of a plate 477 secured to the key frame 265. Rigid with the latch 473 is an arm 480. Pivoted on a stud 481 on the arm 480 is a pawl 482 normally in engagement with a pin 483 on the plate 477. A spring 484 stretched between an arm 485 integral with the lever 471 and a pin 486 on the pawl 482 holds said pin in engagement with the arm 480 of the latch 473. In Fig. 16 the latch is shown engaging the notch 476 in the eleventh or highest position. This is the normal position of the parts when there has been no key 136 depressed in the bank.

Counter clockwise movement of the shaft 273 rocks the member 470 counter clockwise whereby a pin 487 carried thereby engages the lever 471 and rocks said lever counter clockwise. As the pin 487 engages the lever 471 the spring 484 rocks the latch 473 so that its foot 474 rests upon a portion 488 of the member 470. This counter clockwise movement of the member 470 occurs immediately after the beginning of the operation of the machine. If one of the keys 136 is depressed, as the lever 471 is moved counter clockwise, the upper end of the pawl 482 engages the end of the depressed key, whereby said pawl is rocked slightly clockwise until it is past the key, whereupon the spring 484 returns the pawl so that the pin 486 again engages the arm 480.

When the clockwise movement of the member 470 to normal position is started the foot 474 is on the portion 488 of said member. During this movement of the member 470, if there has been a key 136 depressed, the upper end of the pawl 482 engages the end of the depressed key. This time however the pawl does not rock as the pin 486 is in engagement with the arm 480 thereby preventing any independent rocking of the pawl 482. As the arm 480 is rigid with the latch 473, the engagement of said pawl with the depressed key rocks the pawl 482 and latch 473 counter clockwise as a unit, around the stud 472 thereby disengaging the foot 474 from the portion 488 whereby the upper end of the latch 473 engages the notch 476 appropriate to the key which has been depressed. After the latch 473 is disengaged from the member 470 said member continues its clockwise movement to normal position. Upon the next operation of the machine the member 470 is rocked counter clockwise and the pin 487 picks up the lever 471 where it may have been left at the preceding operation and carries it downward to its farthest position and then rocks it clockwise again, through the latch 473, until said latch is broken by the end of the depressed key or, if no key has been depressed, broken by the pin 483 on the plate 477. Thus it can be seen that the member 471 is differentially positioned according to the key depressed.

Pivoted to each of the levers 471 is a link 490, also pivoted to a spiral segment 491 loose on a rod 492 carried by the frames 90 and 91. Through the link 490 and segment 491 the ledger number printing device to be hereinafter described is set differentially under the control of the ledger number keys 136.

Totalizers.

The machine illustrated has twenty-seven totalizers, one for each of the keys 131, 132, 133, 134 and 135 which comprise the department, transaction and clerks'.banks of keys. These totalizers as mentioned in connection with the description of the differential mechanism are composed of the pinions 370, there being three sets of pinions as illustrated in Figs. 8 and 9. These totalizers are of the same type as those illustrated in the Chryst and Fuller patents referred to 1,242,170, dated Oct. 9, 1917, and the application for Letters Patent of the United States filed April 24, 1918, Serial Number 230,455, by F. L. Fuller.

In Fig. 8 a part of the carrying-frame for the totalizers is illustrated in connection with one set. As the frame is practically the same as that illustrated and described in the Fuller patent, only a brief description will be given herein. Each set of totalizer pinions 370 is loose on a tube 494 carried by an arm 495 and an arm (not shown) slidably mounted on a shaft 496. The arm 495 has a slot 497 engaging one of two lugs 498, depending on the position of the totalizers, to prevent the arm 495 and its companion arm from turning on the shaft 496. These lugs are secured to the plates 345 and 346 (Fig. 9) opposite the three sets of pinions 370. Connecting the arm 495 and its companion arm is a rod 499 which spaces the two arms the proper distance apart. The two arms just mentioned, the rod 499 and tube 494 form a frame which is slidable on the shaft 496 for the purpose of bringing any desired pinion 370 into operative relation with the differential segments 366 as is old and well known in the art and which is described in the Fuller patents.

The totalizer frames with their totalizers are slid by the differential mechanism under the control of the department keys 131, transaction keys 132 and 133, clerks' keys 134 and list key 135. The clerks' key bank controls the upper line of totalizers, the transaction key bank controls the back line of totalizers and the department key bank controls the front line of totalizers. The mechanism operated by the three differential mechanisms associated with these banks for sliding the totalizer frames is in the form of spiral drum cams (not shown and which are connected to the companion arms of the arms 495,) identical with those illustrated and described in the above mentioned Fuller Patent No. 1,394,256, and therefore it is not thought necessary to illustrate and describe them herein.

Near each end of the shaft 496 is an arm 500 (Figs. 8 and 21ᴮ) carrying a roller 501 projecting into a cam slot 502 in plates 503 fixed to the frames 76 and 89. Pivoted to each arm 500 is a link 504 moved, by means to be hereinafter described, to rock the shafts 496 counter clockwise as viewed in Fig. 21ᴮ and clockwise as viewed in Fig. 8. This movement of the shaft 496 through the engagement of the roller 501 with the cam slot 502 causes the shaft 496 and arms 495 carrying the totalizer pinions 370 to be slid toward the center of the machine whereby said pinions 370 engage the differential segments 366. This engaging takes place, in adding operations, after the differential segments 366 have been positioned under the control of the depressed amount keys 130. When the said segments are restored to normal position the amount which was placed thereupon is accumulated upon the totalizer pinions after which the links 504 are again moved to disengage said pinions from the differential segments 366.

When the shaft 496 is rocked clockwise (Fig. 8) a pawl 508 fast thereon engages a shoulder 509 of a lever 510 pivoted on the rod 499 and rocks said lever counter clockwise. This lever carries an aligning plate 511 normally always in engagement with the line of pinions 370 when they are out of engagement with the differential mechanism. When the lever 510 is rocked counter clockwise by the pawl 508 the plate 511 is withdrawn from the pinions 370 to allow the selected ones to be rotated. When the selected pinions 370 are in engagement with the segments 366 the remaining pinions are in engagement with the lugs 498 on the plates 345 and 346 thereby preventing those pinions 370 which are not in alignment with the segments 366 from being turned. When the totalizers are moved out of engagement the pawl 508 strikes an edge 512 of the lever 510 and rocks said lever clockwise to normal thereby engaging the plate 511 with the totalizer pinions 370.

*Totalizers—Engaging controlling mechanism.*—From the above description it can be seen how the totalizer lines are rocked into engagement with the differential segments 366.

The totalizer line selecting mechanism provides means for preventing or permitting as described, one, or all three of the totalizer lines to be rocked into engagement with the differential mechanism simultaneously. Due to this construction the controlling keys (which are the clerks', transaction and department banks of keys) may be depressed either singly or in combination but only one totalizer selected thereby to accumulate the amount, due to the totalizer selecting mechanism. As a result a plurality of totalizer selecting keys may be depressed and their particular department or transaction indicated and printed while the amount is accumulated on but one of the totalizers if such a result is desired. Then again two totalizer selecting keys may be depressed and the amount accumulated on one, or three totalizers as determined by the totalizer selecting mechanism to be described.

After a particular totalizer line or lines have been shifted to position a totalizer or totalizers to be operated by the differential segments 366, the selected totalizer pinions 370 are rocked into mesh with said segments. Loose on the hub 296, previously mentioned, is a three-armed lever 515 (Fig. 21ᴬ). Associated with each of the arms 516 of the lever 515 is a lever 517 pivoted on a stud 518 (Figs. 21ᴬ and 21ᴮ) on the plate 324. Pivoted on a stud 520 on the lever 517 is a lever 521 having a slot 522 into which projects a pin 523 carried by the previously described link 504. Pivoted on the stud 520 of the lever 517 associated with the "back" totalizers is a link 525 carrying a pin 526 engaged by a hook 527 of a lever 528 pivoted on a stud 529 on the plate 324. The lever 528 has a roller 530 projecting into a cam race 531 of a disk 532 fast on the shaft 112. The configuration of the cam race 531 is such that, during the clockwise rotation of the disk 532, the lever 528 is rocked counter clockwise thereby lowering the link 525 and rocking the lever 517 clockwise. Through the engagement of said lever with arm 516 the lever 515 is rocked counter clockwise thereby rocking the other two levers 517 clockwise. This rocks the levers 521 counter clockwise with the pin 523 as the fulcrum until pins 535 on said levers 521 strike the outer edge of slots 538 in the plate 295, whereupon the levers rock counter clockwise with the pins 535 as the fulcrum. This last movement of the levers 521 rocks the links 504 clockwise and disengages pins 545 thereon from the hooks 547, if said pins were engaged during the previous operation.

Each lever has a pin 535 projecting in the plane of a disk 536 loose on the hub 296 and spaced from the lever 515 by a collar 537 also loose on the hub 296. Springs 524 tend to hold the pins 535 against the disk 536. The disk 536 has pivoted thereto a link 540 also pivoted to an arm 541 secured to a sleeve 542 loose on a shaft 543. The other end of the sleeve 542 is secured to a segment like the segment 445 (Fig. 10) to which is pivoted the link 444 operated by the beam 440 associated with the transaction bank of keys. Thus it can be seen that the disk 536 is differentially movable into any one of ten positions under the control of the keys 132 and 133. As shown in Fig. 21ᴬ the disk 536 stands in the zero position.

When the lever 528 is rocked clockwise to normal position the lever 517 associated with the "back" totalizers is rocked counter clockwise to normal position. This movement of the levers 517 starts to rock the levers 521 clockwise with the pin 523 as the pivot point as above described. However, with the disk 536 in the position shown the pins 535 strike the outer periphery of the disk 536 thereby causing the levers 521 to be rocked clockwise with the pins 535 as the fulcrum.

This clockwise movement of the levers 521 through their engagement with the pins 523 rocks the links 504 counter clockwise and engages the pins 545, which project through slots 546 in the plate 324, with the hooks 547 on the spider 317 as shown in Fig. 21ᴮ. Said spider 317 carries a stud 548 engaged by a notch 549 of a link 550 pivoted at 551 to a lever 552 mounted on a stud 553 on the frame 89. The lever 552 carries two anti-friction rollers 554 and 555 which cooperate with cams 556 and 557 respectively, fast on the shaft 112.

Clockwise movement of the cams 556 and 557, through the rollers 554 and 555, rocks the lever 552 first clockwise and then counter clockwise to normal position. The clockwise movement of the lever 552 moves the link 550 to the right (Fig. 21ᴮ) thereby rocking the spider 317 clockwise. As the pins 545 are engaged by the hooks 547 it can be clearly seen that the pins will be moved in the long portion of the slots 546 whereby, through the links 504, the arms 500 are rocked counter clockwise (Fig. 21ᴮ) clockwise (as viewed in Fig. 8) whereby the rollers 501 on the arms 500 are moved in the slots 502 of the plates 503 and, as previously described, move the totalizer pinions 370 into engagement with the differential segments 366. When the lever 552 is rocked counter clockwise to normal position the link 550 is moved to the left thereby reversing the movement of the spider 317 and moving the studs 545 and consequently the links 504 to the positions shown.

With the disk 536 in the "0" position or any other position except the "1" position, it is very clear that all three of the totalizer lines are rocked into engagement with the differential segments.

Let it be assumed now that the department key "IX", the "Paid out" key, and the clerk's key "A" have been depressed to register a transaction.

As previously stated, the disk 536 is differentially positioned under the control of the keys in the transaction bank. As the paid out key is in the first position, the latch for this bank is broken in the "1" position whereby the beam 440, segment 445, sleeve 542, arm 541, link 540 and disk 536 are differentially set in the "1" position. On the portion of the disk 536 associated with the "upper" and "front" totalizers there is a notch opposite the "1" position. On the portion of the disk 536 associated with the "back" totalizers there is no notch opposite the "1" position. With the disk set in its "1" position the pins 535 associated with the "upper" and "front" totalizers are opposite the notches in the "1" position. The pin 535 associated with the "back" totalizers is opposite the "1" position which is on the true periphery of the disk 536. During this operation of the machine, the clockwise movement of the levers 517 disengages the pins 545 from the hooks 547. When the levers 517 rock counter clockwise to normal the levers 521 associated with the "upper" and "front" totalizer lines are rocked clockwise about the pins 521 and as there is a notch opposite the pins 535 said pins enter said notches and the pins 545 remain out of engagement from the hooks 547. The springs 524 hold the levers in this position. The pin 535 of the "back" totalizer line engages the true periphery of the disk 536 when its lever 517 is rocked counter-clockwise, thus causing a clockwise movement of the lever 521 about the pin 535 which engages the pin 545 with the hook 547 of the spider 317.

From the above it can be seen that with the studs 545 associated with the "front" and "upper" totalizer lines out of engagement with the hooks 547 and the stud 545 associated with the "back" totalizer line in engagement with the hook 547, when the spider 317 is rocked clockwise, only the "back" totalizer line is rocked into engagement with the actuators and the "upper" and "front" totalizer lines remain in their normal positions.

*Indicators.*

The indicating mechanism which it is desired to use in connection with the present machine is substantially the same as that fully illustrated and described in United States Letters Patent 1,163,748, issued to F. L. Fuller December 14, 1915. Therefore but a brief description and illustration of it will be given herein.

There are two groups of indicators 571 (Figs. 1 and 17) for each of the amount banks of keys 130. One group of indicators indicates at the front of the machine and the other group indicates at the back of the machine. There are likewise two groups of indicators 572 associated with the department keys 131; two groups of indicators 573 associated with the transaction keys 132 and 133; and two groups of indicators 574 associated with the clerks' keys 134 and the list key 135.

As these indicators are all mounted in a similar manner the group associated with one of the amount banks only is illustrated and will be described.

The group of indicators 571 which indicate toward the front of the machine are carried in a casing 575 and rest upon a ledge 576 of a plate 577 slidably mounted on rollers 578 on rods 579 supported by two plates 580, one at each end of the machine. The plates 580 are secured to the frames 76 and 89 by studs 581. The plate 577 has teeth 585 meshing with a segment 586 integral with the previously described segment 445 which is differentially positioned through the link 444 by the differential mechanism. In this manner the plate 577 carrying the group of indicators for indicating toward the front of the machine is differentially positioned to bring any desired indicator 571 into operative relation with an indicator lifting means to be hereinafter described.

The indicators 571 which indicate towards the back of the machine are differentially positioned by means of a plate similar to the plate 577. As the indication from the back of the machine is the reverse of that looking from the front each of the segments 445 is secured to a sleeve 587 so that the movement imparted to the segment 445 is, through the sleeve 587 imparted to the plate 577 which carries the indicators 571 for indicating at the back of the machine.

*Indicators — Lifting mechanism.* — After the indicators 571 have been differentially positioned to indicate according to the keys which have been depressed, the selected indicator is exposed to view. This mechanism is substantially the same as that shown and described in the above mentioned Fuller Patent 1,163,748. Therefore only a brief description is thought necessary herein. Before the indicators 571 can be differentially positioned it is necessary that the indicator which was exposed during the previous operation be lowered to its normal position.

A frame 590 (Fig. 17) rectangular in shape has at each end an arm 591 carrying a roller 592 projecting into a slot 593 in each plate 580. The frame 590 also has projections 594 at the front and back thereof adapted to engage the indicators 571 in a manner fully illustrated and described in the above mentioned Fuller Patent No. 1,163,748.

Pivoted on a stud 595 on the frame 590 is a link 596 also pivoted to a lever 597 fast on a shaft 598 mounted in the frames 76 and 89. There is a link 596 and a lever 597 at each end of the machine in order that the frame 590 may be lifted squarely to prevent binding. Pivoted on a stud 599 on the lever 597 is a link 600 which carries a roller 601 projecting into the short portion of an L-shaped slot 602 in a lever 603 loose on a rod 604 carried by the frames 76 and 89. The lever 603 has two rollers 605 and 606 cooperating with cams 607 and 608 respectively, fast on the shaft 112.

The link 600 has a roller 609 against which rests an edge 610 of a pawl 611 loose on a rod 612 carried by the frames 76 and 89. A spring 613 holds the pawl 611 against the roller 609 so that the roller 601 is normally maintained in the short portion of the L-shaped slot 602.

From the above description it can be clearly seen that when the cams 607 and 608 are rotated counter clockwise, the lever 603 is rocked clockwise thereby moving the link 600 downward in the direction of its length and rocking the levers 597 and shaft 598. This movement of the levers 597 through the links 596 lowers the frame 590 so that the previously exposed indicator 571 is lowered to normal position. As the link 600 is being lowered the spring 613 maintains the tension against the roller 609 so that the roller 601 can not become disengaged from the short portion of the slot 602. A stud 614 limits the clockwise movement of the pawl 611.

After the previously exposed indicators 571 have been lowered, as just described, and after the plates 577 have been differentially positioned to select a new indicator, as previously described, the cams 607 and 608 rock the lever 603 counter clockwise to normal position. This raises the link 600 and consequently rocks the levers 597 counter clockwise to normal position thereby raising the links 596 to raise the frame 590 whereby the projections 594 thereof engage the selected indicators 571 and expose them to view.

After the frame 590 is in its lower position it is held locked in this position until after the plates 577 have been differentially positioned to select a new indicator. This locking means will now be described. Slidably mounted on the rods 579 is a plate 618 (Fig. 17) having a slot 619 engaged by a pin 620 on a lever 621 fast on a shaft 622 mounted in the frames 76 and 89. Pivoted to the lever 621 is a link 623 (Fig. 19) which is pivoted to a lever 624 (Fig. 20) loose on the rod 604. The lever 624 has rollers 625 and 626 cooperating with cams 627 and 628 fast on the shaft 112. The cams 627 and 628 are so timed that after the frame 590 has been lowered said cams rock the lever 624 clockwise which, through the link 623, rocks the lever 621 counter clockwise and moves the plate 618 to the left whereupon a projection 629 thereof engages the roller 592 on the arm 591 thereby holding the frame 590 in its downward position until after the indicators 571 have been selected, after which the counter clockwise movement of the lever 624 to normal position rocks the lever 621 clockwise to disengage the projection 629 from the stud 592 thereby allowing the frame 590 to be raised to expose the selected indicator to view.

*Indicators—Aligning mechanism.*—Each of the segments 445 has aligning notches 630 with which cooperate an aligning bar 631 integral with parallel arms 632 and 633 (Figs. 8 and 17) fast on the shaft 622. As above described the lever 621 is fast on the shaft 622. Therefore when said lever is rocked counter clockwise the shaft 622 rocks the arms 632 and 633 counter clockwise, and disengages the aligner 631 from the teeth 630 so that the segments 445 may be differentially positioned under the control of the differential mechanism. When the lever 621 is rocked clockwise to normal position the aligner 631 is again engaged with the teeth 630 to hold the segments 445 in proper position until a subsequent operation of the machine.

There is also another aligning mechanism which directly aligns the plates 577. This aligner 634 is in the form of an angle iron (Figs. 17, 18 and 19). In alignment with each plate 577 the aligner 634 has a slot 635 and also an aligning tooth 636 which cooperates with teeth 637 formed on the plate 577. The aligner 634 is secured at each end to the horizontal portion of levers 638 pivoted on studs 639 mounted in the plates 580. Pivoted to the levers 638 are links 640 which are also pivoted to the levers 621.

When said levers are rocked counter clockwise, as previously described, the links 640 rock the levers 638 clockwise and disengage the aligning teeth 636 from the teeth 637 of the plates 577. The slots 635 of the aligner 634 then act as a guide for the plates 577 to hold them in proper lateral position. After the desired indicator has been selected and before the frame 590 is raised to expose the selected indicator to view the levers 621 are rocked clockwise to normal position which movement, through the links 640 rocks the levers 638 counter clockwise whereby the teeth 636 again engage the teeth 637 and hold the indicators in proper alignment until a subsequent operation of the machine.

Printer.

The printing mechanism is located in front of the machine proper. The framework for this mechanism comprises a front frame 645, an intermediate frame 646 and a rear frame 647 (Figs. 2, 29 and 33), all of which are mounted upon the base of the machine.

The entire printing mechanism is driven by the operation of the cash register. The shaft 112 has secured near the left hand end thereof a spiral gear 648 (Fig. 23) meshing with a spiral pinion 649 fast on a sleeve 650 loose on a shaft 651. The front end of the shaft 651 is mounted in the frame 645 and the rear end in a bracket 652 secured to the base of the machine. Fast on the sleeve 650 is a disk 653 upon which is pivotally mounted a driving pawl 656 (Fig. 24) and a retaining pawl 657, held in their normal position by a spring 658. Secured to the shaft 651 is a disk 659 provided with a boss 660 normally engaged by the driving pawl 656. The retaining pawl 657 normally rests against the true periphery of the disk 659 in such a position that there is a slight clearance between said pawl and the boss 660.

From the above description it will be seen that with the parts in the position illustrated in Figs. 23 and 24, a clockwise rotation of the shaft 112 rotates the disk 653 counter clockwise and, through the engagement of the pawl 656 with the boss 660 fast on the shaft 651, rotates said shaft counter clockwise. The pawl 657 serves to retain the shaft 651 from any excessive overthrow movement.

Meshing with each of the spiral segments 449 (Figs. 8, 9 and 10), actuated by the movement of the differential mechanisms, as previously described, is a spiral gear 663 secured to a shaft 664 mounted in the intermediate frame 646 and a bracket 665 carried by the rear frame 647. The shafts 664 are held against lateral movement by the hubs of the gears 663 on one side of the bracket 665 and by collars 666 secured to the shaft on the other side of the bracket.

There is one spiral gear 663 associated with each of the amount banks, the department bank, the transaction bank and the clerks' bank. There is also one spiral gear 663 associated with the differential mechanism for the totalizer wheel of higher denomination than the amount banks. In this machine there is one such differential unit, as has been previously described.

Secured to each shaft 664 is a segment 667, (Figs. 8, 43$^A$, 43$^B$, and 45). Meshing with the segments 667 are teeth 668 of racks 669. These racks each have slots 670 and 671 surrounding rods 672 and 673, respectively. The racks are spaced laterally by plates 674 carried by the rod 673 and a rod 675 mounted in the frames 646 and 647. Each rack has a clearance slot 676 for the rod 675. The racks are spaced at each end by collars (not shown) carried on the rods 672.

From the above description it can be clearly seen that the differential movements of the differential units, through the spiral segments 445 and spiral gears 663, are transferred to the racks 669.

*Printer—Ledger device rack mechanism.*—Meshing with each of the spiral segments 491 (Fig. 16), differentially actuated under the control of the ledger keys 136, is a spiral gear 680 (Figs. 14, 16 and 48) fast on a shaft mounted in a frame 682 and a bracket 683 supported by a frame 684. The frames 682 and 684 are mounted on the base of the machine. The shafts 681 are held against lateral movement by the hub of the gear 680 on one side of the bracket 683, and a collar 685 secured to the shaft on the other side of the bracket. There is one spiral gear 680 associated with each of the ten banks of ledger number keys 136.

Secured to each shaft 681 is a gear 686 (Figs. 16 and 43$^B$). Meshing with the gears 686, except the one at the extreme right (Fig. 43$^B$), are teeth 687 of racks 688. The pinion 686 on the shaft 681 at the extreme right meshes with a pinion 689 loose on the second shaft 681, which in turn meshes with a pinion 690 loose on the third shaft 681. This pinion 690 meshes with the teeth 687 of the units ledger number rack 688. From the above description it can be seen that the units rack 688 is driven through the idler gear 689 and the gear 690 instead of being driven direct by the gear 686 as are all the rest of the racks 688 except the highest denomination which is also driven by idler gears. The reason for this gearing is on account of the liner teeth and also to permit all racks to be made the same length.

Each rack 688 has a slot 691 receiving a rod 692 supported by the frames 682 and 684. Each rack 688 also has another slot 693 (Figs. 43$^A$ and 43$^B$) receiving a rod 694 supported at one end by the frame 646 and at the other end by a plate 695 (Fig. 29) supported by studs 696 and 697 on the frame 647.

From the above description it can be seen that all of the ledger racks 688 are differentially set by differential mechanism under the control of the ledger number keys 136.

*Printer—Rack aligners.*—The racks 669 have aligning notches 700 (Figs. 43$^B$ and 49) and the racks 688 have aligning notches 701. Cooperating with these notches are two aligners 702 and 703, respectively, slidably supported at one end by bosses 704 (Fig. 43$^B$) on the frame 646 and at the other end by bosses 705 on the frame 647. Adjacent the bosses 704 is a lever 706 (Fig. 43$^B$) fast on a shaft 707 mounted in the frames 646 and 647. Adjacent the bosses 705 is a lever 708 (Fig. 47) also fast on the shaft 707. The levers 706 and 708 engage slots (not shown) in the aligners 702 and 703. Also fast on the shaft 707 is an arm 709 to which is pivoted a link 710 (Fig. 47) also pivoted to a lever 711 (Fig. 46) loose on a stud 712 on the frame 647. The lever 711 carries anti-friction rollers 715 and 716 cooperating with cams 717 and 718 (Figs. 33 and 45) fast on the printer shaft 651.

The aligners 702 and 703 are normally out of engagement with the notches 700 and 701. After the racks 669 and 688 have been differentially positioned under the control of the amount, department, transaction, clerks' and ledger keys, the cams 717 and 718 rock the lever 711 clockwise whereby the link 710 (Figs. 46 and 47) rocks the arm 709, shaft 707 and levers 706 and 708 counter clockwise whereby the aligner 702 is rocked into engagement with the notches 700 on the racks 669, and the aligner 703 is rocked into engagement with the notches 701 on the racks 688, thereby maintaining said racks in proper alignment during the printing operations to be hereinafter described. After the printing has taken place the cams 717 and 718 rock the lever 711 counter clockwise to normal position thereby disengaging the aligner 702 and 703 from the racks 669 and 688.

*Printer—Tube lines.*—Associated with the racks 669 are two tube lines which are for the purpose of setting the amount, department, transaction and clerks' type wheels, to be hereinafter described.

These tube lines comprise nested tubes 720 (Figs. 39, 43^A, 47, 50 and 51) supported by shafts 721 and 722.

The tubes 720 have secured at their right hand ends (Figs. 50 and 51) gears 728 which mesh with teeth 729 (Fig. 43^A) on the upper edge of the racks 669. The racks 669 alternate in meshing with these gears 728. Secured to the left end of the tubes 720, are gears 730. These gears 730 mesh with two sets of type wheels 731, one set loose on a long stud 732 (Fig. 50) and the other set loose on a long stud 733 (Fig. 52) mounted in the frame 646. At their outer ends these studs 732 and 733 support a plate 734 (Figs. 29, 50 and 51). The type wheels 731 are for printing the amounts, department, transaction, and clerks' initials in a manner to be later described.

From the description just given it is very clear that the differential movement of the racks 669, under the control of the keys 130, 131, 132, 133 and 134, is imparted to the type wheels 731 through the medium of the gears 728, tubes 720 and gears 730, thereby differentially setting said type wheels.

Meshing with teeth 737 of the racks 688 are gears 738 (Figs. 43^A, 50 and 51) secured to the end of nested tubes 739 supported by a shaft 740 mounted in the frame 647 and a block 741 secured to the plate 734. Secured to the other end of the tubes 739 are gears 742 meshing with gears 743 loose on the shaft 722. The gears 743 mesh with two sets of type wheels 745.

From the above description it can be seen that the differential movement of the racks 688 under the control of the ledger keys 136, is, through the gears 738, tubes 739, gears 742 and 743, imparted to the ledger number type wheels 745 whereby the ledger number is printed therefrom by means to be hereinafter described.

*Printer—Type wheel aligners.*—As has been previously described there is an aligning mechanism for the racks 669 and 688. This aligning mechanism in a way serves to align the type wheels, but as there is a chance for the type wheels, due to lost motion through gears, etc., to get out of alignment another aligning device is provided which cooperates with the gears 730 that mesh direct with the type wheels 731 and 745.

Loose on the stud 732 are parallel arms 748 and 749 (Figs. 47 and 50) connected by an aligning bar 750 adapted to cooperate with the gears 730 on the shaft 722. Loose on the stud 733 are parallel arms 751 (only one of which is shown in Fig. 47) connected by an aligning bar 752 adapted to cooperate with the gears 730 on the shaft 721. The arm 748 has a stud 753 engaged by a slot 754 of a plate 755 slidably mounted on the studs 732 and 733. The plate 755 also has another slot 756 engaging a stud 757 on one of the arms 751. A slot 758 of a bell crank 759 also engages the stud 757. The bell crank 759 is loose on the stud 733 and has another slot 760 engaging a pin 761 on an arm 762 fast on a shaft 763 mounted in the frames 646 and 647. Also fast on the shaft 763 is an arm 764 (Figs. 33 and 47) carrying a stud 765 projecting through a slot 766 in the link 710. A spring 767 stretched between the stud 765 and a stud 768 on the link 710 holds the stud 765 in the right end of the slot 766 and constitutes a yieldable connection between the link 710 and the aligning bars 750 and 752.

It will be remembered in connection with the rack aligning mechanism that the link 710 is moved first to the right and then to the left to normal position. When this occurs the spring 767 rocks the arm 764, shaft 763 and arm 762 counter clockwise. This movement through the pin 761 and bell crank 759 rocks the arms 751 clockwise thereby raising the aligning bar 752 into engagement with the gears 730 on the shaft 721. Clockwise movement of the arms 751 through the engagement of the stud 757 with the slot 758 in the plate 755 raises said plate and through its engagement with the stud 753 rocks the arms 748 and 749 clockwise thereby lowering the aligning bar 750 into engagement with the gears 730 on the shaft 722.

It is to be understood that the aligning of the gears 730 takes place at the same time that the racks 669 and 688 are aligned by the aligners 702 and 703, as previously described. When the link 710 is moved to the left to normal position to disengage the aligners from the racks 669 and 688, the slot 766 rocks the arm 764 clockwise to normal position and through the bell crank 759 and plate 755 rocks the arms 748, 749 and 751 counter clockwise to normal position, thereby raising the aligning bar 750 and lowering the aligning bar 752 to their normal positions.

*Printer—Date type wheels.*—Loose on the studs 732 and 733 are four date type wheels 771 (Figs. 50 and 52). Meshing with these type wheels are gears 772 secured to the ends of nested sleeves 773 on the shaft 721. The sleeves 773 are connected by mortise and tenon (not shown) to knurled hubs 774 which project outside of the cabinet of the machine and are for the purpose of manually setting the date type wheels 771. The construction of the hubs 774 and sleeve 773 is very similar to that fully illustrated and described in the above mentioned Fuller Patent No. 1,394,256. In order to set the date the operator pulls the hubs 774 outward so that they may be grasped more conveniently and turns them to the desired position, which through the sleeves 773 and gears 772 sets the date type wheels 771.

To insure that the date wheels are in proper position for printing there are four gears 775 (Figs. 51 and 52) loose on a hub 776 surrounding the shaft 722. These gears are in mesh with the date type wheels 771 and are engaged by spring pressed pawls 777 mounted on a stud 778 carried in the block 741.

As the date wheels 771 are being set the gears 775 rotate and the pawls 777 rock in and out of mesh with said gears. When the operator has rotated the hubs 774 to the desired position the type wheels 771 will be approximately in alignment and the pawls 777 force them into absolute alignment as soon as the operator releases his grip on the hubs 774. In other words these pawls 777 compensate for all the lost motion between the hubs 774 and the type wheels 771 thereby insuring a true printing line from said date type wheels.

*Printer — Consecutive number type wheels.*—Loose on the studs 732 and 733, between the ledger type wheels 745 and the date type wheels 771 are six consecutive number type wheels 780 (Figs. 36, 50, 53 and 54). Loose on the hub 776 are gears 781 meshing with both sets of type wheels 780. Secured to the side of each gear 781 is a ratchet 782. Cooperating with the ratchets 782 is a differentially tined pawl 783 mounted on a rod 784 carried by parallel arms 785 and 786 loose on the hub 776. The arms 785 and 786 are made integral by a yoke 787. The arm 786 has teeth 788 meshing with a segment 789 fast on the shaft 740. Also fast on the shaft 740 is an arm 790 carrying a stud 791 (Figs. 39, 50 and 51) extending through a slot 792 in the frame 646. Pivoted on the stud 791 is a link 793 (Fig. 33) which has a slot 794 engaging a pin 795 on a lever 796 fast on a shaft 797 mounted in the frames 645 and 646. Also fast on the shaft 797 is an arm 800 (Fig. 36) to which is pivoted the right end of a pitman 801. The left end of the pitman 801 is U-shaped and surrounds a collar 802 on the shaft 651. The pitman 801 carries an anti-friction roller 803 extending into a cam race 804 of a disk 805 fast on the shaft 651.

This shaft, as previously described, makes one counter clockwise revolution during each adding operation of the machine. The configuration of the race 804 is such that the pitman 801 is moved first to the left (Fig. 36) and rocks the arm 800, shaft 797 and the lever 796 counter clockwise. This lowers the link 793 (Fig. 39) and rocks the arm 790 and shaft 740 clockwise and counter clockwise, as viewed in Fig. 54. Counter clockwise movement of the shaft 740 (Fig. 54) rocks the segment 789 likewise and through its engagement with the teeth 788, the arms 786 and 785 are rocked clockwise thereby moving the pawl 783 upward, which turns the units ratchet 782 one step in a counter-clockwise direction. The gear 781 being fast to said ratchet receives the same movement, thereby advancing the consecutive number type wheels 780 one step. At this point in the race 804 there is a slight drop which moves the pitman 801 slightly to the right and through the mechanism just mentioned moves the tines of the pawl 783 downward away from the feeding edge of the ratchet 782. This is done because in feeding movements of this kind the pawls are always given a slight "overthrow" movement to insure the "taking up" of all clearances between the main driver and the driven member.

Near the end of the rotation of the shaft 651 the race 804 (Fig. 36) moves the pitman 801 still further to the right to its normal position thereby lowering the pawl 783 to the position shown in Fig. 54.

To prevent retrograde movement of the ratchets 782 and gears 781 when the pawl 783 is being restored to its normal position there is in engagement with the ratchets a set of spring pressed pawls 808 pivoted on a rod 809 (Figs. 36 and 54) supported by the block 741. These pawls also serve to align the consecutive number type wheels 780 so that they will print in a straight line.

The transferring from the units to the tens and from the tens to the hundreds, etc., is of the "deep notch" principle which is very old and well known in the art and illustrated in Letters Patent of the United States No. 589,114 issued to F. H. Bickford on Aug. 31, 1897.

To turn the consecutive number type wheels 780 to zero a key 812 (Figs. 26, 50 and 51) is inserted in the hub 776 and given one complete turn. This manner of turning the consecutive numbers to zero is well known in the art and it is not thought necessary to go into a detailed illustration or description thereof. It is thought that it will be sufficient to say that the hub 776 has a groove for engaging pawls (not shown) carried by each of the gears 781 adjacent the periphery of the said hub so that as the hub is turned by the key 812 the groove therein picks up the pawls during its rotation and rotates the gears 781 and consequently the type wheels 780 to zero position.

For paid out transactions and also when the machine is operated during listing operations it is desirable to render the consecutive number feeding device ineffective. The mechanism for accomplishing this result will now be described.

Loose on the hub 355 (Fig. 10) adjacent the transaction bank of keys and adjacent the clerks' bank of keys is an arm 814 having an integral plate 815. Each plate has slots 816 opposite studs 174 and 214 in the clerks' keys, list key and transaction keys. However, the stud 214 of the "paid out" key and the stud 174 of the "list" key are the only two which are long enough to come into the plane of the plates 815. The arms 814 each have a hook engaging studs 817 on the plates 346 associated with the clerks' bank and the transaction bank. These studs hold the arms 814 in their normal position. Pivoted to each arm 814 is a link 818 which has a slot 819 receiving studs 820 on integral arms 821 loose on the rod 448. Projecting from the arms 821 is a pin 822 (Figs. 10 and 13) engaging an arm 823 fast on the right end of the shaft 672. Also fast on this shaft is an arm 825 (Figs. 33, 36 and 39) carrying a stud 826 to which is pivoted a link 827 also pivoted to the link 793. A spring 828 holds the link 793 in engagement with the pin 795 on the lever 796.

From the above description it can be seen that when either the paid out key 133 or the list key 135 is depressed, the pin 214 or 174 engages the slot 816 and moves the plate 815 upward and rocks the arm 814 counter clockwise (Fig. 10). This movement of the arm 814 moves the link 818 upward and rocks the arm 821 counter clockwise, which, through the pin 822, rocks the arm 823 and shaft 672 clockwise (Fig. 13). Clockwise movement of the shaft 672 (Fig. 39) rocks the arm 825 clockwise and moves the link 827 to the left thereby disengaging the link 793 from the pin 795 and engaging a slot 830 in said link with a pin 831 on the frame 646. As depression of the keys takes place before the rotation of the shaft 651 it will be very clear that if either the paid out key or the list key is depressed, the driving connection between the link 793 and the lever 796 is rendered ineffective, so that when the consecutive number cam race 804 rocks the lever 796 there is no movement of the link 793 and consequently no advancement of the consecutive number type wheels 780. Therefore they print the same number which they printed during the previous operation of the machine. Near the end of the operation when the keys are released, as has been previously described, the spring 828 rocks the arm 825, shaft 672 and arm 823 counter clockwise to normal position thereby restoring the arms 821, link 818 and arms 814 to normal position.

*Printer—Zero elimination.*—After the racks 669 have been positioned by the actuation of the differential actuators, as determined by the keys depressed in the various banks, and before an impression is taken from the type wheels associated with these racks, a mechanism is operated for the purpose of preventing the printing of ciphers to the left of the highest denomination represented by a digit, other than a cipher in any printed number or to the left of the units of dollars rack, and for the printing of ciphers to the right. This mechanism, known in the art as "zero elimination mechanism" will now be described.

Loose on a rod 833 (Fig. 43ᴬ) carried by the frames 646 and 647 is an arm 834 carrying a pin 835 on which are loosely mounted six levers 836 (Fig. 45) each having a shoulder 837 adapted to engage a notch 838 in each of the six highest amount racks. The highest denomination rack 669 is not shown in the "eliminated" position in Fig. 43ᴬ, for reasons to be hereinafter described, but the five next lower denominations are shown in the eliminated position.

Pivoted to an arm 840 integral with the arm 834 is a link 841 pivoted at 842 to a bell crank 843 pivoted on a rod 844 carried by the frames 646 and 647. Said bell crank carries anti-friction rollers 845 and 846 cooperating with cams 847 and 848 fast on the shaft 651.

As above stated the five racks 669 next to the highest amount rack are shown in the "eliminated" position. Upon rotation of the shaft 651 the bell crank 843 is rocked counter clockwise and raises the link 841 which rocks the arms 840 and 834 counter clockwise. This movement carries the levers 836 towards the racks (Fig. 43^A) until a portion 850 of said levers strikes a collar 851 on the rod 833. When this occurs the levers 836 rock counter clockwise and disengage the shoulders 837 thereof from the notches 838 in the rack 669. The movement of the levers 836 counter clockwise stretches springs 852 connecting the upper ends of the levers 836 and levers 853 loose on a rod 854 supported by the frames 646 and 647, whereby said levers are rocked counter clockwise. Each lever 853 has a projection 855 engaging a shoulder 856 on the racks 669. Counter clockwise movement of the levers 853 by the springs 852 moves the $10, $100, $1000 and $10,000 racks 669, through the engagement of the projections 855 and shoulder 856, towards the right to zero position (Fig. 43^A). The right hand ends of the springs 852 for the two highest amount racks are secured to studs 857 (Figs. 29 and 45) on the frame 647. Loose on the shaft 664, associated with the units of cents rack 669, are two levers 858 held into engagement with projections 859 on the two highest amount racks by springs 860. When the levers 836 for these two racks are released from the notches 838 these springs 860 rock the levers 858 clockwise and move the two highest amount racks to the right to zero position. However, the springs 852 and 860 are not depended upon because as the arm 834 is rocked counter clockwise the levers 836 themselves engage an edge 861 on the racks 669 and positively move them to the right to zero position.

After the racks have been moved to zero position the springs 852 and 860 hold them until they are moved further under the control of the differential mechanism. As the racks are moved further to the right, counter clockwise movement of the levers 853 is limited by a projection 862 on said levers contacting with a stud 863 on the frame 647. Clockwise movement of the levers 858 is limited by a projection 864 thereof contacting with the shaft 664 associated with the tens of cents rack 669.

After the levers 836 have been released from the racks 669 and said racks have been restored to zero position said racks are differentially positioned under the control of the depressed keys by the segments 667 as previously described. When said racks are so moved to the right a portion 867 of the levers 836 rides on the surface 868 of the racks 669 thereby holding the levers in raised position.

The four right hand levers 836 (Fig. 45) each have a portion 869 bent over so that it lies in the plane of its adjacent left hand lever. There is no portion 869 bent over into the plane of the lever 836 associated with the highest amount rack because as has been previously mentioned this rack is not used in adding operations and does not have to be eliminated except under certain conditions which will be hereinafter described in connection with the slip printing mechanism.

From this construction it can be seen that when the amount registered is large enough to cause the eighth rack 669, commencing with the units rack at the right (Fig. 45), to be positioned, the lever 836 cooperating with said eighth rack is raised and held in the raised position by the engagement of the edge 868 with the portion 867 of said lever. As the portion 869 of the lever 836 associated with the seventh rack is in the plane of the lever 836 associated with the eighth rack, said lever 836 of the seventh rack is likewise held in the raised position so that its hook 837 can not engage the notch 838 of the seventh rack. The lever 836 of the seventh rack through its engagement with the portion 869 of the lever connected to the sixth rack holds said lever in the raised position, and so on towards the right. From this it can be seen that should the amount be $300,000.00, for instance, all of the zeros would be printed because the portion 869 of the lever 836 cooperating with the eighth rack, or in other words the rack which sets up the numeral 3, engages the lever to the right (Fig. 45) and it in turn engages the lever to its right, and so on; thereby holding those levers 836 up so that the shoulders 837 thereof can not engage the notches 838 in these racks 669. However, the ninth or highest amount rack 69, not being involved in the amount, will remain in the zero position. Subsequently and during the rotation of the shaft 651 the cams 847 and 848 rock the bell crank 843 clockwise and lower the link 841 which rocks the arms 840 and 834 clockwise. This movement of the arm 834 allows the lever 836 associated with the ninth rack to be rocked clockwise whereby its shoulder 837 engages the notch 838 in the ninth rack and moves said rack to the left one space whereby the type wheel associated with this rack is moved from zero position to a nonprint position so that the character in the zero position in this rack will not be printed as it is not involved in the amount.

When the racks 669 are moved to the "eliminated" position by the levers 836, as just described, a hook portion 870 on the racks engages an extension 871 on the segments 667 and positively locks the segments and consequently the differential mechanism associated therewith in this position.

*Printer—Detail strip mechanism.*—A detail strip 875 (Figs. 26 and 36) is fed from a supply roll 876 mounted on a stud 877 on the frame 646, around a roller 878 on a stud 879 on a lever 880 pivoted on a stud 881 (Fig. 39) on the frame 646. From the roller 878 the strip is passed to the right over a rod 882 carried by parallel arms 883, made integral by a yoke 884, loose on a stud 885 mounted in the frame 646. From the rod 882 the strip is fed to the right under a platen 886 carried by a U-bar 887 mounted in a block 888 integral with the arms 883, up and over the top of said block and to the left over a roller 889 on a stud 890 on a lever 891 pivoted on a stud 892 on the frame 646. From the roller 889 the strip is wound on a receiving roll 893 (Figs. 26, 29 and 36) loose on a stud 894 mounted in the frame 646.

Secured to the receiving roll 893 is a disk 900 having an integral flange 901 (Fig. 39). Loose on the stud 894 is a casting 902 having an integral arm 903 carrying a pin 904 projecting into a slot 905 of a lever 906 loose on a shaft 907 mounted in the frames 645 and 646. The lever 906 carries an anti-friction roller 908 held in engagement with the periphery of a disk 909 fast on the shaft 651, by a spring 910 stretched between the lever 906 and a stud on the frame 646. The casting 902 is cut away at 913 and in this cut away portion is a roller 914 loosely mounted on a pin 915 carried by the casting 902. A spring pressed plunger 916 holds the roller in engagement with the cut away portion 913 and the inner periphery of the flange 901. Pivoted on a stud 917 carried by a lever 918 (Fig. 39) loose on the stud 892 is a lever 919.

Upon counter clockwise movement of the disk 909 (Fig. 39) the roller 908 on the lever 906 is caused to follow a cut away portion 924, on the periphery of the disk 909, by the spring 910. This rocks the lever 906 clockwise and through its engagement with the stud 904 rocks the arm 903 and the casting 902 counter clockwise until a portion 920 integral with the casting 902 strikes the upper end of the lever 919. During this counter clockwise movement of the casting 902 the roller 914 is rolled along on the inner periphery of the flange 901 and slightly compresses the spring plunger 916. During the latter part of the counter clockwise movement of the disk 909 the roller 908 is engaged by the true periphery of said disk thereby rocking the lever 906 counter clockwise to normal position. This rocks the arm 903 and the casting 902 clockwise to normal whereby the roller 914 becomes slightly wedged between the cut away portion 913 of said casting and the inner periphery of the flange 901 thereby rotating said flange and its integral disk 900 clockwise. The receiving roll 893 being fast to the disk 900 receives the same clockwise movement thereby winding the detail strip 875 upon said receiving roll.

Engaging the detail strip after it is wound on roll 893 is a plate 921 (Figs. 26, 29 and 36) secured to an ear 922 integral with the lever 919. A spring 923 holds the plate 921 in constant engagement with the detail strip as it is wound on the receiving roll. As the receiving roll becomes larger the plate 921 is moved to the left (Fig. 26) thereby rocking the lever 919 counter clockwise about the stud 917. This positions the upper end of the lever 919 slightly closer to the portion 920 in terms of angular rotation so that the rocking movement of the casting 902 in a counter clockwise direction is lessened in order that the printing on the detail strip may be evenly spaced apart.

When the casting 902 is rocked counter clockwise, the flange 901 is prevented from being rocked counter clockwise by a retaining roll 925 loosely mounted on a stud 926 carried on an arm 927 loose on the stud 877. A bent portion 928 on the arm 927 is held in the position shown (Fig. 39) by another bent portion 929 on the arm 927, engaging the outer periphery of the flange 901. A spring plunger 930 engages the roll 925 and holds it in engagement with the periphery 928 and the inner portion of the flange 901. When the casting 902 is rocked counter clockwise it can not move the flange 901 counter clockwise because immediately upon such attempted movement the roller 925 becomes slightly wedged between the portion 928 and the inner periphery of the flange 901 which positively prevents any counter clockwise movement of said flange. On the other hand when the flange 901 is rotated clockwise to wind paper on the receiving roll the roller 925 immediately becomes loosened and slightly compresses the spring plunger 930 thereby allowing a free clockwise movement of the flange 901.

The printed impressions on the detail strip are all visible through a glass 933 (Fig. 1) which forms part of the printer cabinet.

To allow the last printed item to be visible through said glass the detail strip is shifted after the printing takes place. In Figs. 36 and 39 the mechanism for shifting the detail strip is shown in its normal position whereby the last printed item is visible through the glass 933.

Integral with the lever 891 (Fig. 39) is a segment 935 meshing with a segment 936 integral with the lever 880. The lever 880 has a slot 937 surrounding a stud 938 on a bell crank 939 loose on a shaft 940 mounted in the frames 645 and 646. The bell crank 939 carries an anti-friction roller 941 projecting into a cam race 942 in the disk 909.

Just before the detail feed, as previously described, and before the detail impression, to be hereinafter described, takes place the counter clockwise movement of the disk 909 rocks the bell crank 939 clockwise and through its engagement with the lever 880 rocks said lever counter clockwise. Counter clockwise movement of the lever 880 through the engagement of its segment with the segment 935 rocks the lever 891 clockwise. The rocking movements of these two levers 880 and 891 due to their gear connections is simultaneous. As the lever 891 rocks clockwise (Fig. 36) a slack occurs in the detail strip 875 which is immediately taken up by the counter clockwise movement of the lever 880 and in this manner the top line of the detail strip 875 is moved to the right to position the last printed item directly underneath the platen 886. After the detail strip is shifted to this position the feeding mechanism previously described is operated to position the last printed item the proper distance towards the right from the platen 886. After the detail strip has been shifted and fed as just described an impression is made thereon from the type wheels in a manner to be hereinafter described. After the impression the cam race 942 rocks the bell crank 939 counter clockwise to normal position thereby reversing the movement of the levers 880 and 891 and causing the rollers 878 and 889 to spread apart to shift the top line of the detail strip toward the left. When this movement towards normal is about half completed, a neutral portion of the cam race 942 holds the detail strip 875 still long enough for the platen 886 to take an impression on the check paper which lies just beneath the detail strip, as will be hereinafter described. The detail strip is held still at this time otherwise it would be torn when the platen engages the type wheels to take the impression upon the check paper. After the impression has been made upon the check paper the race 942 continues to move the bell crank 939 counter clockwise and this time to normal position thereby rocking the lever 880 clockwise and the lever 891 counter clockwise to their normal position which separates the rolls 878 and 889 and causes the top line of the detail strip (Fig. 36) to be moved to the left so that the last printed impression lies just underneath the edge of the glass 933.

At certain times it may be desirable to make autographic notations upon the detail strip under the last printed impression.

For this purpose the cabinet is provided with a hand rest 945 (Fig. 1) so positioned that there is an opening 946 between said rest and the glass 933. Secured to the block 888 (Fig. 36) and directly underneath the opening 946 is a plate 947 which serves as a writing table for the detail strip. When this autographic feature is used it is necessary to feed the detail strip a greater distance so that the printing will not fall upon the autographic notations.

To change the feeding movement of the detail strip there is, projecting through the cabinet, a lever 948 (Figs. 1, 26, 29, 33, 36 and 39) loose on the stud 894. When the autographic feature is not used the lever 948 is in the position shown in Fig. 39 in which a notch 949 of an arm 950 integral with said lever 948 is in engagement with a stud 951 on a lever 952. The lever 952 is mounted on a stud 953 on the frame 646. The lever 952 has a stud 954 engaging a slot 955 in the previously described bell crank 918 which carries the lever 919. The stud 951 is held in the notch 949 by a spring 956 stretched between an arm 957 made rigid with the lever 952 by a hub 958 (Fig. 29), and a stud on the frame 646.

When the autographic feature is used the operator moves the lever 948 to the left (Fig. 39) thereby disengaging the notch 949 from the stud 951 and engaging a notch 959 of the arm 950 with said stud. The notch 959 is nearer the stud 894 than is the notch 949. Therefore when the lever 948 is moved as just described the spring 956 rocks the arm 957 and the lever 952 counter clockwise to hold the stud 951 in engagement with the notch 959. Counter clockwise movement of the lever 952 through its engagement with the bell crank 918 rocks said bell crank clockwise thereby moving the lever 919 downward. With the parts in this position as just described it is very clear that when the casting 902 is rocked counter clockwise it is rocked a greater distance before the portion 920 thereof strikes the top of the lever 919. Therefore when said casting is rotated clockwise to normal position it rotates the flange 901 and the receiving roll 893 clockwise a greater distance than when the lever 948 is in the position shown. This greater rotation of the receiving roll 893 causes the detail strip to be fed a greater distance than when the autographic feature is not used and thereby permits the impression to be made below the autographic notation instead of conflicting therewith.

The means for making impressions from the upper set of type wheels, on the detail strip will now be described.

Loose on the stud 885 and secured to the arm 883 (Figs. 29 and 39) is an arm 963 to which is pivoted a link 964 also pivoted to a lever 965 loose on a rod 966 mounted in the frames 645 and 646. The lever 965 carries anti-friction rollers 967 and 968 (Figs. 27 and 33) cooperating with cams 969 and 970, respectively, fast on the shaft 940. Also fast on the shaft 940 is a Geneva plate 973. Cooperating with notches 974 in said plate is a pin 975 on a disk 976. A hub 977, a disk 978 and a hub 979 (Figs. 2, 3 and 33) are all secured to the disk 976 by pins 980 (Fig. 27). The purpose of the disk 978 will be hereinafter described. The hub 979 is made to rotate with the shaft 651 by a key 981. Consequently the disk 976 is rotated counter clockwise with the shaft 651. When this occurs the pin 975 engages one of the notches 974 in the Geneva plate 973 and rotates said plate and the shaft 940 clockwise until the pin 975 disengages itself from said plate.

As the two cams 969 and 970 are fast on the shaft 940 they too are rotated clockwise one-fifth of a revolution, there being five slots 974 in the Geneva plate 973. The movement of the cams 970 rocks the lever 965 first clockwise and then counter clockwise to normal position. Clockwise movement of the lever 965 lowers the link 964 and rocks the arms 963 and 883 clockwise which moves the platen 886 into contact with the upper set of type wheels thereby making an impression therefrom on the detail strip. Counter clockwise movement of the lever 965 to normal position raises the platen 886 from engagement with the type wheels. The concave portions 982 of the Geneva plate are normally in engagement with the periphery of the hub 977. When the plate is rotated, as just described, the points 983 project into a clearance cut 984 in the hub 977.

It is not desired to have the date printed upon the detail strip. Therefore the detail strip does not extend over the date type wheels 771. When the impression is taken from the other type wheels on the detail strip, as just described, that portion of the platen 886 above the date wheels, is prevented from contacting with said wheels. The U-bar 887 and the platen 886 are separated approximately on the section line 36—36 (Fig. 29) thereby making a long platen 886 which cooperates with the type wheels 731, 745 and 780 and a short platen 886 (Fig. 30) which cooperates with the date type wheels when the check is printed. Secured to the short portion of the U bar 887 is a plunger 988 slidably mounted in a slot 989 in the block 888. The plunger 988 has a slot 990 into which projects one end of a lever 991 fast on a shaft 992 mounted in the arms 883. Fast on the front end of the shaft 992 is an arm 993 to which is pivoted a link 994 which has a hook surrounding the rod 885. The link 994 has a cam slot 995 into which projects a pin 996 on the lever 991. Secured to the rear end of the shaft 992 is an arm 997 (Figs. 29 and 39) having a pin 998 extending through arm 963 into a slot 999 in a link 1000 which is pivoted on a stud 1001 on a lever 1002 loose on the rod 877. The link 1000 has a hook 1003 surrounding the shaft 885 which acts as a slide support for said link. The lever 1002 has a cam slot 1004 into which projects a pin 1005 on the previously described lever 880.

As previously described the lever 880 (Fig. 39) is rocked counter clockwise before the impressions are made upon the detail strip. When this occurs the pin 1005 through the slot 1004 rocks the lever 1002 counter clockwise thereby moving the link 1000 to the left and through its engagement with the arm 997 rocks said arm, the shaft 992, and the arm 993 (Fig. 30) counter clockwise. Counter clockwise movement of the arm 993 moves the link 994 to the left and through the engagement of the cam slot 995 with the pin 996 rocks the lever 991 counter clockwise and raises the plunger 988 and the portion of the platen 886 above the date wheels 771. The platen is held in this position during the time the impression is made upon the detail strip. After the detail strip is printed the lever 880 is rocked clockwise to normal position and rocks the lever 1002 clockwise which moves the link 1000 to the right to normal position. This movement of the link 1000 rocks the arms 997 and 993 and the shaft 992 clockwise to normal position whereby the lever 991 is rocked clockwise and lowers the platen 886 so that when the check is printed as will be later described this portion of the platen makes its proper impression on the date wheels.

Fig. 60 illustrates a fragmentary portion of the detail strip which is printed in the manner above described. In the third line of printing from the top, "187652" represents the consecutive number, "347611" represents the ledger number, "M" represents that clerk M operated the machine for this transaction, "Cash" denotes the kind of transaction, "3X" designates the department in which the transaction was made. "S" indicates that a sales slip (to be hereinafter described) was printed upon and "98.00" represents the amount of this transaction. The fourth line indicates that clerk B made a charge transaction of $30.00 in department 9X. The fifth line represents that clerk H paid out from department 7X, $1.50. The next line "Mr. Smith" illustrates the manner in which the autographic feature may be used. The first two lines of printing illustrated are printed during totalizing operations and will be described in connection with said operation of the machine.

*Printer—Check mechanism.*—The paper from which the checks are printed, cut and ejected from the machine, is in a supply roll 1008 (Figs. 1, 2, 11, 26 and 36) loose on a stud 1009 mounted in a bracket 1010 secured to the frame 646. The paper is fed from the bottom of the roll through a chute 1011 suported on studs 1012 and 1013 on the frame 646, between an electroroll 1014 and an impression roll 1015, between another electroroll 1016 and an impression roll 1017. From the rolls 1016 and 1017 the paper is fed through a guide 1020 on a knife block 1021 secured to plates 1022 and 1023 (Figs. 29, 36 and 55). The block 1021 and plates 1022 and 1023 form a rigid unit. The plate 1022 is mounted on a stud 1024 on the frame 646, and the plate 1023 is mounted near the end of the stud 885 and the stud 1024. A screw 1025 (Figs. 26 and 29) holds the knife block unit in position. From the guide 1020 the paper is passed between the block 1021 and a guide strip 1026 supported by the plates 1022 and 1923, and from there through a guide 1027 secured to the knife block unit, and from said guide the paper is passed underneath the detail strip 875, between the platen 886 and the upper set of type wheels.

A plate 1030 (Figs. 29 and 36) and a plate 1031 (Figs. 26 and 29) are secured together by rods 1032. These plates are supported on shafts 1033 slidably supported on the frame 646. Loose on each rod 1032 is a pair of arms 1034 connected by a yoke 1035. The arms 1034 each carry a rod 1036 upon which is loosely mounted an ink roll 1037 which cooperates with the electrorolls 1014 and 1016. Each roll 1037 is held in contact with its respective electroroll by a torsion spring 1038 (Fig. 29). The impression rolls 1015 and 1017 are eccentrically mounted on the shafts 1033.

In Fig. 36 the impression rolls 1015 and 1017 are shown in engagement with their respective electrorolls. When the check paper is being fed into the machine as previously described these impression rolls are moved away from their electrorolls to permit the paper to pass therebetween. Secured to each shaft 1033 is a partial gear 1040 (Figs. 26 and 29) both meshing with a gear 1041 loose on a screw stud 1042 secured to the plate 1031. Fast to the gear 1041 is an arm 1043 having pivoted thereto a pawl 1044 held in engagement with a pin 1045 on the plate 1031 by a spring 1046. Three pins 1045 are provided to hold the arm 1043 in various positions. The engagement of the pawl 1044 with the pin 1045 locks the impression rolls in engagement with the electrorolls. When it is desired to release the impression rolls from the electrorolls the pawl 1044 is rocked counter clockwise to release it from the pin 1045 and the arm 1043 is rocked clockwise whereby the gears 1040 are rotated counter clockwise and because of the eccentric mounting of the impression rolls said rolls are moved away from the electrorolls a distance sufficient to permit the check paper to be passed therebetween.

*Printer—Check feeding.*—The electrorolls 1014 and 1016 are loose on studs 1049 on the frame 646. The outer ends of the studs 1049 project through the plate 1031 and help support the frame which carries the impression rolls and ink rolls. The electrorolls 1014 and 1016 are connected to gears 1050 and 1051, respectively (Fig. 39) by mortise and tenon (not shown). These gears are loose on the studs 1049. The gear 1050 meshes with a gear 1052 loose on the stud 1013. The gear 1052 meshes with a gear 1053 (Figs. 33, 39 and 40) loose on a shaft 1054 mounted in the frames 645 and 646. Secured to the gear 1053 by a hub is a gear 1055 meshing with a gear 1056 loose on the shaft 940. Secured to the gear 1056 is a Geneva plate 1057 having notches 1058 co-operating with pins 1059 secured to the disk 978 previously mentioned.

As previously stated the hubs 977 and 979 and the disk 978 are rotated with the shaft 651 by the key 981. Counter clockwise rotation of the disk 978 through the engagement of the pins 1059 with the notches 1058 of the Geneva plate 1057 rotates said plate and the gear 1056 clockwise. Clockwise movement of the gear 1056, through the gearing above described, rotates the gear 1050 counter clockwise and the gear 1051 clockwise whereby the electrorolls 1014 and 1016, respectively, are rotated to feed the check paper through the machine.

During the feeding of the check paper the electrorolls 1014 and 1016 print the advertising matter on the checks as illustrated in Figures 56, 57 and 58.

*Printer—Check impression.*—The machine herein described is adapted to print and issue either a plain check, as illustrated in Fig. 56, or a stub check, as illustrated in Fig. 57. The mechanism as shown, is set to issue a stub check. The only difference between a stub check and a single check is that a stub check receives two impressions from the upper set of type wheels while the single check receives only one impression from said type wheels. The stub check is perforated so that it may be easily separated.

The lines of printing 1062 and 1063 (Fig. 57) are printed from the type wheels illustrated in Fig. 50, by the platen 886.

As previously described, the Geneva plate 973 (Fig. 27) is rotated clockwise by the pin 975 to bring the platen 886 into contact with the type wheels to print on the detail strip. Secured to the disk 976 is a pin 1064. The disk 976 has an opening 1065 so that a plate 1066 (Figs. 3 and 27) lies in the same plane with said disk. The plate 1066 is secured to a hub 1067 made to rotate with the shaft 651 by the key 981. The plate 1066 carries a pin 1068 like the pin 1064. During the rotation of the disk 976 the pins 1064 and 1068 engage the Geneva plate 973 and give it two more partial rotations, each one of which causes the platen 886 to contact with the upper set of type wheels to make the impressions 1062 and 1063 on the check (Fig. 57). The impression 1062 is caused by the pin 1064 which takes place between the movements of the check paper which are caused by the pins 1059 (Fig. 40) as above described. The impression 1063 is caused by the pin 1068 (Fig. 27) which takes place after both movements of the Geneva plate 1057.

*Printer—Check perforator and knife.—* The plates 1022 and 1023 (Figs. 36 and 55) carry a shaft 1070. Secured to said shaft are two levers 1071. One end of said levers engages a knife 1072 slidably mounted in grooves 1073 in the plates 1022 and 1023. The other ends of the levers 1071 engage a bar 1074 slidably mounted in grooves 1075 in the plates 1022 and 1023. Secured to the bar 1074 is a perforating blade 1076. Secured to the end of the shaft 1070 is an arm 1078 (Figs. 39 and 55) to which is pivoted a link 1079 also pivoted to an arm 1080 fast on the shaft 1054. Also fast on the shaft 1054 is an arm 1081 (Fig. 28). Loose on the shaft 1054 are two arms 1082 and 1083 both secured to the arm 1081 by pins 1084. The arm 1082 carries an anti-friction roller cooperating with a cam 1086 integral with the hub 1067. The arm 1083 carries an anti-friction roller 1087 cooperating with a cam 1088 secured to the shaft 651 by the key 981.

Upon clockwise movement of the shaft 651, (Fig. 28) a projection 1089 on the cam 1086 engages the roller 1085 and rocks the arms 1082, 1083, 1081, shaft 1054, and arm 1080 counter clockwise or clockwise (Fig. 39). When the arm 1083 is rocked counter clockwise the roller 1087 rides in a cutaway portion 1090 of the cam 1088. This lowers the link 1079 and rocks the arm 1078, shaft 1070, and levers 1071 counter clockwise whereby the blade 1076 (Fig. 36) is lowered to perforate the check as at 1091 (Fig. 57). This downward movement of the blade as just described slides the knife upward. After the check is perforated the cams 1086 and 1088 through the connections above described raise the blade 1076 and lower the knife 1072 to the position shown in Fig. 36. After the check has received both impressions and near the end of the clockwise rotation of the shaft 651 (Fig. 28) a projection 1094 of the cam 1088 engages the roller 1087 and rocks the arms 1083, 1082, 1081, shaft 1054, and arm 1080 clockwise or counter clockwise (Fig. 39). When the arm 1082 is rocked as just described, its roller 1085 rides in a cutaway portion 1095 of the cam 1086. Counter clockwise movement of the arm 1080 (Fig. 39) raises the link 1079 and rocks the shaft 1070 and levers 1071 clockwise whereby the knife 1072 (Fig. 36) is lowered to sever the check from the check paper. After the check has been severed the knife is raised to the position shown in Fig. 36 as the roller 1087 leaves the high portion 1094 of the cam 1088.

*Printer—Check ejector.—* Immediately after the check has been severed from the check paper a mechanism is operated whereby the severed portion or check is ejected from the machine. Loose on a stud 1098 (Fig. 39) carried on an arm 1099 is a knurled roller 1100. The arm 1099 is pivoted on a stud 1101 (Fig. 29) mounted on a bracket 1102 secured to the frame 646. A spring 1103 holds the arm 1099 in engagement with a pin 1104 on the bracket 1102. Pivoted on a stud (not shown) carried by an arm 1106 is a knurled roller 1107. The arm 1106 is pivoted on a stud 1108 mounted in a plate 1109 and is held in engagement with a pin 1110 on said plate by a spring 1111. The knurled rollers 1100 and 1107 cooperate with knurled rollers 1112 (only one of which is shown in Fig. 39) loose on the stud 732. Secured to the side of each roller 1112 is a gear 1113 meshing with a pinion 1114 fast on a shaft 1115 mounted in the frame 646 and the plate 734. The pinion 1114, nearest the frame 646, meshes with a gear 1116 loose on the stud 733. The gear 1116 meshes with a gear 1117 (Figs. 33 and 39) loose on a stud 1118 on the frame 646. Secured to the gear 1117 is a ratchet 1120 (Figs. 33 and 41). Cooperating with the ratchet 1120 is a pawl 1121 pivoted on a stud 1122 on a pitman 1123 bifurcated to surround the stud 1118. A spring 1124 stretched between the pawl 1121 and a hook 1125 integral with the pitman 1123 holds the pawl 1121 in engagement with the ratchet 1120. The pitman 1123 is pivoted to an arm 1126 mounted on a stud 1127 on the frame 646. Pivoted to the arm 1126 at 1128 is a pitman 1129 (Fig. 39) which has a slot 1130 (Fig. 42) surrounding a roller 1131 on the shaft 651. The pitman 1129 carries an anti-friction roller 1132 projecting into a cam race 1133 in the disk 909. A spring 1134 is stretched between the pitman 1129 and a hook on the arm 1126 so that the pitman 1129 will move very rapidly to the right (Fig. 39).

During the counter clockwise rotation of the shaft 651 (Fig. 42) the pitman 1129 is moved to the left and rocks the arm 1126 (Fig. 39) counter clockwise and moves the pitman 1123 from the position shown in Fig. 39 to the position shown in Fig. 41. The cam race 1133 has a quick drop so located that, near the end of the rotation of the shaft 651, and after the check has been severed from the check roll, it causes the pitman 1129 to be moved to the right whereby the pitman 1123 is moved from the position shown in Fig. 41 to the position shown in Fig. 39. The spring 1134 is so connected to the arm 1126 that the slight rocking of the arm does not change the center of pull of said spring. In other words the spring 1134 does not rock the arm 1126 except through its pull on the pitman 1129 which takes place immediately after the roll 1132 passes the high point of the cam race 1133. The movement of the pitman 1129 to the right (Fig. 41) causes the pawl 1121 to rotate the ratchet 1120 very rapidly. The pawl 1121 has a surface 1135 which engages a stud 1136, on the frame 646, to prevent the ratchet 1120 from spinning or being "overthrown". The pawl 1121 is cut away on the line 1137 to prevent said pawl from interfering with the pivot stud for the lower end of the link 964. Counter clockwise movement of the ratchet 1120 rotates the gear 1117 counter clockwise and through the gears 1116 and 1113 and pinions 1114, the knurled disks 1112 are rotated very rapidly in a clockwise direction through an angle of 180°. As shown in Fig. 39 the disks 1112 each have two flat portions 1138. One of these flat portions is always directly beneath the knurled disks 1100 and 1107. The check paper lies between these two pairs of knurled disks. From the above description it can be seen that as the disks 1112 are rapidly rotated clockwise their true peripheries engage the under side of the check and through the pressure exerted by the springs 1103 and 1111 the severed check is quickly ejected from the machine onto a surface 1140 (Fig. 1) of the printer cabinet.

When the pitman 1123 is being moved from the position shown in Fig. 39 to the position shown in Fig. 41 the ratchet 1120 and gear 1117 are prevented from retrograde or clockwise movement by a spring-pressed pawl 1141 pivoted on a stud 1142 on the frame 646.

*Printer—Manual check control.*—The machine herein described is provided with manually operated mechanism for determining whether a stub check will be issued as above described or whether a plain check, such as illustrated in Fig. 56, will be issued. There is also a manually operated device for determining whether a check or a stub check, as the case may be, will be issued or will not be issued.

The check or stub check mechanism will be taken up first.

Fast on a sleeve 1145 (Figs. 2, 31, 32 and 34), loose on the shaft 907, is a knurled knob 1146. Said sleeve is held from lateral movement on the shaft by a screw 1147 (Fig. 2). Mounted on the sleeve 1145 is a sleeve 1148 (Figs. 2 and 28) having a pilot screw 1149 extending in a cam groove 1150 in the sleeve 1145. Integral with the sleeve 1148 is an arm 1151. Said arm is forked and extends into a groove 1152 of the hub 1067, between the plate 1066 (Fig. 3) and the cam 1086.

The knob 1146 has two inscriptions thereon (not shown) one of which is "stub check" (Fig. 34) and the other inscription is "single check" (Fig. 1). The "stub check" is at the top. Therefore the machine will issue as previously described a stub check. When it is desired to issue a single check the operator turns the knob 1146 counter clockwise (Fig. 1) thereby rotating the sleeve 1145 and through its cam slot 1150 and the pilot screw 1149 the sleeve 1148 and arm 1151 are moved toward the front of the machine (Figs. 2 and 33). When this occurs the hub 1067, and plate 1066 are moved to the right (Fig. 3). As previously described the plate 1066 carries the pin 1068 which, by its engagement with the Geneva plate 973 (Fig. 27) operates the platen 886. When the plate 1066 is moved as just described it withdraws the pin 1068 (Fig. 33) from the plane of the Geneva plate 973. Therefore when the disk 976 is rotated only the pins 975 and 1064 (Fig. 27) will rotate the Geneva plate 973, the pin 975 causing the impression to be made upon the detail strip and the pin 1064 causing one impression to be made upon the check as illustrated in Fig. 56. The cam 1088 (Fig. 3) is cut away at 1153 to allow the cam 1086 to be moved to the right.

When a single check is printed as just described it is not necessary to have the perforation 1091 (Fig. 57) in the check.

When the cam 1086 is moved to the right (Fig. 3), the projection 1089 of said cam (Fig. 28) is moved into the cutaway portion 1153 so that when the cam 1086 is rotated clockwise (Fig. 28) this projection 1089 does not engage the roller 1085. Therefore the arm 1082 is not rocked and the blade 1076 is not lowered to perforate the check.

When the knob 1146 is moved from the "single check" position to the "stub check" position the pin 1068 is again moved into the plane of the Geneva plate 973 and the projection 1089 is moved into the plane of the roller 1085 thus causing the machine to issue a stub check.

Means are provided for holding the knob 1146 in either the "single check" or "stub check" position. Secured to the sleeve 1145 is a disk 1155 (Figs. 31 and 32). Said disk has two notches 1156 and 1157. When the knob 1146 is in the "stub check" position a pawl 1158 mounted on a stud 1159 carried by a bracket 1160 is held in engagement with the notch 1156 by a spring 1161. The bracket 1160 is secured to the end of the frame 645. As the knob 1146 is fast to the sleeve 1145 the pawl 1158 affords means of retaining the knob in the "stub check" position. When the knob is turned to the "single check" position the disk 1155 is rotated counter clockwise (Fig. 31) whereby the pawl 1158 engages the notch 1157 and retains the knob in the "single check" position.

There is a device provided which prevents the machine from being operated unless the knob 1146 is set exactly in one of its two positions.

Th disk 1155 has gear teeth 1162 meshing with a partial gear 1163 secured to a sleeve 1164 loose on a sleeve 1165 which in turn is loose on a shaft 1166 mounted in the frames 645 and 646. Secured to the other end of the sleeve 1164 is a plate 1167 (Figs. 2 and 11).

Slidably mounted in the bracket 1010 is a stud 1170 having pivoted thereto a link 1171 (Fig. 2). A stud 1172 connects the link 1171 and an arm 1173 mounted on a stud 1174 on the frame 76. The stud 1172 projects into a slot 1175 of a lever 1176 pivoted on a stud 1177 on the frame 76. Pivoted to the lever 1176 is a link 1178 which is also pivoted to the lever 87.

As previously described when the machine is released the lever 87 is rocked counter clockwise (Fig. 2). This movement of the lever 87 lowers the link 1178 and rocks the lever 1176 counter clockwise whereby the slot 1175 moves the link 1171 and the stud 1170 to the right (Fig. 2). The stud 1170 has a portion 1179 (Fig. 11) normally just above the plate 1167. When said stud is moved to the right this portion of the stud projects into the path of the clockwise movement of the plate 1167. This plate 1167 is moved clockwise (Fig. 11) through the sleeve 1164, gear 1163 and gear teeth 1162 when the knob 1146 is moved from the "stub check" to the "single check" position. Should the operator leave the knob 1146 in any position between the "stub check" and "single check" positions the plate 1167 would be in front of the stud 1170 and said stud could move to the right. Therefore the lever 87 cannot move counter clockwise to release the machine. When the knob 1146 is in the "single check" position an edge 1180 of the plate 1167 then lies just above the portion 1179 of the stud 1170. The movement of the knob 1146 in a counter clockwise direction is limited by a portion 1181 of the plate 1167 contacting with the sleeve 1145. Clockwise movement of the knob 1146 is limited by the plate 1167 contacting with the sleeve 1145.

At certain times it may not be desirable to issue a check regardless of the position of the knob 1146. To this end there is provided a mechanism which renders the check feeding mechanism and the check impression mechanism ineffective. This mechanism is controlled by a manually operated knob 1184 (Figs. 1, 26 and 34) secured to a hub 1185 loose on the sleeve 1145. Secured to the hub 1185 is a partial gear 1186 (Figs. 2 and 32) meshing with a partial gear 1187 fast on the previously mentioned sleeve 1165. Secured to the other end of the sleeve 1165 is an arm 1188 (Figs. 2, 43^A and 45). The arm 1188 cooperates with a portion 1189 of a lever 1190 pivoted on a stud 1191 on an arm 1192 mounted on a stud 1193 on the frame 76. The portion 1189 is held in engagement with the arm 1188 by a spring 1194 stretched between the lever 1190 and a pitman 1195 pivoted on the stud 1191. Said pitman has a slot 1196 receiving a pin 1197 on the frame 76 which is for the purpose of guiding said pitman in its movements. The end of the pitman is bifurcated and surrounds the hub 70 of the gear 111. The pitman 1195 carries an anti-friction roller 1198 projecting into a cam race 1199 in the gear 111. Pivoted on a stud 1200 on the end of the frame 647 is an arm 1201 which (when the knob 1184 is in the "on" position, as shown in Fig. 1) engages a pin 1202 on the shaft 907. The arm 1202 is held in this position by a spring 1203 stretched between said arm and the lever 1190. A pin 1204 on the arm 1201 engages the edge of the lever 1190 when the arm 1201 is in engagement with the pin 1202.

Fast on the shaft 907 is an arm 1208 (Fig. 39) bifurcated to engage an annular groove 1209 (Fig. 3) in the hub 979. As previously described, the hub 979, disk 978, hub 977 and disk 976 are all secured together and caused to rotate with the shaft 651 by the key 981. This construction permits said parts to be slid longitudinally on the shaft. The hub 1067 and cams 1086 and 1088 are also caused to rotate with the shaft 651 by the key 981. These members are also permitted to slide longitudinally on the shaft, as previously described, in connection with the "single check" and "stub check" controlling mechanism.

The cam race 1199 (Fig. 2) moves the pitman 1195 first to the left and then to the right to normal position. The movement of said pitman to the left rocks the arm 1192 clockwise and moves the lever 1190 to the left. When the knob 1184 is in the "on" position, as shown, the arm 1188 is held in engagement with the portion 1189 of the lever 1190. When the arm 1188 is in this position, and during the movement of the pitman 1195 to the right to normal position, the lever 1190 is moved to the right to the position shown in Fig. 2.

When it is desired to throw the check mechanism off the knob 1184 is turned to the "off" position (Fig. 1) which, through the gears 1186 and 1187 and sleeve 1165, rocks the arm 1188 clockwise (Fig. 43^A) and disengages said arm from the portion 1189 of the lever 1190. With the knob 1184 in this position, the movement of the pitman 1195 to the left moves the lever 1190 to the left as previously described and the spring 1194 rocks the lever 1190 and the arm 1201 counter clockwise (Fig. 2) and disengages the arm 1201 from the pin 1202 and engages a notch 1210 of the lever 1190 with the pin 1202. When the pitman 1195 is moved to the right the notch 1210 being in engagement with the pin 1202 moves the shaft 907 to the right (Fig. 2) whereby the arm 1208 slides the hubs 979, 977 and 1067, disks 978 and 976, and cams 1086 and 1088 to the right (Figs. 2 and 3). This movement of the arm 1208 moves the pins 1059 out of the plane of the Geneva plate 1057 (Fig. 33) and moves the pins 1064 and 1068 (Fig. 27) out of the plane of the Geneva plate 973, and moves the projection 1089 of the cam 1086 out of the plane of the roller 1085 and moves the entire cam 1088 out of the plane of the roller 1087.

With the parts shifted as just described it is very clear that when the disks 976 and 978 are rotated, the Geneva plates 973 and 1057 respectively are not rotated to feed the check or to operate the platen 886 to make impressions on the check paper. However, the pin 975 in the disk 976 is longer than the pins 1064 and 1068. Therefore said pin is not moved out of the plane of the Geneva plate 973 when the plate 976 is shifted. Therefore said pin moves the Geneva plate to cause the platen 886 to make one impression, this impression being for the detail strip, as previously described.

As the shifting of the cams 1086 and 1088 moves them out of operative relation with the rolls 1085 and 1087 the perforating blade 1076 and the knife 1072 are not operated when the knob 1184 is in the "off" position.

If the knob 1184 is left in the "off" position for an operation subsequent to that just described, the movement of the pitman 1195 to the left moves the lever 1190 to the left, and through its engagement with the pin 1202 the shaft 907 is moved to the left to normal position, but as the knob 1184 is in the "off" position the lever 1190 remains in engagement with the pin 1202 and as the pitman 1195 is moved to the right to normal the shaft 907 is again moved to the right to slide the mechanism illustrated in Fig. 3 and thereby render the check issuing mechanism and the knife and perforator mechanism ineffective.

In the operation just described the shaft 907 ends up to the right with the pin 1202 in engagement with the notch 1210 (Fig. 2). Should the knob 1184 be turned from the "off" position (assumed for the last operation described) to the "on" position shown, the arm 1188 would be rocked counter clockwise (Fig. 43^A) which would rock the lever 1190 clockwise about the stud 1191. With the parts in this position, when the pitman 1195 is moved to the left the lever 1190 engages the pin 1202 and moves the shaft 907 to the left to the position shown and the arm 1201 again snaps over the pin 1202 under the influence of the spring 1203 and locks the shaft 907 in the "on" position. After this has taken place the pitman 1195 is moved to the right to the position shown, but as the lever 1190 has been disengaged from the pin 1202 the shaft 907 is not moved to the right but allowed to remain in the position shown. Therefore the Geneva plates 973 and 1057 are operated by the pins 1059, 1064 and 1068 to issue a stub check and to operate the knife and perforator mechanism.

The partial gear 1186 associated with the knob 1184 has two notches, like the notches in the disk 1155, with which cooperates a pawl 1212 mounted in the bracket 1160. The pawl 1212 cooperates with the notches in the gear 1186, in identically the same manner as the pawl 1158 cooperates with the notches 1156 and 1157 in the disk 1155, and thereby acts as an aligner for the knob 1184. Secured to the other end of the sleeve 1165 which carries the partial gear 1187 (Fig. 32) is a plate 1213 (Figs. 2 and 11) very similar to the plate 1167. This plate 1213 is operated by the knob 1184 in identically the same manner as the plate 1167 is operated by the knob 1146, and is for the purpose of preventing the shaft 88 from being rocked to release the machine unless the knob 1184 is exactly in one of its two positions.

*Printer—Automatic check control.*—The mechanism for automatically determining whether a check will be issued regardless of the position of the knob 1184, will now be described.

Loose on a rod 1214 (Figs. 33, 43^A, 45 and 49 is a pair of arms 1215 and 1216 made integral by a yoke 1217. The yoke 1217 cooperates with the rack 669 associated with the clerks' keys 134 and the list key 135. The arm 1216 has an integral portion 1218 cooperating with a portion 1219 of the lever 1190 (Fig. 2). In Fig. 49 the rack 669 is shown in the zero position. There is a notch 1220 in said rack so located that when the rack is moved to the "1" position under the control of the "list" key 135, the notch is below the yoke 1217.

With the yoke 1217 engaging the true edge of the rack 669 the portion 1218 of the arm 1216 is held down as shown in Figs. 43^A, 45 and 49) whereby said portion is held in engagement with the portion 1219 of the lever 1190. The true edge of the rack 669 engages the yoke 1217 when set to any of its positions except the "1" position. In other words when any of the clerks' keys 134 are depressed the portion 1218 of the arm 1216 engages the portion 1219 of the lever 1190 thereby preventing said lever from being rocked counter clockwise to engage its notch 1210 with the pin 1202. Therefore, regardless of the position of the knob 1184 the lever 1190 is always maintained in its down position so that it can not engage the pin 1202 and a check is always issued upon the depression of any of the clerks' keys 134.

If the knob 1184 is in the "on" position then both the knob and the automatic mechanism just described will cause the check to be issued upon depression of any of the clerks' keys 134.

When the list key 135 is depressed the rack 669 is moved to a position so that the notch 1220 therein lies beneath the yoke 1217. With this key depressed if the knob 1184 is in the "off" position there is no check issued because the lever 1190 is rocked counter clockwise by the spring 1194 and it can be seen that if the notch 1220 is below the yoke 1217 the lever 1190 can rock the arms 1216 and yoke 1217 clockwise (Figs. 43ᴬ and 49) to allow the notch 1210 in the lever 1190 to engage the pin 1202 and move the shaft 907 to the right upon operation of the pitman 1195.

If the knob 1184 is in the "on" position and the list key 135 pressed a check is issued because the arm 1188 holds the lever 1190 in its down position.

In other words if any of the keys 134 is depressed and the knob 1184 is set in the "off" position a check is issued, but if the key 135 is depressed and the knob 1184 is in the "off" position a check is not issued. If the knob 1184 is in the "on" position and the list key 135 is depressed a check is issued.

*Printer-automatic throw-off.*—In addition to the automatic check controlling mechanism above described there is also provided a mechanism for rendering said automatic check controlling mechanism ineffective when so desired.

A key 1222 (Figs. 1 and 2) is slidably mounted on a stud 1223 in the frame 76. The lower end of the key 1222 is pivoted to a lever 1224 loose on the stud 83. Pivoted to the lever 1224 is a link 1225 which carries a stud 1226 projecting in an opening 1227 of a lever 1228 loose on a shaft 1229 mounted in the frames 76 and 89. The lever 1228 has a stud 1230 engaging a slot 1231 in a link 1232 pivoted on a stud 1233 on a lever 1234 (Fig. 43ᴬ) pivoted on the stud 1191 which carries the lever 1190. A spring 1235 (Fig. 2) stretched between the stud 1226 and a hook on the link 1232 holds the bottom of the slot 1231 in engagement with the stud 1230 and also holds the edge of the lever 1234 in engagement with the pin 1204 on the arm 1201.

As previously described any one of the clerks' keys 134 causes a check to be automatically issued regardless of the position of the knob 1184. Let it be assumed that for a certain operation involving the depression of a clerk's key it is desired not to issue a check. In this case the operator, before depressing the clerk's key, depresses the key 1222. This key is held in depressed position by the engagement of the upper end of a lever 1236 pivoted on a stud 1237 on the frame 76, with a shoulder 1238 of said key. When the shoulder 1238 is moved below the hook on the lever 1236 a spring 1239 rocks said lever clockwise thereby retaining the key 1222 in its depressed position.

Depression of said key rocks the lever 1224 counter clockwise and raises the link 1225, which moves the stud 1226 into the upper portion of the opening 1227. This puts extra tension on the spring 1235 and slightly raises the link 1232 until the lever 1234 strikes the pin 1202. With the parts in this position it can be seen that, when the pitman 1195 is moved to the left, a notch in lever 1234, identical with the notch 1210 in the lever 1190, engages the pin 1202. This movement of the lever 1234 is entirely independent of the lever 1190. As previously described when one of the clerks' keys 134 is depressed the lever 1190 is held in the down position by the engagement of the portion 1218 (Fig. 49) with the portion 1219 (Fig. 2) on said lever. When the pitman 1195 is moved to the right to normal the notch in the lever 1234 being in engagement with the pin 1202 moves the shaft 907 to the right to slide the mechanism illustrated in Fig. 3, which as previously described renders the check issuing mechanism, and the knife and perforator mechanism, ineffective.

When the shaft 88 is rocked clockwise (Fig. 2) near the end of the operation of the machine to release the keys, as previously described, a pin 1240 on the lever 87 engages the lower portion of the lever 1236 and rocks said lever counter clockwise whereby its hook is disengaged from the shoulder 1238 on the key 1222. When this happens a spring 1241 stretched between the stud 1226 and the stud 1193 pulls the link 1225 downward and rocks the lever 1224 clockwise thereby restoring the key 1222 to its normal position. This movement also, through the engagement of the stud 1226 with the lower portion of the opening 1227, rocks the lever 1228 clockwise whereby its stud 1230 moves the link 1232 downward to normal position, which rocks the lever 1234 clockwise to the position shown in Fig. 2. At the end of this operation of the machine the shaft 907 is moved to the right. Should a subsequent operation of the machine call for the issuance of a check by the automatic mechanism under the control of the clerks' keys and the key 1222 be not depressed, the pitman 1195 in its movement to the left would move the shaft 907 to the left to the position shown whereby the arm 1201 again engages the pin 1202 and holds the shaft in this position. The link 1232 holds the arm 1234 in its downward position and the portion 1218 by its engagement with the lever 1190 holds said lever in its downward position so that during the movement of the pitman 1195 to the right, neither the lever 1190 nor the lever 1234 engage the pin 1202. Therefore the shaft 907 remains in the position shown, whereby a check is automatically issued under the control of the depressed clerk's key.

From the above description it is very clear that depression of the key 1222 automatically renders the automatic check device, controlled by the clerks' keys, ineffective.

Slidably mounted on the shaft 88 and the stud 1223 is a plate 1244 having a foot 1245 cooperating with a portion 1246 on the key 1222. The plate 1244 has a cam slot 1247 in which projects a pin 1248 on the lever 87. When the lever 87 is rocked counter clockwise as previously described to release the motor operating mechanism the pin 1248, through its engagement with the cam slot 1247, moves the plate 1244 to the left and positions the foot 1245 beneath the portion 1246 thereby preventing the key 1222 from being depressed after the machine has been released for operation. When the lever 87 is restored to its normal position the foot 1245 is moved out from under the portion 1246 thereby allowing the key to be depressed as a preliminary operation of the machine. The key 1222 must be fully depressed, if depressed at all, or it prevents the movement of the lever 87 which is necessary to release the motor because the portion 1246 of the key 1222 is so located that if the key is held partially depressed the foot 1245 of the plate 1244 strikes said portion thereby preventing the lever 87 from being rocked. When the key is fully depressed the foot 1245 passes above the portion 1246 thereby allowing the lever 87 to be rocked counter clockwise to release the machine for operation.

Should the key 1222 be depressed by mistake it may be released, before any of the keys 134 have been depressed, by the counter clockwise movement of the lever 280 (Fig. 15) which, as previously described, rocks the shaft 88 and the lever 87 clockwise (Fig. 2). This causes the stud 1240 to engage the lever 1236 and rock said lever counter clockwise to release its upper end from the shoulder 1238 on the key 1222.

*Printer—Slip printing mechanism.*—The machine is designed for printing upon an inserted slip or other paper substantially like the sample slip illustrated in Fig. 59. The slip is placed on a table 1250 (Figs. 1, 26 and 36). An arrow on the cabinet (Fig. 1) is the guide for placing the slip in the machine so that the first impression will be made upon the top sheet (Fig. 59).

The impressions upon the slip are made from the lower set of type wheels (Fig. 36). Loose on the shaft 966 is a pair of arms 1251 and 1252 (Figs. 33 and 36) made integral by a yoke 1253. The arms 1251 and 1252 have integral therewith a U-bar 1254 carrying a platen 1255 made of rubber or other resilient material thus forming a hammer. Fast on the shaft 966 is a lever 1256 normally held in engagement with a pin 1257 on the arm 1251 by a spring 1258 stretched between said lever and said pin. Also fast on the shaft 966 is an arm 1259 (Fig. 35) carrying a roller 1260 cooperating with a cam 1261 secured to the side of a gear 1262 loose on the shaft 1054. The gear 1262 meshes with a gear 1263 secured to the side of a gear 1264 loose on the shaft 940. The gear 1264 meshes with a gear 1265 fast on the shaft 651. Counter clockwise movement of the shaft 651 (Fig. 36) through the gearing just described rotates the cam 1261 counter clockwise (Fig. 35). This cam has two high portions 1266 and 1267 and is cut away on the line 1268. The cutaway portion cooperates with a point 1269 of the arm 1259. During the counter clockwise movement of the cam 1261 the portion 1266 rocks the arm 1259, shaft 966 and lever 1256 clockwise. This movement of the lever 1256 permits the arms 1251 and 1252 to rock clockwise by gravity or under the influence of the spring 1258 thereby lowering the platen 1255.

Rigid with the lever 1256 is an arm 1272 having connected thereto a strong spring 1273 also secured to a stud 1274 on the frame 646. This spring holds the arm 1272 in engagement with a projection 1275 secured to the base of the machine and thereby limits the counter clockwise movement of the lever 1256. As above mentioned the arm 1259 is rocked clockwise when the portion 1266 engages the roller 1260. One side of the portion 1266 is radial with the center of the shaft 1054 thereby allowing a very quick counter clockwise movement of the arm 1259 under the influence of the spring 1273. The point 1269 of the arm 1259 contacting with the portion 1266 prevents the roller 1260 from contacting with the cam as the cam is about to leave the point 1269. This gives a quicker drop or counter clockwise movement to the arm 1259. As the arm 1259 and lever 1256 are fast on the shaft 966 and as the arm 1272 is rigid with the lever 1256 the spring 1273 rocks these members very rapidly in a counter clockwise direction as the point 1269 drops off from the point 1266. The engagement of the lever 1256 with the lever 1257 rocks the arms 1251 and 1252 counter clockwise very rapidly, thereby moving the platen 1255 upward into contact with the lower set of type wheels to make an impression 1276 (Fig. 59) on the top sheet of the duplicate slip. To insure a good impression from the type wheels the arm 1272 strikes the stop 1275 before the platen 1255 engages the type wheels, but as the arms 1251 and 1252 are loose on the shaft 956, the momentum attained by the hammer under the action of the spring 1273 while the lever 1256 is in engagement with the pin 1257, is sufficient to impel the hammer from the position shown in Fig. 36 into contact with the type wheels with a hammer blow. After the impression 1276 is made the slip is fed to the right (Figs. 1 and 36) by means to be hereinafter described, after which the portion 1267 of the cam 1261 actuates the platen 1255 in the manner just described to make an impression 1277 (Fig. 59) on the bottom sheet of the duplicate slip. An opening 1278 (Fig. 36) is made in the table 1250 to allow the platen 1255 to project therethrough.

The means for putting a tension on the slip so that it can not move while the impressions are being made thereon and the means for feeding the slip between the two impressions will now be described. Fast on a shaft 1280 (Figs. 33 and 36) mounted in the frames 645 and 646 is a lever 1281 carrying a stud 1282 upon which is rotatably mounted a pair of knurled rollers 1283 and 1284. These rollers are connected by a sleeve so that they rotate as a unit. Pivoted to the lever at 1285 is a link 1286 which is pivoted to an arm 1287 (Fig. 38) loose on the shaft 1054. The arm 1287 is held in engagement with a pin 1288 on a lever 1289 loose on the shaft 1054 by a spring 1290 compressed between said arm and said lever. The lever 1289 carries an anti-friction roller 1291 projecting into a cam race 1292 in a disk 1293 fast on the shaft 651.

Clockwise movement of the shaft 651 (Fig. 38) rocks the lever 1289 first counter clockwise and then clockwise to normal position. As the lever 1289 is rocked counter clockwise the spring 1290 rocks the arm 1287 counter clockwise and maintains the engagement between said arm and the pin 1288 thereby moving the link 1286 to the right. This movement of the link 1286 is to the left, as viewed in Fig. 36, whereby the lever 1281 is rocked clockwise and carries the rollers 1283 and 1284 upward into engagement with a knurled roller 1295 loose on a stud 1296 on the frame 646.

The rollers 1283 and 1284 are moved into engagement with the roller 1295, as just described, previous to the first impression made upon the slip and held in engagement therewith until after the second impression has been made upon said slip. Between the two impressions the slip is advanced so that said impressions will be properly spaced. The advancement of said slip is accomplished by rotating the rollers 1283 and 1284 in a clockwise direction (Fig. 36) in a manner which will now be described.

Loose on the stud 1282 is an arm 1300 having pivoted thereto at 1301 a link 1302, also pivoted on a stud 1303 on an arm 1304 loose on the shaft 1280. Also pivoted on the stud 1303 is a link 1305 also pivoted on a stud 1306 (Figs. 33 and 37) on a link 1307 the upper end of which is pivoted to an arm 1308 fast on a sleeve 1309 loose on the shaft 1054. The stud 1306 projects through a slot 1310 of a lever 1311 loose on the shaft 1054. Pivoted to the lever 1311 is a pitman 1312 carrying an anti-friction roller 1314 projecting into a cam race 1315 in the previously described disk 805.

Clockwise movement of the disk 805 moves the pitman 1312 to the left (Fig. 37) and rocks the lever 1311 clockwise thereby moving the link 1305 to the left. This movement of the link 1305 is towards the right (Fig. 36) whereby the arm 1304 is rocked counter clockwise and moves the link 1302 which rocks the arm 1300 counter clockwise. The arm 1300 carries a loosely mounted roller 1317 engaged by a spring-pressed plunger 1318. This roller 1317 is mounted between the inner periphery of the roller 1284 and a cut-away portion 1319 of the arm 1300. Counter clockwise movement of the arm 1300 does not rotate the roller 1284 because a loosely mounted roller 1320 on the lever 1281 becomes slightly wedged between a cut-away portion 1321 of said lever and the inner periphery of the roller 1284. The movement of the arm 1300 as just described occurs just as the lever 1281 is being rocked clockwise to engage the rollers 1283 and 1284 with the roller 1295. After said engagement and after the first impression has been made upon the slip the cam race 1315 (Fig. 37) reverses the movement of the pitman 1312 and thereby through the mechanism above described rotates the arm 1300 clockwise whereby the roller 1317 becomes slightly wedged between the inner periphery of the roller 1284 and the cut-away portion 1319 on the arm 1300 and the roller 1284 is rotated to feed the slip so as to properly space the impressions thereon.

If it be desired to change the distance between the impressions upon the slip in case a different style slip is used, this can be done by means provided for adjusting the mechanism just described so that the rollers 1283 and 1284 can be rotated a greater distance than as just described. Secured to the sleeve 1309 is a plate 1324 (Fig. 26) having a slot 1322. The plate is held in position by a screw 1323 projecting through the slot. By loosening the screw 1323 and moving the plate 1324 clockwise (Fig. 26), the arm 1308 is moved counter clockwise (Fig. 37) and moves the stud 1306 downward in the slot 1310 thereby moving said stud further away from the center of the shaft 1054. As the link 1305 is moved back and forth through the medium of the slot 1310 and stud 1306 it is very clear that the farther away from the center of the shaft 1054 said stud is positioned, the greater will be the movement of the link 1305. Through this means the slip-feeding mechanism may be advanced varying distances to accommodate various slips.

When there is no slip in the machine the platen 1255 is prevented from contacting with the type wheels. Pivoted on a stud 1325 (Fig. 26) is a lever 1326 engaging a stud 1327 on a pitman 1328 carrying a roller 1329 cooperating with a cam 1330 fast on the shaft 651. The roller 1329 is held in engagement with the cam 1330 by a spring 1331 stretched between a pin on the pitman and a pin on the frame 645. The pitman 1328 is pivoted to a lever 1332 loose on a stud 1333 mounted in the frame 645. The lever 1326 has a vertical portion 1334 normally in the position shown in Fig. 26. Upon counter clockwise rotation of the cam 1330 (Fig. 26) the pitman 1328 is moved to the right by the spring 1331. If there is no slip in the machine the portion 1334 of the lever 1326 passes through an opening 1335 in the table 1250 and the pitman 1328 rocks the lever 1332 counter clockwise until a portion 1336 thereof lies beneath a portion 1337 integral with the U-bar 1254. With the parts in the position as just described, the clockwise movement of the lever 1256 (Fig. 36) stretches the spring 1258 and the spring 1273, but due to the portion 1336 being beneath the portion 1337 the spring 1258 can not pull the platen 1255 downward. Therefore when the point 1269 of the arm 1259 drops off from the points 1266 and 1267 of the cam 1261 the spring 1273 rocks the lever 1256 and arm 1272 until said arm contacts with the stop on the base, but as the arms 1251 and 1252 were not rocked clockwise the platen 1255 is not moved against the type wheels. As the cam 1330 nears the completion of its rotation the high portion thereon engages the roller 1329 and moves the pitman 1328 to the left to normal position thereby rocking the lever 1336 clockwise out of engagement with the portion 1337.

When there is a slip in the machine the portion 1334 of the lever 1326 engages the under side of the slip and as a consequence said lever is rocked only slightly in a counter clockwise direction when the high portion of the cam 1330 leaves the roller 1329, the spring 1331 not being strong enough to cause the portion 1334 of the lever 1326 to break the slip.

Secured to the previously described shaft 797 is a lever 1338 carrying a pawl 1339 pivoted at 1340. A spring 1343 is stretched between said pawl and the lever 1338. A plate 1342 is slidably mounted on a stud 1344 and the stud 1333 and is held in the position shown by a spring 1345 stretched between said plate and a pin on the lever 1332. The shaft 797 as previously described is rocked first counter clockwise and then clockwise. Counter clockwise movement of the shaft 797 does not take place until after the lever 1326 is rocked counter clockwise to "feel" for the slip. If there is a slip in the machine the pawl 1339, upon counter clockwise movement of the shaft 797, engages the pin 1346 and through the plate 1342 prevents the lever 1332 from being rocked by the spring 1331. This engagement of the pawl and pin also prevents the pitman 1328 from being moved to the right after the portion 1334 strikes the slip, thus allowing the platen 1255 to be lowered to make two impressions on the slip. After the impressions have been made on the slip the shaft 797 is rocked clockwise to normal position thereby moving the pawl 1339 to the position shown.

If there is no slip in the machine and the portion 1334 projects through the plate 1250 far enough to allow the spring 1331 to rock the lever 1332 to position its portion 1336 underneath the portion 1337, the plate 1342 is moved with the lever 1332 and positions the pin 1346 so that during the counter clockwise movement of the lever 1338 the pawl 1339 passes under the pin 1346. During this operation when there is no slip in the machine the pawl 1339 is moved to its normal position before the pitman 1328 and lever 1332 are restored to their normal positions. Therefore when said lever 1332 is rocked clockwise the pin 1346 strikes the pawl 1339 and rocks said pawl counter clockwise until the pin is passed, after which the spring 1343 restores the pawl to the position shown in which the spring pin on the pawl limits the clockwise movement of the pawl by its engagement with a portion of the lever 1338.

Means is provided for printing a letter "S" on the check, detail strip and slip. This "S" is in the zero position of the highest amount wheels 731. When there is no slip in the machine this letter "S" is not printed on either the detail strip or check. As previously described there is a "zero elimination" mechanism in the machine whereby the zeros to the left of the highest amount are eliminated. As above mentioned the letter "S" occupies the zero position on the highest amount wheels. Therefore when the "S" is printed it is necessary to cripple the zero elimination mechanism for the highest amount rack.

The pitman 1328 carries a pin 1349 (Figs. 44 and 62) extending in a slot 1350 of an arm 1351 fast on the shaft 1166. Fast on the other end of the shaft 1166 is an arm 1352 (Fig. 45) carrying a pin 1353 projecting in a slot 1354 of a lever 1355 loose on the shaft 1214. An edge 1356 of the lever 1355 normally rests against a foot 1357

(Figs. 43ᴬ and 62) on the lever 836 associated with the rack 669 of highest denomination and holds said lever in the position shown whereby its shoulder 837 is out of engagement with the notch 838 of said rack.

When a slip is in the machine the pitman 1328 is moved only slightly to the right (Fig. 44) as above described. This movement, through the engagement of the pin 1349 with the slot 1350 rocks the arm 1351, shaft 1166 and arm 1352 counter clockwise. However, this movement does not move the pin 1353 out of the substantially horizontal portion of the slot 1354. Therefore the lever 1355 is held in the position shown, whereby its edge 1356 remains in engagement with the foot 1357 and does not permit the spring 852 to rock this lever 836 clockwise. From the above description it can be clearly seen that, with the lever 836 held in the position shown in Fig. 43ᴬ by the lever 1355, the shoulder 837 of said lever 836 can not engage the notch 838 of the highest amount rack 669 to move said rack from its zero position to the eliminated position when the other levers 836 eliminate their respective racks. Therefore, the highest amount type wheels 745 remain in the zero position to print the letter "S" on the slip, check and detail strip.

When there is no slip in the machine the pitman 1328 moves a greater distance to the right (Fig. 44) thereby rocking the arms 1351 and 1352 counter clockwise a greater distance. This moves the pin 1353 into the substantially vertical portion of the slot 1354 thereby rocking the lever 1355 clockwise, whereby the shoulder 837 of the lever 836 engages the notch 838 of the rack 669 and as the levers are moved to the left (Fig. 43ᴬ), as previously described, this rack 669 of the highest denomination is moved from the "zero" or "S" position to move the type wheels to a non-print position.

*Printer—Ribbon mechanism.*—The means for inking the upper and lower sets of type wheels is an ink ribbon 1360 (Fig. 36) supported by seven sleeves 1361 secured to the plate 1109 (Figs. 26 and 29), and an ink roll 1363 loose on a sleeve 1364 carried by the plate 1109. The roll 1363 is made of felt or other suitable ink receiving material. The sleeves 1361 are supported by studs 1365 on the frame 646 and the sleeve 1364 is supported by a stud 1366 on the frame 646. This manner of mounting the ribbon is convenient in that by removing the plate 1109 the entire ribbon and ink roll may be easily removed from the machine. The plate 1109 has openings therein for the date knobs 774 and for the insertion of the key 812 (Fig. 26).

A tension is maintained on the ribbon 1360 by a roller 1367 on a rod 1368 (Figs. 29 and 36) supported by parallel arms 1369 loose on a stud 1370 mounted in the frame 646 and supported at its outer end by the plate 1109. The roller 1367 is held against the ribbon by gravity.

Secured to the roll 1363 is a ratchet 1372 (Fig. 39). Loose on the stud 1366 is an arm 1373 carrying a spring-pressed driving pawl 1374 engaging the ratchet 1372. Pivoted to the arm 1373 is a link 1375 having a slot 1376 engaging a pin 1377 on the previously described lever 796. A spring 1378 stretched between a stud on the frame 646 and a pin 1379 on the link 1375 holds the pin in engagement with a toe 1380 (Fig. 26) of a lever 1381 loose on the stud 1370, thereby limiting the downward movement of the link 1375.

As previously described in connection with the consecutive number operating mechanism the lever 796 is rocked counter clockwise (Fig. 39) and then clockwise to normal position. Near the end of the counter clockwise movement of said lever the pin 1377 engages the end of the slot 1376 and moves the link 1375 upward thereby rocking the arm 1373 counter clockwise, whereupon the pawl 1374 turns the ratchet 1372 and consequently the ink roll 1363 counter clockwise to feed the ribbon so that two impressions are not made in the same place on the ribbon. As the lever 796 is moved clockwise to normal position, the spring 1378 lowers the link 1375 and returns the arm 1373 and pawl 1374 to the position shown in Fig. 39. To prevent clockwise or retrograde movement of the ratchet 1372 a spring-pressed retaining pawl 1382 is always in engagement with said ratchet.

The ribbon 1360 has a seam 1383 (Fig. 36) straight across said ribbon, and as an impression of the type on said seam is not clear, a mechanism is provided for feeding the ribbon a greater distance as the seam approaches the platens 886 and 1255 so that said seam is always moved past these platens and never stops at the printing line.

Secured to the ribbon 1360 are two metal buttons 1384 cooperating with a flange 1387 of an arm 1388 rigid with the lever 1381. When one of the buttons 1384 engages the flange 1387, during the movement of the ribbon, it rocks the arm 1388 and the lever 1381 clockwise and disengages the toe 1380 from the pin 1379 on the link 1375 thereby allowing the spring 1378 to move the link 1375 downward, whereby the upper end of the slot 1376 is moved close to the pin 1377. Downward movement of the link 1375 also rocks the arm 1373 clockwise a greater distance than previously described.

With the parts in the position just mentioned the pin 1377 engages the upper end of the slot 1376 during the first part of the counter clockwise movement of the lever 796 and moves the link 1375 upward, whereupon the arm 1373 is rocked counter clockwise. As this movement of the link 1375 and arm 1373 is much greater than that previously described it is very clear that the ribbon is fed a greater distance than when the button 1384 does not rock the lever 1381 to disengage the toe from the pin 1379. During this movement of the ribbon the button 1384 which caused the long feed is moved past the flange on the arm 1388 so that the lever 1381 by its own weight is rocked counter clockwise after the pin 1379 has been moved to its highest position and when the lever 796 is rocked clockwise to its normal position the spring 1378 pulls the link 1375 downward until the pin 1379 again engages the toe 1380 on the lever 1381. These two buttons 1384 are so positioned on the ribbon that the seam 1383 is always fed past the upper and lower sets of type wheels to prevent the platens 886 and 1255 from contacting with said seam.

*Total and sub-total mechanism.*

As the tripped transfer devices are not restored to untripped positions before a succeeding operation of the machine as above described and in order to allow sufficient time for the selection of a desired totalizer and the engagement of said selected totalizer with the actuating segments 366 (Fig. 9) when a total or sub-total is to be printed, the main drive shaft 112 is given two continuous rotations for said total and sub-total printing operations instead of one, as is the case in adding operations. During the first rotation of the shaft 112 the tripped transfer devices are restored to untripped position by the lever 429 as previously described, and one of the totalizers is moved into engagement with its segments 366 and during the second rotation of the shaft the engaged totalizer pinions 370 control the extent of the movement of the differentially movable members and hence the setting of the type wheels to print a total or sub-total on the record strip.

Figure 7:
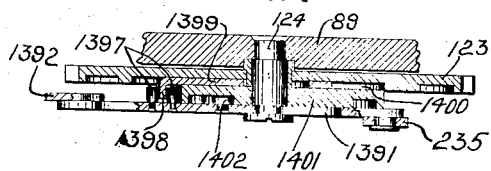
Fig. 7 is a section on line 7—7 of Fig. 6, looking in the direction of the arrows.

To permit two rotations of the shaft 112 in total and sub-total operations the lever 137 controls mechanism shown in Figs. 6 and 7 to prevent the restoring of the motor locking lever 82 (Fig. 2) to normal locking position until near the end of the second rotation.

Slidably mounted on the stud 124 (Figs. 6 and 7) is a link 1391 one end of which is pivoted to a lever 1392 loose on the stud 240. Pivoted to the lever 1392 is a link 1393, also pivoted to an arm 1394 fast on the previously mentioned shaft 1229. The link 1391 has a stud 1395 engaging a slot 1396 in the previously described link 235. The link 1391 has two pins 1397, one on each side of a projection 1398 of a plate 1399 slidably mounted in a groove 1400 in a disk 1401. The link 1391 also has an anti-friction roller 1402 normally in engagement with a notch 1403 in the disk 1401 mounted on the stud 124. The gear 123 has a circular cut 1404 in which the disk 1401 lies.

Fast on the shaft 1229 (Figs. 21ᴮ and 25) is an arm 1406 carrying a pin 1407 projecting into a slot 1408 in the previously described lever 322.

From a previous description it will be remembered that the movement of the total lever 137 either up or down for a sub-total or total operation, respectively, rocks the lever 325 counter clockwise through the engagement of its pin 326 with the slot 327 in the plate 295, whereby through the spring 330 the lever 322 is rocked counter clockwise. This movement, through the pin 1407, rocks the arm 1406 and the shaft 1229 clockwise (Fig. 25). Clockwise movement of the shaft 1229 (Fig. 6) rocks the arm 1394 clockwise whereby through the link 1393 the lever 1392 is rocked clockwise and moves the link 1391 to the left in the direction of its length. This movement of the link 1391 through the engagement of its pins 1397 with the plate 1399 moves said plate to the left into engagement with a notch 1410 in the gear 123 thus connecting said gear and the disk 1401. At the same time the roller 1402 is moved into engagement with a cam slot 1411 in the disk 1401. The movement of the link 1391 also rocks the link 235 clockwise about the stud 231. As the disk 1401 is connected to the gear 123, the counter clockwise movement of said gear and disk through the cam roll 1402 moves the link 1391 still further to the left and rocks the link 235 still further so that when the lever 241 is lowered near the end of the first half rotation of the gear 123 by the cam portion 246 as described in adding operations, the stud 242 moves idly in the elongated portion of the opening 243 thus preventing the link 235 from rocking the shaft 88 to rock the lever 87 to normal position. As the lever 87 is not rocked to normal position, the lever 82 is not locked near the end of the first rotation of the shaft 112 when the pin 115 raises the link 113 to rock the lever 82 to normal, and therefore the spring 95 immediately rocks the lever 82 to allow the motor clutch to drive the gears and shaft 112 a second rotation. Near the end of the complete rotation of the gear 123 the link 1391 is moved to the position in which it was adjusted by the total lever 137 so that when the lever 241 is rocked clockwise the second time by the second cam portion 246 the stud 242 engages a shoulder 1412 in the opening 243 to lower the link 235 to rock the lever 230 and shaft 88 counter clockwise (Fig. 6) slightly past normal position but not as far past normal as in adding operations. Just before this movement of the lever 87, the pin 115 (Fig. 2) rocks the lever 82 to normal and the lever 87 when moved past normal, engages the pin 85 and locks the lever 82 to stop the motor as in adding operations. The shaft 88 is rocked slightly past normal position so that the stud 195 (Fig. 10) is carried to the rear of the lever 260 and said lever is rocked clockwise by the spring 261 to prevent an immediate second operation of the machine when the total lever is out of its adding position. With the lever 260 in front of the stud 195, when the total lever is out of adding position, the spring 186 moves the detent 173 and rocks the arm 194 counter clockwise to normal position whereby it moves the lever 260 out from in front of the stud 195 and the spring 233 (Fig. 6) rocks the shaft 88 and arm 196 (Fig. 10) to normal position. In adding operations the shaft 88 is rocked farther past normal position than in total and sub-total operations for the purpose of releasing the operated amount keys, but as no amount keys are operated in total and sub-total operations it is not necessary to rock the shaft so far.

In totalizing operations a selected totalizer is moved into engagement with the segments 366 before said segments are moved by the segments 365 and latches 375, whereby the differential movement of the segments 366 is controlled by the totalizer pinions 370. After the actuators have been moved differentially under the control of said totalizer, the totalizer is disengaged from the actuator thereby leaving the totalizer at zero.

In sub-totalizing operations the totalizer is engaged with the actuators before the actuators are moved differentially and held in engagement with said actuators to control the differential movement thereof to print a sub-total. The totalizer is also held in engagement with the actuators while said actuators are being restored, thereby accumulating upon the totalizer the amount which was taken therefrom. The mechanism for controlling the engaging and disengaging of the totalizers in total and sub-total operations will be hereinafter described.

The mechanism whereby said totalizer controls the differential movement of the actuators during total and sub-total operations will now be described. Pivoted on a stud 1415 (Fig. 21^A) on the plate 298 is a lever 1416 carrying a pin 1417 projecting into a slot 1418 in the total lever plate 295. The lever 1416 has a slot 1419 into which projects a pin 1420 on a link 1421. The pin 1420 normally engages a notch 1422 in the stationary plate 298. The link 1421 is pivoted to an arm 1423 fast on the shaft 193. There are three levers 1416 and three of each of the other elements just described. One set of elements is adapted to cooperate with each one of the sets of totalizers, there being three sets of totalizers in the machine shown. The slots 1418 are all of different shapes. When the total lever 137 is moved to the first position above or below the adding position the arm 1416 associated with the clerks' totalizers is rocked counter clockwise (Fig. 21^A), whereby the pin 1420 is disengaged from the the notch 1422 and engaged with a notch 1424 in a plate 1425 secured to the previously described hub 296. When the total lever 137 is moved to the second position above or below adding position the lever 1416 associated with the transaction totalizers is rocked counter clockwise to disengage its pin 1420 from the notch in the plate 298 and cause it to be engaged with the notch 1424 in the plate 1425. When the total lever 137 is moved to the extreme upper or lower position the lever 1416 associated with the department totalizers is rocked counter clockwise to disengage its pin 1420 from the notch 1422 and cause said pin to be engaged with the notch 1424 in the plate 1425.

As previously described, in adding operations the spider 317 (Fig. 21^B) is rocked first clockwise and then counter clockwise to engage and disengage the selected totalizer from the actuators. The hub 296 as previously described is secured to the spider 317 and therefore when said spider is rocked the plate 1425 is rocked first clockwise and then counter clockwise (Fig. 21^A).

For illustrative purposes let it be assumed that the total lever 137 has been moved downward to the "clerks' total" position, which is the first position below the adding position. Movement of the lever 137 to this position disengages the pin 1420 from the stationary notch 1422 in plate 298 and engages it with the notch 1424 in the plate 1425. After this has taken place and during the operation of the machine the plate 1425 is rocked first clockwise and then counter clockwise to normal position. The clockwise movement of the plate 1425 through the engagement of the notch 1424 with the pin 1420 moves the upper link (Fig. 21^A) 1421 downward, thereby rocking the shaft 193 counter clockwise. Secured to the shaft 193 is a partial gear 1426 (Fig. 9) meshing with a segment 1427 loose on a stud 1428 on the plate 346. The segment 1427 has an integral arm 1429 having a slot engaging a stud 1430 on a link 1431 pivoted at 1432 to an arm 1433 loose on the stud 1428. Rigid with the arm 1433 is a pawl 1434 in the plane of the segments 366 and the selected totalizer pinion 370. Pivoted to the stud 1430 is a link 1437 also pivoted on a stud 1438 of a lever 1439 pivoted on a stud 1440 on the plate 346.

Counter clockwise movement of the shaft 193 (Fig. 9) rocks the segment 1427 clockwise and through the engagement of the slot in the arm 1429 with the stud 1430 the link 1431 is rocked slightly clockwise about the stud 1432. At the same time the arm 1433 and the pawl 1434 rigid therewith are rocked clockwise about the stud 1428 to position the pawl 1434 so that as the pinion 370 is rotated counter clockwise, as will be hereinafter described, said pawl may be engaged by the long tooth 425 of said pinion. The clockwise movement of the segment 1427 and arm 1429 also rocks the link 1437 counter clockwise about the stud 1438 and positions the links 1431 and 1437 so that they are in a straight line.

After this has taken place the totalizer pinion 370 is engaged with the segment 366 in a manner to be hereinafter described. After this engagement the segment 365 is rocked clockwise the same as in adding operations and through its engagement with the latch 375 the plates 367 and 368 and segments 366 are rotated clockwise thereby causing a counter clockwise rotation of the pinion 370.

During this rotation of the pinion, when the long tooth 425 thereof strikes the pawl 1434 said pawl is rocked counter clockwise. The plate 1425 (Fig. 21ᴬ) reaches the limit of its clockwise movement before the pawl 1434 is rocked counter clockwise as just described thereby holding the shaft 193, gear 1426 and segment 1427 in the position to which they have been moved by said clockwise movement of the plate 1425.

With the parts moved to the position as just described, the counter clockwise movement of the pawl 1434 rocks the arm 1433 counter clockwise and lowers the link 1431. As the link 1437 is in a straight line with the link 1431, movement of the link 1431 moves the link 1437 downward and the stud 1430 slides in the slot in the arm 1429. Downward movement of the link 1437 rocks the lever 1439 clockwise, whereby a flattened stud 1441 thereon engages one of the notches 1442 in the previously described plate 390, which it will be remembered is connected to the pin 392 on the latch arm 385. When this occurs the plate 390 is stopped in a position commensurate with the amount which is upon the totalizer pinion 370. The stopping of the plate 390 in this manner causes the latch 375 to be disengaged from the driving segment 365 thereby stopping the differential segment 366 in a position commensurate with the value which is upon the totalizer pinion 370. After the segment 366 has been positioned under the control of the totalizer pinion the beam 440 is actuated in identically the same manner as was described during adding operations to set up the type wheels to print the amount taken from the totalizer pinion.

After the beam has been set the totalizer is disengaged from the segment 366 thereby leaving said totalizer in its zero position. When the totalizer is disengaged the previously described spring 422 (Fig. 9) rocks the lever 1439 counter clockwise to normal position thereby disengaging the stud 1441 from the plate 390.

The plate 1425 is then rocked counter clockwise (Fig. 21ᴬ) to normal position whereby the shaft 193 and partial gear 1426 (Fig. 9) are rocked clockwise and rock the segment 1427 counter clockwise to normal position, thereby lowering the link 1431 and rocking the arm 1433 and pawl 1434 counter clockwise to normal position. This movement of the segment 1427 also rocks the link 1437 clockwise about the stud 1438 to normal position.

To prevent the segment 1427 from getting out of mesh with the gear 1426 and also to prevent the pawl 1434 from getting out of the plane of the pinion 370 a plate 1445 is secured to the plate 346 and a collar 1446 is pinned to the shaft 193 adjacent said plate.

If the totalizer is in the zero position when it is rocked into engagement with the segment 366 the long tooth 425 immediately strikes the pawl 1434. When this occurs the clockwise movement of the segment 1427 through the engagement of its arm 1429 with the stud 1430 straightens out the links 1431 and 1437 and immediately rocks the lever 1439 clockwise, whereby the stud 1441 engages the notch 1442 in the zero position. Consequently the latch is broken at zero and the segment 366 is not moved beyond zero position.

*Total and sub-total—Interlock.*—As it is not necessary to depress any of the amount keys 130 during a total or sub-total operation, means are provided for preventing their depression when the total lever is out of adding position. As there are no amount keys depressed it is also necessary to render the zero stop pawl 151 ineffective in order that the differential mechanism may be controlled by the long tooth 425 of the totalizer pinion 370 as above described.

As above stated, when the total lever 137 is moved either above or below its adding position, the shaft 1229 is rocked clockwise (Figs. 21ᴮ and 25) or counter clockwise as viewed in Fig. 8. This shaft has secured thereto a pair of arms 1447 (only one of which is shown in Fig. 8) carrying a rod 1448. Counter clockwise movement of the shaft 1229 and arms 1447 moves the rod 1448 downward in front of a foot 1449 integral with the arm 145, which it will be remembered is moved counter clockwise by the depression of any of the keys 130. With the rod 1448 in front of the lower end of the arm 145 it is very clear that said arm can not be rocked counter clockwise, therefore none of the keys 130 can be depressed.

If an amount key is depressed, the total lever 137 can be moved by forcing it, but this movement positions the bell crank 320 (Fig. 25) in front of the stud 252 and prevents the machine from being released as previously described. With an amount key 130 depressed, the arm 145 is rocked counter clockwise and its lower end is moved beneath the rod 1448, but there is enough clearance between said arm and said rod to allow the rocking of the bell crank to position it in front of the stud 252. When this clearance is taken up, the continued forcing of the lever 137 compresses the spring 330 so that the mechanism will not be strained. To release the machine for operation the total lever must be moved to its adding position and the keys 130 released by the handle 281.

As previously described the shaft 1229 is rocked further counter clockwise by the mechanism illustrated in Fig. 6 whereupon the rod 1448 engages the lower end of the zero stop pawls 151 associated with each of the amount banks and rocks said pawls clockwise so that their upper ends cannot break the latch at zero.

As previously described, there is an interlocking mechanism between the transaction keys 132 and 133 and the clerks' keys 134 and list key 135 which compels a depression of one of the keys 132 or 133 before one of the keys 134 can be depressed to release the operating mechanism during adding operations. In total and sub-total taking operattions this mechanism must be rendered ineffective in order that one of the keys 134 may be depressed to select a totalizer without having to depress a key in the transaction bank. Mechanism for rendering this interlocking device ineffective is operated by the total lever 137 and will now be described.

The total lever plate 295 (Fig. 21ᴬ) has a slot 1450 into which projects a pin 1451 on a lever 1452 pivoted on a stud 1453 on a plate 1454 (Fig. 10) secured to the plate 346 associated with the clerks' key-bank. The lever 1452 is formed so that its upper end 1455 (Figs. 12 and 21ᴬ) engages a pin 1456 on the previously described lever 210.

The slot 1450 is so shaped that when the lever 137 is moved either up or down out of adding position, the lever 1452 is rocked clockwise (Fig. 21ᴬ). As viewed in Fig. 12 this movement of the lever 1452 is counter clockwise whereby its upper end 1455 rocks the lever 210 clockwise and disengages the stud 211 from the notch 212 in the lever 175 which supports the upper end of the detent 171 thereby allowing any of the keys 134 to release the operating mechanism in a manner identical with that described in adding operations.

As previously described the key 135 is a "free" key and releases the motor-operating mechanism without moving the detent 171. Therefore the interlocking mechanism just described has no effect upon said key. This key is used in total and sub-total operations to release the machine when taking a total or sub-total of any of the totalizers associated with the transaction bank or any of the totalizers associated with the department bank.

As the interlocking mechanism between the transaction bank and the clerks' bank is rendered ineffective by the total lever, and as a total of only one of the totalizers can be printed at one time, it is necessary to permit the depression of a key in one control bank only, excepting the "list" key 135, during total and sub-total operations. The means for predetermining whether a key in the department bank, transaction bank or clerks' bank will be depressed is controlled by the total lever 137.

If the total lever 137 is moved either up or down to the "X total" position, only a key 131 in the department bank can be depressed to control the selection of the totalizer. When a key in this bank is depressed the "list" key 135 is also depressed to release the motor. When the total lever 137 is moved either up or down to the "Trans. total" only one key 132 or 133 in the transaction bank can be depressed to control the selection of the transaction totalizer, the "list" key 135 being also depressed to release the motor. If the total lever 137 is moved either up or down to the "Clerks' total" position then only one of the clerks' keys 134 can be depressed. In this case, as any of these keys ordinarily releases the motor, it is not necessary to depress the "list" key.

Pivoted to the total lever plate 295 (Figs. 21ᴬ and 25) is a link 1458 connected to an arm 1459 loose on the shaft 448. Rigid with the arm 1459 is a spiral segment 1460 meshing with a spiral pinion 1461 fast on a shaft 1462 mounted in the frame 646 and the bracket 665. Also fast on the shaft 1462 is a segment 1463 (Figs. 25 and 43ᴮ) meshing with a rack 1464 slidably mounted on the stud 673 (Fig. 43ᴬ) and the shaft 672 (Fig. 43ᴮ). The rack 1464 has teeth 1465 on its upper edge which mesh with a segment 1466 loose on the stud 696. Integral with the segment 1466 is a segment 1467 meshing with a rack 1468 slidably mounted on the stud 697 (Fig. 43ᴮ) and a stud 1469 on the frame 647. The upper edge of the rack 1468 has notches 1470 (Figs. 43ᴬ and 43ᴮ) cooperating with the lower ends 1471 (Fig. 10) of the arms 177 associated with the department, transaction and clerks' banks of keys.

Movement of the total lever 137 either up or down out of its adding position rotates the spiral segment 1460 either clockwise or counter clockwise as the case may be, and through its engagement with the pinion 1461 moves the rack 1464 to the right or left. Movement of the rack 1464 through the segments 1466 and 1467 moves the rack 1468 to the right or left and positions one of the notches 1470 directly in front of the portion 1471 of the arm 177 associated with one of the three banks of control keys depending upon the position of the total lever 137. In front of the arms 177 associated with the other two banks is positioned a solid portion of the rack 1468 thereby preventing counter clockwise movement of these two arms and consequently preventing the depression of the keys in those banks except the "list" key because this key does not move the arm 177.

In other words if the total lever 137 is moved to the "clerks' total" position a notch 1470 is positioned in front of the portion 1471 of the arm 177 associated with the clerks' bank and a solid portion of the rack 1468 is positioned in front of the arms 177 associated with the department bank and the transaction bank. From this it can be seen that when the total lever 137 is in the "clerks' total" position only a key in the clerks' bank can be depressed to select the totalizer from which it is desired to take a total or sub-total.

*Total and sub-total—Totalizer engaging control.*—As described in connection with the adding operation the selecting plate 536 (Fig. 21A) controls which of the totalizer lines is to be engaged with the actuators. In adding operations more than one totalizer may be engaged with the actuators depending upon the position of the plate 536 under the control of the keys in the transaction bank. However, in total and sub-total operations only one totalizer line can be rocked into engagement with the actuators at a time. Therefore it is necessary to render the totalizer engaging controlling mechanism, which operates in adding operations, ineffective and to select the totalizer line and control its engaging and disengaging with the differential mechanism by the total lever 137. When the total lever 137 is moved downward to one of its three lower positions a corresponding totalizer is rocked into engagement with the actuator to have the total taken therefrom. When the total lever 137 is moved upward to one of its three positions a corresponding totalizer is rocked into engagement with the actuator to have the sub-total taken therefrom.

As previously described, in adding operations the link 550 (Fig. 21B) is moved toward the right and through its engagement with the stud 548 rocks the spider 317 clockwise to engage the selected totalizer with the actuators after the actuators have been differentially positioned under the control of the amount keys 130. After the actuators have been returned to normal the link 550 is moved to the left to normal position and disengages the totalizer from the actuators. In total and sub-total operations the time of engaging and disengaging the totalizers is entirely different from that described in adding operations.

The total lever plate 295 has a slot 1474 (Fig. 21A) into which projects a pin 1475 supported by one of the levers 517 and an arm 1476 pivoted on the stud 518 of this particular lever 517. The slot 1474 has an enlarged portion 1477 within which the pin 1475 moves idly when the lever 517 is rocked clockwise during adding operations. When the lever 137 is moved in position for total or sub-total operations the slot 1474 through its engagement with the pin 1475 rocks the lever 517 clockwise and moves all of the levers 521 far enough to position the pins 535 away from the outer periphery of the plate 536. When the pin 1475 rocks the one lever 517 the other two are rocked by the three-armed lever 515. Any subsequent movement of the plate 536 has no effect upon the levers 521 or links 504 for engaging the totalizers with the differential actuators as would be the case during adding or listing operations.

It has been previously described that a movement of the total lever 137 into position for taking totals or sub-totals causes a movement of the lever 325 in a counter clockwise direction. Pivoted to the lever 325 is a link 1478 also connected to the stud 526 normally engaged by the hook 527 of the lever 528. Counter clockwise movement of the lever 325 (Fig. 21A) moves the link 1478 to the right thereby disengaging the stud 526 from the lever 528 and rocking the link 525 counter clockwise about the stud 520. It will be remembered that the lever 528 is actuated by the cam 531 during adding operations to move the link 525 upward and rock all of the levers 517 to actuate the pins 535 to select the totalizer lines which are to be engaged with the differential actuators. By disconnecting the link 525 from the lever 528, the driving connection between the cam 531 and the levers 517 is broken.

Since the operation or the condition set up by the total lever 137 as just described has crippled the automatic means for selecting which of the totalizer lines are to be engaged with the differential actuators, means are provided for setting up a condition by the total lever itself for determining which totalizer line is to be engaged with the differential actuators. The total lever plate 295 has three irregularly shaped slots 538 (Fig. 21A) each slot receiving one of the pins 535 on the levers 521. These slots are so shaped that when the total lever 137 is moved downward to total or reset positions, the pins 535 are moved radially away from the rod 297. Since the levers 517 are held stationary after being rocked clockwise by the total lever, the movement of the pins 535 causes a clockwise movement of the levers 521 around the studs 520 and by the connection of said levers and the links 504 said links are moved outwardly. This movement of the links 504 positions the pins 545 within the hooks 547 of the spider 317, whereby when said spider is rocked clockwise, as previously described, the links 504 rock the totalizers associated therewith into mesh with the differential actuators. Each of the slots 538 has a different shape so that the pins 535 are moved alternately whereby their associated pins 545 are moved alternately into engagement with the hooks 547. In other words only one of the pins 545 can be engaged with its hook 547 at one time during totalizing operations.

This same condition is true when the total lever 137 is moved upward to its sub-total or reading positions, as the slots 538 have the same shapes on each side of the position where the pins 535 normally engage said slots.

From the above it can be seen that only one totalizer line can be selected during a total or sub-total operation to be rocked into engagement with the actuators. The previously described slots 1418 (Fig. 21^A) are also of different shape so that if for instance the lower pin 545 is moved to engage its hook 547, the lower slot 1418 moves its pin 1417 and rocks the lower shaft 193 to move the pawl 1434 associated with the lower totalizer line, into position to be acted upon by the long tooth 425 (Fig. 9) of the lower line of totalizers.

In totalizing operations, the link 550 is moved to a different position from that shown in Fig. 21^B. This is done by the total lever 137 preliminary to an operation of the cam shaft 112, so that the time of the engaging and disengaging of the totalizers may be changed in accordance with the desired operation. When the total lever 137 is moved counter clockwise (Fig. 21^A) for a totalizing operation, a slot 1481 therein, through its engagement with a pin 1482 on a lever 1483 (Fig. 21^B), pivoted on a stud 1484 on the plate 324, rocks said lever 1483 clockwise. At the same time the lever 325 is rocked counter clockwise by the slot 327. Pivoted at 1485 to the arm 1406 is a link 1487 which carries a stud 1488 extending in a slot 1489 in the lever 1483, and in the straight portion of a slot 1490 in a lever 1491 pivoted on the stud 1484.

Clockwise movement of the lever 1483, as above described, through the stud 1488 rocks the lever 1491 clockwise about the stud 1484 and, through the engagement of a pin 1492 with a slot 1493 in the link 550, rocks said link counter clockwise about the stud 551 and disengages said link from the stud 548 on the spider 317.

The lever 1491 has a slot 1494 engaging a pin 1495 on a lever 1496 pivoted on a stud 1497 on the plate 324. The lever 1496 carries a pin 1498. Clockwise movement of the lever 1491 through the engagement of its slot 1494 with the pin 1495 rocks the lever 1496 counter clockwise whereby the pin 1498 engages a notch 1499 in the spider 317 and positively locks said spider in this position until one of the pins 545 has been engaged with one of the hooks 547 on said spider. Downward movement of the total lever 137 also rocks the shaft 1229 clockwise (Fig. 21^B) as previously described, thereby lowering the link 1487 so that the stud 1488 is moved downward a short distance but not far enough to engage the cam portion of the slot 1490.

Movement of the total lever 137 downward also connects the disk 1401 (Fig. 6) with the gear 123 and moves the link 235 to such a position that the gear 123 is allowed to make one complete rotation, thereby giving two rotations to the gear 125 and shaft 112.

After the parts have been moved to the position just described by the movement of the total lever 137 the motor is released to give the shaft 112 two complete rotations in a clockwise direction (Fig. 21^B).

During the first rotation of the shaft 112 the lever 552 is rocked clockwise and moves the link 550 to the right and positions a notch 1500 therein directly above a pin 1501 on the spider 317. Immediately after this has taken place the cam race 1411 (Fig. 6) moves the link 1391 to the left and rocks the shaft 1229 still further in a clockwise direction. This movement of the shaft 1229 moves the link 1487 downward whereby the stud 1488 through its engagement with the cam portion of the slot 1490 rocks the lever 1491 still further clockwise and through the engagement of its pin 1492 with the slot 1493 rocks the link 550 still further counter clockwise about the stud 551 and engages the notch 1500 with the pin 1501 on the spider 317. The clockwise movement of the lever 1491 just described also, through the engagement of its slot 1494 with the pin 1495, rocks the lever 1496 clockwise and disengages the pin 1498 from the notch 1499. After the notch 1500 is engaged with the pin 1501 and during the last part of the first rotation of the shaft 112, the lever 552 is rocked counter clockwise and moves the link 550 to the left, thereby rotating the spider 317 clockwise. This movement of the spider through the engagement of one of its hooks with one of the pins 545 rocks the selected totalizer shaft, as determined by the position of the total lever 137, into engagement with the totalizer actuators previously described. The totalizer is held in engagement with the actuator by the cams 556 and 557 until the actuators have been differentially positioned under the control of the long tooth 425 on the totalizer pinions 370 in the manner previously described, after which the lever 552 is rocked clockwise and moves the link 550 to the right, which rocks the spider 317 counter clockwise thereby disengaging the selected totalizer from the actuator. Immediately after the link 550 has been moved to the right the cam race 1411 (Fig. 6) rocks the shaft 1229 and arm 1406 counter clockwise and raises the link 1487 which rocks the lever 1491 counter clockwise, thereby rocking the link 550 clockwise about the stud 551. This movement of the link 550 disengages its notch 1500 from the pin 1501. After said disengagement the lever 552 is rocked counter clockwise and moves the link 550 to the left to the position in which it was placed by the movement of the total lever 137.

After the link 550 is moved to the left as last described the total lever 137 is moved clockwise to its adding position, which rocks the lever 1483 counter clockwise and raises the link 1487 and rocks the arm 1406 and shaft 1229 counter clockwise to normal position. The upward movement of the link 1487 rocks the lever 1491 counter clockwise to normal position and rocks the link 550 clockwise about the stud 551 so that the notch 549 again engages the pin 548 on the spider 317.

From the above described operation it can be clearly seen that the totalizer line selected by the total lever is rocked into engagement with the totalizer actuators before said actuators are moved differentially, and held in engagement therewith until the differential movement of the actuators, under the control of the long tooth 425 on the pinion 370, is completed, after which said totalizer line is rocked out of engagement with the differential actuators thereby leaving the totalizer at zero.

The control of the engaging and disengaging of the totalizers with the actuators during sub-totalizing operations will now be described. For a sub-total operation the total lever 137 is moved in a clockwise direction (Fig. 21ª). This movement of said lever does not rock the lever 1483 or the lever 1491, as is the case in totalizing operations, because the slot 1481 is concentric with the center of the stud 297 for all positions of the total lever 137 above its adding position. However, clockwise movement of the total lever 137 through the engagement of the slot 327 and pin 326 rocks the lever 325 counter clockwise in identically the same manner as said lever is rocked during the totalizing operation above described. This movement of the lever 325 also rocks the shaft 1229 clockwise as above described to connect the disk 1401 (Fig. 6) with the gear 123.

In sub-totalizing operations the gear 123 receives one complete rotation and the gear 125 and shaft 112 receive two complete clockwise rotations in identically the same manner as described in connection with the totalizing operation. As the lever 1491 is not moved by the movement of the total lever 137 the link 550 remains in engagement with the pin 548 on the spider 317.

During the first clockwise movement of the lever 552 the link 550 is moved to the right and rocks the spider 317 clockwise and engages the selected totalizer with the differential actuator. After the totalizer has been engaged, the cam race 1411 (Fig. 6) moves the link 1391 still further to the left thereby rocking the shaft 1229 and arm 1406 clockwise, which lowers the link 1487, whereupon the stud 1488 engages the cam portion of the slot 1490 and rocks the lever 1491 clockwise about the stud 1484. Clockwise movement of the lever 1491 rocks the link 550 counter clockwise about the stud 551 and disengages the notch 549 from the pin 548 on the spider 317. This movement of the lever 1491 also rocks the lever 1496 counter clockwise and its pin 1498 engages a notch 1502 in the spider 317 and positively locks said spider in this position thereby holding the totalizer in engagement with the actuators. Immediately after the disengagement of the link 550 from the pin 548 the lever 552 is rocked counter clockwise and moves the link 550 to the left. This movement of said link is idle because it is not engaged with either the pin 548 or the pin 1501. The selected totalizer is now engaged with the differential actuators and said actuators are moved differentially under the control of the long teeth on the totalizer pinions 370 thereby resetting said totalizer to zero. As previously described, the amount which is on the totalizer is now printed from the type wheels. During the first part of the second rotation of the shaft 112 the differential actuators are again moved and due to the fact that the totalizer pinions are engaged therewith the amount that was taken from said pinions is again accumulated thereon. The lever 552 is again rocked clockwise and moves the link 550 to the right and positions the notch 549 therein directly beneath the pin 548 on the spider 317. The race 1411 (Fig. 6) at this time moves the link 1391 to the right and rocks the shaft 1229 counter clockwise and raises the link 1487 which rocks the lever 1491 counter clockwise and thereby rocks the link 550 clockwise about the stud 551 so that it again engages the pin 548. This counter clockwise movement of the lever 1491 rocks the lever 1496 clockwise and disengages its pin 1498 from the notch 1502 to allow the spider 317 to be rocked. The lever 552 is then rocked counter clockwise to normal position and moves the link 550 to the left thereby rocking the spider 317 counter clockwise, which disengages the totalizer from the actuators.

Total lever 137 is then moved counter clockwise to its normal adding position and through the slot 327 and pin 326 rocks the lever 325 to normal position and raises the link 1487 to the position shown in Fig. 21<sup>B</sup>. This movement of the total lever also disconnects the disk 1401 (Fig. 6) from the gear 123 so that said disk is not rotated while the total lever 137 is in the adding position.

From the above description it can be clearly seen that during a sub-totalizing operation the totalizer is engaged with the actuators and reset to zero by the movement of the actuators but said totalizer is maintained in engagement until the actuators are again moved, which operation puts back on the totalizer the amount which was taken therefrom so that at the end of a sub-totalizing operation the amount on the totalizer is the same as it was before the sub-totalizing operation was made.

*Total and sub-total—Indicator crippling.*—In total and sub-total operations it is desirable to cripple, or render ineffective, the indicator lifting mechanism previously described. Secured to the shaft 1229 is an arm 1505 (Fig. 17) carrying a pin 1506 engaging a slot 1507 in a link 1508. Both ends of said link are bifurcated to surround the rod 612 and the shaft 1229. The link 1508 carries a roller 1509 adapted to cooperate with a surface 1510 of the previously described link 600.

Movement of the total lever 137 either up or down out of its adding position rocks the shaft 1229 counter clockwise thereby rocking the arm 1505 likewise. This movement of the arm 1505 through the engagement of its pin 1506 with the slot 1507 moves the link 1508 to the left. This positions the roller 1509 into cooperative relation with the surface 1510 of the link 600.

During adding operations it will be remembered that the link 600 is moved downward by the lever 603 at the beginning of the operation to lower the indicators which were exposed for the previous operation. During the first part of the first counter clockwise rotation of the shaft 112 (Fig. 17) the lever 603 is rocked clockwise and lowers the link 600 thereby rocking the arm 597 and lowering the link 596 which lowers the previously exposed indicators to their normal positions. As the link 600 nears the end of its downward movement the surface 1510 engages the roller 1509, which has been moved to the left by movement of the total lever, and rocks the link 600 clockwise about the stud 599 thereby disengaging the roller 601 from the short portion of the L-shaped slot 602 and positions said roller in the end of the long portion of said slot. After this has taken place and during the first rotation of the shaft 112 when the lever 603 is moved counter clockwise, due to the fact that the roller 601 is in the long portion of the slot, said lever 603 does not raise the link 600 and the roller 601 assumes a position near the bottom of the long portion of the slot 602. Therefore, the arm 597 is not rocked counter clockwise to expose the selected indicator to view. During the second rotation of the shaft 112 the lever 603 is again rocked clockwise thereby positioning the roller 601 at the intersection of the short and long portions of the slot 602. The lever 603 is then rocked counter clockwise to normal and the roller 601 again assumes a position near the bottom of the long portion of the slot 602. During a total or sub-total operation, whichever the case may be, the shaft 1229, as previously described, is rocked still further in a counter clockwise direction but the lower portion of the slot 1507 is concentric with the shaft 1229. Therefore the link 1508 receives no further movement to the left than that which was given it by the first counter clockwise movement of the shaft 1229 under the direct control of the total lever 137.

As the total lever 137 is now moved to its adding position it rocks the shaft 1229 to normal thereby rocking the arm 1505 clockwise which moves the link 1508 to the right to the position shown.

If the next operation of the machine is an adding operation the clockwise movement of the lever 603 positions the slot 602 so that the roller 601 is at the intersection of the short and long portion of said slot. When the slot 602 assumes this position the spring 613 through the engagement of the surface 610 of the pawl 611 with the roller 609 rocks the link 600 counter clockwise and engages the roller 601 in the short portion of the slot 602. With the roller in this position, the counter clockwise movement of the lever 603 to normal position raises the link 600, rocks the arm 597 counter clockwise and raises the link 596 to expose the selected indicator; for this adding operation, to view.

*Total and sub-total—Zero elimination crippling.*—As previously described, the "zero elimination" mechanism in adding operations, prevents the printing of ciphers to the left of the highest denomination represented by a digit except the highest amount rack, which prints an "S" from the zero position at certain times. When the "S" is not printed this rack is eliminated by mechanism operated due to the absence of the slip. It will also be remembered that there is no portion 869 bent over in the plane of the lever 836 associated with the highest amount rack. Therefore, in total and sub-total operations it is necessary to cripple the zero elimination mechanism for the next highest amount rack when there is an amount on the "overflow" or highest amount rack 669. In other words if the total is $2,000,312.98, the zero elimination mechanism for the three ciphers illustrated must be rendered ineffective.

Integral with the lever 836 associated with the next to highest amount rack is an arm 1511 (Fig. 43ᴬ) engaging a lever 1512 (Fig. 61) pivoted on a stud 1513 on the frame 647. The lever 1512 has a projection 1514 engaging a cam 1515 secured to the side of a gear 1516 loose on a stud 1517 on the frame 647. The gear 1516 meshes with the rack 669 of highest denomination.

As above stated, this rack is used only in adding operations to control the printing of the "S" when a slip is in the machine. In totalizing if there is an amount on the "overflow" totalizer pinion 370, it controls the overflow differential unit and thereby causes the rack 669, of highest denomination, to be moved an extent commensurate with the amount upon this highest amount totalizer pinion 370. When this rack 669 is moved it rotates the gear 1516 counter clockwise. This rotates the cam 1515 counter clockwise whereby the outer periphery of said cam engages the projection 1514 and rocks the lever 1512 clockwise. When this occurs the lever 836 through the engagement of the lever 1512 with the projection 1511 is rocked counter clockwise to disengage its shoulder 837 from the notch 838 in the next to highest amount rack. This lever 836 through the bent-over portion 869 on the lever 836 associated with the next lower rack rocks said next lower lever counter clockwise and so on to the right until all of the levers 836 have been rocked to disengage their shoulders from the notches 838 in the racks 669 thereby preventing these racks from being eliminated.

From the above description it is clear that if the total on the totalizer is $2,000,312.98, as above mentioned, the zero elimination mechanism for the three next to highest amount racks is crippled or rendered ineffective in order that the racks may remain in zero position whereby the type wheels are not moved and will print the three ciphers in the above mentioned number. When the differential unit of highest denomination is restored to its normal position the rack 669 associated therewith is moved to its zero position thereby rotating the gear 1516 clockwise to the position shown whereupon the cam 1515 is moved to its normal position and the spring 852 connected to the lever 836 associated with the rack next to the highest denomination rocks said lever clockwise and through the engagement of its arm 1511 rocks the lever 1512 counter clockwise to the position shown in Fig. 43ᴬ.

In total and sub-total operations a "Z" is printed to designate a total operation, and an "X" is printed to designate a sub-total operation. These characters are on a type wheel 1520 (Fig. 50) adjacent the clerks' type wheel. This type wheel meshes with a pinion 1521 secured to one of the tubes 720. The other end of this tube has a gear 1522 meshing with teeth 1523 (Fig. 43ᴬ) on the upper edge of the total lever rack 1464. It will be remembered that this rack is moved by the spiral segment 1460 and spiral gear 1462. When the total lever is moved to any of its positions below adding position the type wheel 1520 is set to print a "Z" and when the total lever 137 is moved to any position above adding said type wheel is set to print an "X."

The first two lines of printing in Fig. 60 represent totals. The second and third lines from the bottom represent sub-totals.

*Total and sub-total—Consecutive No. crippling.*—In total and sub-total operations it is desired to render the consecutive number feeding mechanism ineffective. Secured to the end of the shaft 1462 is a cam 1524 (Figs. 29, 33, 36 and 39). This cam cooperates with a stud 1525 on the previously described link 827. Movement of the shaft 1462 either clockwise or counter clockwise, by the movement of the total lever 137 either above or below its adding position, causes the stud 1525 to be disengaged from the notch in the cam 1524 and to be engaged by the outer periphery of said cam, thereby moving the link 827 to the left. This movement of the link 827 to the left rocks the link 793 counter clockwise and disengages the slot 794 therein from the stud 795 and engages the slot 830 with the stud 831 which holds said link and thereby retains the consecutive number type wheels in the position to which they were moved by the preceding operation of the machine. As the link 793 is disengaged from the stud 795 on the consecutive number operating lever 796, it is very clear that, when this lever is moved during totalizing operations, it does not effect any advancement of the consecutive number type wheels. When the total lever 137 is moved to its adding position the spring 828 (Fig. 39) rocks the arm 825 counter clockwise and moves the link 827 whereby the stud 1525 engages the notch in the cam 1524 and the link 793 is again engaged with the stud 795 on the consecutive number operating lever 796.

*Total and sub-total—Printer drive control.*—In total and sub-total printing operations the shaft 112 (Fig. 23) is given two rotations, and as it is only necessary that the printer cam shaft 651 have one rotation, mechanism is provided for preventing the disk 653 from rotating the shaft 651 during the first rotation of the shaft 112. This mechanism is controlled by the total lever 137. When said total lever is moved either up or down the shaft 1229 is rocked clockwise, as previously described. Secured to the shaft 1229 is a lever 1526 having pivoted thereto a link 1527 which is pivoted to a casting 1528 loose on the front shaft 193. The casting 1528 has a portion 1529 cooperating with a portion 1530 (Fig. 24) of the pawl 656. Clockwise movement of the shaft 1229 by the movement of the total lever, through the link 1527, rocks the casting 1528 counter clockwise, whereupon the portion 1529 thereof is positioned in front of the portion 1530 of the pawl 656. With the portion 1529 in front of the portion 1530 of the pawl 656, the counter clockwise rotation of the disk 653 (Fig. 24) causes the portion 1530 to engage the portion 1529 and rock the pawl 656 clockwise to disengage it from the boss 660 integral with the disk 659 which is fast on the shaft 651. In this manner the driving connection between the disk 653 and the shaft 651 is disconnected during the first rotation of said disk. Near the end of the first rotation of the shaft 112 and disk 653 the shaft 1229 is rocked still further clockwise, as previously described, thereby moving the portion 1529 out of the path of movement of the pawl 656 so that upon the second counter clockwise rotation of the disk 653 (Fig. 24) the pawl 656 engages the boss 660 and rotates the disk 659 and consequently the shaft 651 one counter clockwise rotation. The casting 1528 is returned to normal by the shaft 1229.

*Total and sub-total—Automatic check crippling.*—During adding operations it will be remembered that whenever one of the clerks' keys 134 is depressed that a check is automatically issued. In total and sub-total operations it is desired that no check should be issued regardless of the automatic mechanism just mentioned. The means for crippling or rendering the automatic check-issuing mechanism ineffective is controlled by the total lever in total and sub-total operations.

The lever 1526 (Fig. 2) is forked so that the inner edges thereof conform with the bottom and sides of the previously described opening 1227 in the lever 1228. The pin 1226 on the link 1225 normally lies in the bottom of the V-shaped slot formed by the two forks of the lever 1526. Counter clockwise movement of the shaft 1229 and lever 1526 (Fig. 2), by the movement of the total lever, through the engagement of the pin 1226 with the bottom of the opening 1227 and the bottom of the V-shaped slot in the lever 1526, rocks the lever 1228 counter clockwise. When this occurs the spring 1235 moves the link 1232 upward and rocks the lever 1234 counter clockwise until it strikes the pin 1202. When the pitman 1195 is moved to the left it draws the lever 1234 to the left, whereupon the spring 1235 moves the link 1232 still further upward and engages the notch 1210 of the lever 1234 with the pin 1202 on the shaft 907. When the lever 1195 is moved to the right near the end of the first rotation of the shaft 112 the lever 1234 moves the shaft 907 to the right and slides the disks 976 and 978 (Figs. 2, 3 and 33), thereby moving the studs 1064, 1068 and 1059 out of the path of movement of the Geneva plates 973 and 1057, respectively, whereby the check-issuing mechanism, the knife and perforator mechanism are rendered ineffective. The pin 975 is of sufficient length, as previously described, to still be in the plane of the Geneva plate 973 when the disk 976 is moved, to cause one impression to be made from the upper platen 886 upon the detail strip. However, this impression is not made during the first rotation of the shaft 112 because, as already described, the shaft 651 is not operated during the first rotation of the shaft 112. However, during the second rotation of the shaft 112 (Fig. 2), the movement of the pitman 1195 to this right again moves the disks 976 and 978 to the right to render the check-issuing and the check impression mechanisms, and the knife and perforator mechanism, ineffective. This leaves the shaft 907 and disks 976 and 978 in this ineffective position at the end of the total or sub-total operation. When the total lever 137 is moved to its adding position the shaft 1229 is rocked to normal and rocks the lever 1526 clockwise, which, through the medium of the pin 1226, rocks the lever 1228 clockwise and lowers the link 1232 to the position shown in Fig. 2, thereby moving the lever 1234 to its down position.

*Operation.*

A very brief description will now be given of an adding operation. Let it be assumed that clerk "E" made a cash sale of $38.40 in department 2X, and that the stock or ledger number of the article sold was 3487961140. The operator depresses the ledger number keys 136 to represent 3487961140, the amount keys 130 to register $38.40, the "2X" key 131 and the "Cash" key 133 and finally the "E" key 134. Depression of the "E" key releases the shaft 88 (Fig. 2) whereby the motor locking lever 82 is released to allow the motor to operate and rotate the shaft 112 one counter clockwise rotation.

As the cash key is in the fourth position, and as the fourth position on the plate 536 (Fig. 21^A) is a high portion, all of the pins 535 meet with an interference against this high portion and cause all of the pins 545 to be rocked into engagement with the hooks 547 on the spider 317. The differential mechanism (Fig. 9) is positioned under the control of the amount keys 130 after which the spider 317 is rocked clockwise and engages all three of the totalizer lines with the differential segments 366 so that when the differential mechanism is restored to normal position the amount thereon is accumulated upon three totalizers. The type wheels 731 are set under the control of the racks 669 and the zero elimination mechanism is operated to eliminate the four highest amount racks to prevent the printing of zeros to the left of the amount $38.40. Due to the fact that one of the keys 134 is depressed a check is automatically printed and issued for this operation. The consecutive number, ledger number, clerk's initial, character of the transaction, number of the department and the amount of the transaction are all printed upon the detail strip as illustrated in the sixth line of printing (Fig. 60) and check which is issued as illustrated in Fig. 57. The date is also printed upon the check but not upon the detail strip. As the knob 1146 is in the "stub check" position the check receives a perforation thus making a stub check. Let it be assumed that a slip was also printed upon during this transaction. Upon the slip (Fig. 59) is printed the date, consecutive number, ledger number, clerk's initial, character of transaction, number of the department and the amount of the transaction. Due to the fact that a slip was printed upon, the zero elimination mechanism for the highest amount rack is rendered ineffective so that the "S" which is in the zero position of the highest amount type wheel is printed on the detail strip, check and slip.

After the printing has taken place the check-ejecting mechanism previously described is operated to eject the severed portion from the machine. During the last part of the rotation of the shaft 112 the totalizers are disengaged from the actuators and all parts of the machine are restored to normal position.

Due to the fact that all of the various movements which take place during total and sub-total operations were described under that particular heading it is not thought necessary to further mention anything regarding total and sub-total operations.

While the form of mechanism herein shown and described is admirably adapted to fulfill the objects primarily stated, it is to be understood that it is not intended to confine the invention to the one form of embodiment herein disclosed for it is susceptible of embodiment in various forms all coming within the scope of the claims which follow.

What is claimed is:

1. In a machine of the class described, the combination of a main operating device, a totalizer, printing elements, indicating means, means for entering items in the totalizer for setting the printing elements and for setting the indicators corresponding to the items, indicator exposing means, total controlling mechanism, and means for disabling the indicator exposing means upon operation of said total controlling mechanism.

2. In a machine of the class described, the combination of a main operating device, a totalizer, printing elements, indicating means, means for entering items in the totalizer, for setting the printing elements and for selecting the indicators corresponding to the items, indicator exposing means, total controlling mechanism, and means operated by the total controlling mechanism for disabling the indicator exposing means when printing a total.

3. In a machine of the class described, the combination of manipulative devices, a totalizer, printing elements, indicators, means controlled by the manipulative devices and common to the totalizer, printing elements, and the indicators, for actuating the totalizer, setting the printing elements and selecting an indicator, means for printing the items and indicating the same, total controlling mechanism, means controlled by said mechanism whereby the first mentioned means is controlled by the totalizer to set up the total on the printing elements and to select the indicators for said total, and means for preventing the indication of the total when printing the same.

4. In a machine of the class described, the combination of a main operating device, a plurality of type carriers, impression means adapted to be operated a varying number of times, differential mechanism cooperating with said type carriers, manipulative means controlling said differential mechanism, a manually operated device operated as a preliminary to an operation of the main operating device to cause the impression means to be operated only once, automatic means controlled by certain of the manipulative means to cause the impression means to be operated twice, and means for rendering the automatic means ineffective when desired.

5. In a machine of the class described, the combination of a main operating device, a plurality of type carriers, impression means adapted to be operated a varying number of times, differential mechanism cooperating with said type carriers, manipulative means controlling said differential mechanism, a manually operated device operated as a preliminary to an operation of the main operating device to cause the impression means to be operated only once, automatic means controlled by certain of the manipulative means to cause the impression means to be operated twice, and a plurality of manipulative devices any one of which when operated in addition to said certain manipulative means renders said automatic means ineffective.

6. In a machine of the class described, the combination of a main operating device, a plurality of type carriers, impression means adapted to be operated a varying number of times, differential mechanism cooperating with said type carriers, manipulative means controlling said differential mechanism, a manually operated device operated as a preliminary to an operation of the main operating device to cause the impression means to be operated a plurality of times, and other manipulative means operated in addition to said manually operated device for causing the impression means to be operated only once.

7. In a machine of the class described, the combination of a plurality of type carriers, impression means adapted to be operated a varying number of times, differential mechanism cooperating with said type carriers, manipulative means controlling said differential mechanism, a manually operated device operated as a preliminary to an operation of the machine to cause the impression means to be operated a plurality of times, and a plurality of manipulative devices any one of which when operated in addition to said manually operated device causes the impression means to be operated only once.

8. In a machine of the class described, the combination of a plurality of type carriers, impression means adapted to be operated a varying number of times, differential mechanism cooperating with said type carriers, manipulative means controlling said differential mechanism, a manually operated device operated as a preliminary to an operation of the machine to cause the impression means to be operated a plurality of times, a manipulative device having a normal position and being adapted to be moved into any one of a plurality of positions, and means operated by said device when it is moved out of normal position for causing the impression device to be operated only once.

9. In a machine of the class described, the combination of printing elements, impression means, an operating device therefor, driving means for said device, and means for moving a portion of said driving means out of the plane of the rest of said driving means and out of the plane of the operating device thereby rendering the moved portion ineffective.

10. In a machine of the class described, the combination of printing elements, impression means, an operating device therefor, driving means for said device, and manipulative means for moving a portion of the driving means out of the plane of the rest of said driving means and out of the plane of the operating device whereby said moved portion is rendered ineffective.

11. In a machine of the class described, the combination of printing elements, impression means, an operating device therefor, driving means for said device, manipulative means for moving a portion of the driving means out of the plane of the rest of said driving means whereby said moved portion is rendered ineffective, and other manipulative means for rendering another portion of said driving means ineffective.

12. In a machine of the class described, the combination of printing elements, impression means, a device for operating the impression means a plurality of times, driving means for said device, and means for moving a portion of the driving means out of the plane of the operating-device and the rest of said driving means to vary the number of times the operating device is operated.

13. In a machine of the class described, an impression device, a driving device therefor comprising a plurality of pins for operating said impression device a plurality of times during an operation of the machine, and means for moving the pins relatively to each other to control the number of operations of said impression device.

14. In a machine of the class described, an impression device, driving means for said impression means, comprising a plurality of elements adapted to actuate said impression device to cause a corresponding number of impressions to be made, and means for moving one of said elements relatively to another into ineffective position.

15. In a machine of the class described, the combination of a totalizer, item entering means, a set of printing elements, means for setting the printing elements in accordance with the items entered and the accumulated totals on the totalizer, impression means, means for operating the impression means upon entry of items to print items on a check and a record strip, total control means for causing the accumulated totals to be set up on the printing elements, and means operated by said total control means for preventing the impression means from printing the total on the check.

16. In a machine of the class described, the combination of a totalizer, item entering means, a set of printing elements, means for setting the printing elements in accordance with the items entered and the accumulated totals on the totalizer, impression means, means for operating the impression means to print items on two record strips, means for causing the totals accumulated to be set up on the printing elements, and means operated by said controlling means for preventing said impression means from printing the total on one of said strips.

17. In a machine of the class described, the combination of a totalizer, a set of printing elements, means for entering items on said totalizer and for setting said printing elements, impression means, means for operating said impression means to print the items on a check and a record strip, check feeding mechanism, total control means for causing the totals accumulated to be set up on the printing elements, and means for rendering said check feeding mechanism ineffective upon a total printing operation.

18. In a machine of the class described, the combination of a totalizer, a set of printing elements, means for entering items on said totalizer and for setting said printing elements, impression means, means for operating said impression means to print the items on a check and a record strip, check feeding mechanism, total control means for causing the totals accumulated to be set up on the printing elements, and means operated by said total control means for disabling the check feeding mechanism during an operation of the machine involving the printing of a total.

19. In a machine of the class described, the combination of a main operating device, printing elements, impression means adapted to be operated a varying number of times, totalizers, differential mechanism cooperating with the printing elements and the totalizers, manipulative means controlling the differential mechanism, means operated as a preliminary to an operation of the main operating device to cause the impression means to be operated only once, automatic means controlled by certain of the manipulative means to cause the impression means to be operated twice, total printing controlling mechanism, and means for rendering said automatic means ineffective upon operation of said total printing controlling mechanism.

20. In a machine of the class described, the combination of a main operating device, printing elements, impression means adapted to be operated a varying number of times, totalizers, differential mechanism cooperating with the printing elements and the totalizers, manipulative means controlling the differential mechanism, means operated as a preliminary to an operation of the main operating device to control the impression means, automatic means controlled by certain of the manipulative means to change the control of the impression means, total controlling mechanism, and means for rendering said automatic means ineffective when printing a total.

21. In a machine of the class described, the combination of printing elements, impression means adapted to be operated a varying number of times, totalizers, differential mechanism cooperating with the printing elements and the totalizers, manipulative means controlling the differential mechanism, manually operated means for controlling the impression means, automatic means controlled by certain of the manipulative means to change control of the impression means, total controlling mechanism, and means operated by the total controlling mechanism for rendering said automatic means ineffective when printing a total.

22. In a machine of the class described, the combination of a totalizer, printing mechanism, means for entering items in the totalizer and the printing mechanism, means adapted to print the items on a check and a record strip, manually operated means for determining whether a check will be printed, automatic means for superseding said manual control of the check printer, total controlling mechanism, and means for superseding said manual control and said automatic control of the check printer when printing a total.

23. In a machine of the class described, the combination of a totalizer, printing mechanism, means for entering items in the totalizer and the printing mechanism, means adapted to print the items on a check and a record strip, manually operated means for determining whether a check will be printed, automatic means for superseding said manual control of the check printer, total controlling mechanism, and means operated by the total controlling mechanism for rendering said manual control and said automatic control of the check printer ineffective.

24. In a machine of the class described, the combination of a totalizer, printing mechanism, means for entering items in the totalizer and the printing mechanism, means adapted to print the items on a check and a record strip, manually operated means for determining whether a check will be printed, automatic means for superseding said manual control of the check printer, total controlling means, and means controlled by the total controlling means for determining the effectivity of said manual control and said automatic control of the check printer.

25. In a machine of the class described, the combination of a totalizer, printing mechanism, means for entering items in the totalizer and the printing mechanism, means for operating the printing mechanism to print the items twice on a check and once on a record strip, check feeding mechanism, check perforating mechanism, total controlling mechanism, and means for disabling the check feeding and check perforating mechanisms during an operation of the printing mechanism under control of the total controlling mechanism.

26. In a machine of the class described, the combination of a totalizer, printing mechanism, means for entering items in the totalizer and the printing mechanism, means for operating the printing mechanism to print the items twice on a check and once on a record strip, check feeding mechanism, check perforating mechanism, check severing mechanism, total controlling mechanism, and means for disabling the check feeding, check perforating and check severing mechanisms during an operation of the printing mechanism under control of the total controlling mechanism.

27. In a machine of the class described, the combination of printing mechanism, means for operating the printing mechanism to print twice on a check and once on a record strip, check feeding mechanism, perforating mechanism, severing mechanism, a common actuator for the perforating and severing mechanisms, and means controlling said actuator whereby the perforating mechanism is rendered ineffective.

28. In a machine of the class described, the combination of printing mechanism, means for operating the printing mechanism to print twice on a check and once on a record strip, check feeding mechanism, perforating mechanism, severing mechanism, a common actuator for the perforating and severing mechanisms, and manipulative means controlling said actuator to prevent an effective operation of the perforator mechanism.

29. In a machine of the class described, the combination of printing mechanism, means for operating the printing mechanism to print twice on a check and once on a record strip, check feeding mechanism, perforating mechanism, severing mechanism, a common actuator for the perforating and severing mechanisms, and means for moving said actuator in one direction to operate the severing mechanism and in another direction to operate the perforating mechanism.

30. In a machine of the class described, the combination of printing mechanism, means for operating the printing mechanism to print twice on a check and once on a record strip, check feeding mechanism, perforating mechanism, severing mechanism, a common actuator for the perforating and severing mechanisms, and means for moving said actuator in one direction to operate the severing mechanism and in the reverse direction to operate the perforating mechanism.

31. In a machine of the class described, the combination of printing mechanism, means for operating the printing mechanism to print twice on a check and once on a record strip, check feeding mechanism, a reciprocating knife, a reciprocating perforator, a common actuator for giving the knife and perforator a normally effective movement, and means controlling the movement of the actuator to prevent an effective movement of the perforator.

32. In a machine of the class described, the combination of printing mechanism, means for operating the printing mechanism to print twice on a check and once on a record strip, check feeding mechanism, a reciprocating knife, a reciprocating perforator, a common actuator for giving the knife and the perforator a normally effective movement, and means for varying the movement of the perforator to render said perforator ineffective.

33. The combination in a printing mechanism of perforating and severing means, a cam for actuating the perforating means slidably mounted to be moved into ineffective position, and a cam for actuating the severing means provided with a recess to receive said slidably mounted cam in its ineffective position.

34. The combination in a printing mechanism of perforating and severing means, and cams for operating said means mounted for relative movement with respect to each other to render one ineffective.

35. The combination in a printing mechanism of perforating and severing means, a recessed cam disk means, and a smaller cam disk for operating the other means adapted to be received in said recess, and means for moving said cams relatively toward each other to render the smaller cam ineffective.

36. In a printing mechanism comprising perforating and severing means, a common actuator, and a plurality of means for driving said actuator, said means being movable with respect to each other to control the effectivity of one of them.

37. In a machine of the class described, the combination of a totalizer, printing elements, means for entering items in the totalizer and the printing elements, a consecutive number printer for recording the number of item entering transactions, a total controlling member, and means under control of said member for preventing said consecutive number printer from printing a number for a totalizing operation of the machine.

38. In a machine of the class described, the combination of a totalizer, printing elements, means for entering items in the totalizer and the printing elements, a consecutive number printer for recording the number of item entering transactions, a total controlling member, and means actuated by said member for preventing printing of a consecutive number during a totalizing operation.

39. In a machine of the class described, the combination of a totalizer, printing elements, means for entering items in the totalizer and the printing elements, a consecutive number printer for recording the number of item entering transactions, a listing key, and means under control of said key for preventing the consecutive printer from printing a number for an operation under control of said key.

40. In a machine of the class described, the combination of a totalizer, printing elements, means for entering items in the totalizer and the printing elements, a consecutive number printer for recording the number of item entering transactions, transaction keys, and means under control of one of said keys for preventing the consecutive number printer from printing a number for an operation under control of said key.

41. In a machine of the class described, the combination of a totalizer, printing elements, means for entering items in the totalizer and the printing elements, a consecutive number printer for recording the number of item entering transactions, total and sub-total controlling mechanism, and means operated by said mechanism for disabling the consecutive number printer when printing a total or sub-total.

42. In a machine of the class described, the combination of a main operating device, a totalizer, printing elements, means for entering items in the totalizer and the printing elements, a consecutive number printer for recording the number of item entering transactions, actuating means therefor operated by the main operating device, total controlling mechanism, and means for disconnecting the actuating means from the main operating device upon operation of the total controlling mechanism.

43. In a machine of the class described, the combination of a main operating device, a totalizer, printing elements, means for entering items in the totalizer and the printing elements, a consecutive number printer for recording the number of item entering transactions, actuating means therefor operated by the main operating device, total controlling mechanism, and means operated by the total controlling mechanism to disconnect the actuating means from the main operating device when printing a total of said items.

44. In a machine of the class described, the combination of a totalizer, printing elements, means for entering items in the totalizer and the printing elements, a consecutive number printer for recording the number of item entering transactions, actuating means therefor, a driving member, total controlling mechanism, and a cam controlled by said mechanism for disconnecting the actuating means from the driving member when printing a total.

45. In a machine of the class described, the combination of a totalizer, printing elements, means for entering items in the totalizer and the printing elements, a consecutive number printer for recording the number of item entering transactions, actuating means therefor, a driving member, total controlling mechanism, and a cam operated by said mechanism for disconnecting the actuating means from the driving member when printing a total.

46. In a machine of the class described, the combination of item and total printing mechanism, a consecutive number printer, actuating means normally in position to be operated upon an operation of the printing mechanism, a total lever, a transaction key, and means controllable by either said lever or said key for moving said actuating means into a position in which it is not operated upon an operation of the printing mechanism.

47. In a machine of the class described, the combination of printing elements, an impression hammer, means for moving said hammer away and then impelling it against said elements, and means for preventing movement of said hammer away from said elements.

48. In a machine of the class described, the combination of printing elements, an impression hammer, means for moving said hammer away and then impelling it against said elements, and a pivoted arm adapted to be swung under said hammer to prevent an operation thereof.

49. In a machine of the class described, the combination of printing elements, an impression hammer, means for moving said hammer away and then impelling it against said elements, means operable to prevent movement of said hammer away from said elements, and means controlled by record material in position to receive an impression to cripple said preventing means.

50. In a machine of the class described, the combination of printing elements, an impression hammer, means for moving said hammer away and then impelling it against said elements, and a pivoted arm adapted to be swung under said hammer to prevent an operation thereof when no material is in position to receive an impression.

51. In a machine of the class described, the combination of a normally locked main operating device, releasing mechanism therefor, printing elements, impression means therefor, a plurality of devices each adapted to be manually moved into a plurality of positions to control the impression means, and means actuated by said devices and cooperating with said releasing means for preventing the main operating device from being released unless said manually operated devices are in their adjusted positions.

52. In a machine of the class described, the combination of a normally locked main operating device, releasing mechanism therefor, printing elements, impression means, a device adapted to be manually moved into any one of a plurality of positions to control the impression means, and means operated by said device and cooperating with said releasing mechanism for preventing an operation of said releasing mechanism unless said device is in position to control.

53. In a machine of the class described, the combination of a totalizer, differential mechanism therefor, manipulative means controlling said differential mechanism, printing elements, a plurality of racks adapted to be differentially moved under the control of the manipulative devices and under the control of the totalizer to set said printing elements, a zero elimination mechanism cooperating with said racks, and means operated by the highest amount rack when said rack is positioned under the control of the totalizer, for rendering the zero elimination mechanism ineffective.

54. In a machine of the class described, the combination of a totalizer, differential mechanism therefor, manipulative means controlling said mechanism, printing elements, a plurality of racks adapted to be moved differentially under the control of the manipulative devices and under the control of the totalizer to set said printing elements, a zero elimination mechanism cooperating with said racks, and means controlled by the rack of highest denomination when said rack is moved under the control of the totalizer to render the zero elimination mechanism for the lower order racks ineffective.

55. In a machine of the class described, the combination of a totalizer, differential mechanism therefor, manipulative devices controlling said differential mechanism, printing elements, a plurality of racks adapted to be moved differentially by the differential mechanism under the control of the manipulative devices and under the control of the totalizer to set said printing elements, a zero elimination mechanism cooperating with said racks, and means for rendering the zero elimination mechanism ineffective when said racks are moved under the control of the totalizer.

56. In a machine of the class described, the combination of a totalizer, differential mechanism therefor, manipulative means controlling said mechanism, printing elements, a plurality of racks adapted to be moved differentially under the control of the manipulative devices and under the control of the totalizer to set said printing elements, a single rack moved only under the control of the totalizer, a zero elimination mechanism for said plurality of racks and means controlled by said single rack for rendering the zero elimination ineffective.

57. In a machine of the class described, the combination of a totalizer, differential mechanism therefor, manipulative means controlling said mechanism, printing elements, a plurality of racks adapted to be moved differentially under the control of the manipulative devices and under the control of the totalizer to set said printing elements, a single rack moved only under the control of the totalizer, a zero elimination mechanism for said plurality of racks, and means actuated by said single rack to render the zero elimination mechanism ineffective.

58. In a machine of the class described, the combination of a totalizer, differential mechanism therefor, manipulative means controlling said mechanism, printing elements, a plurality of racks adapted to be moved differentially under the control of the manipulative devices and under the control of the totalizer to set said printing elements, a single rack moved only under the control of the totalizer, a zero elimination mechanism for said plurality of racks, and means engaging said single rack and the zero elimination mechanism for disabling said zero elimination mechanism when said rack is moved.

59. In a machine of the class described, a plurality of racks differentially adjustable in one direction, means for moving one or more of said racks in the opposite direction, and a cam disk operated by one rack when differentially adjusted for preventing movement of other racks in the opposite direction.

60. In a machine of the class described, the combination of a plurality of differentially adjustable racks, zero elimination mechanism cooperating with said racks, and means operated by a higher order rack for moving parts of the zero elimination mechanism for crippling the same.

61. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, and means for preventing a depression of said device upon operation of the releasing mechanism.

62. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, and means operated by the releasing mechanism for preventing a depression of said device.

63. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, and means for maintaining said device in undepressed position during an operation of the main operating mechanism.

64. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, and a slidable member operated by the releasing mechanism for engaging said depressible device and preventing a depression thereof.

65. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, said device having a lateral projection, a member having a formed foot, and means carried by the releasing mechanism for moving said member to position its foot beneath the projection on the depressible device for preventing a depression of said device.

66. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, said device having a lateral projection, a member having a cammed slot and a formed foot, and means engaging said cammed slot and moving said foot beneath said projection upon operation of the releasing mechanism for preventing depression of said device.

67. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, and means for locking the depressible device in depressed position.

68. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, and means operated by the releasing mechanism for locking said device in depressed position.

69. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, and means for maintaining said device in depressed position during an operation of the main operating mechanism.

70. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, said device having a lateral projection, a member having a formed foot, and means carried by the releasing mechanism for moving said member to position its foot above said projection to maintain said device in depressed position.

71. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, said device having a lateral projection, a member having a cammed slot and a formed foot, and means engaging said slot and moving said foot above said projection upon operation of said releasing mechanism for locking said device in depressed position.

72. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, and means for preventing an operation of the releasing mechanism when said device is only partially depressed.

73. In a machine of the class described, the combination of a normally locked main operating mechanism, releasing mechanism therefor, printing mechanism, means for operating the printing mechanism to print on a check and a record strip, manual means for determining whether a check will be printed, automatic means operated by the main operating mechanism for causing a check to be printed regardless of said manual means, a depressible device for disabling said automatic means, and means compelling a full depression of said device for disabling said automatic means.

In testimony whereof I affix my signature.

BERNIS M. SHIPLEY.

CERTIFICATE OF CORRECTION.

Patent No. 1,619,796.  Granted March 1, 1927, to

BERNIS M. SHIPLEY.

It is hereby certified that error appears in the printed specification of the above numbered patent requiring correction as follows: Page 13, line 28, commencing with number 1,242,170, strike out all to and including the name "F. L. Fuller" line 32; same page, line 37, for the word "patent" read "patents"; page 21, line 101, for the numeral "69" read "669"; and that the said Letters Patent should be read with these corrections therein that the same may conform to the record of the case in the Patent Office.

Signed and sealed this 19th day of April, A. D. 1927.

Seal.

M. J. Moore,
Acting Commissioner of Patents.